US009739864B2

(12) United States Patent
Dowski, Jr. et al.

(10) Patent No.: US 9,739,864 B2
(45) Date of Patent: Aug. 22, 2017

(54) OPTICAL GUIDANCE SYSTEMS AND METHODS USING MUTUALLY DISTINCT SIGNAL-MODIFYING

(71) Applicant: ASCENTIA IMAGING, INC., Boulder, CO (US)

(72) Inventors: Edward R. Dowski, Jr., Lafayette, CO (US); Gregory Johnson, Boulder, CO (US)

(73) Assignee: ASCENTIA IMAGING, INC., Boulder, CO (US)

( * ) Notice: Subject to any disclaimer, the term of this patent is extended or adjusted under 35 U.S.C. 154(b) by 766 days.

(21) Appl. No.: 14/165,946

(22) Filed: Jan. 28, 2014

(65) Prior Publication Data
US 2014/0204360 A1 Jul. 24, 2014

Related U.S. Application Data

(63) Continuation of application No. PCT/US2014/010562, filed on Jan. 7, 2014, and a
(Continued)

(51) Int. Cl.
*G01C 3/08* (2006.01)
*G01S 1/70* (2006.01)
(Continued)

(52) U.S. Cl.
CPC .............. *G01S 1/70* (2013.01); *G01C 21/20* (2013.01); *G01S 17/74* (2013.01); *G05D 1/101* (2013.01)

(58) Field of Classification Search
CPC ........... G01S 1/70; G01S 17/74; G05D 1/101; G01C 21/20
(Continued)

(56) References Cited

U.S. PATENT DOCUMENTS 5,552,883 A * 9/1996 Busch-Vishniac ..... G01B 11/26
356/139.03
5,793,483 A 8/1998 Zehnpfennig et al.
(Continued)

FOREIGN PATENT DOCUMENTS

WO WO/2013103275 7/2013
WO WO2014175931 10/2014

OTHER PUBLICATIONS

Bruckner, A.. et al., "A Multi Aperture Approach to Wafer-Level Camera Lenses", "MOEMS and Miniaturized Systems X", Jan. 27, 2011, p. 10 vol. 7930, No. 79300B, Publisher: Proc. of SPIE Photonics W., Published in: US.
(Continued)

*Primary Examiner* — Mark Hellner
(74) *Attorney, Agent, or Firm* — Lathrop & Gage LLP

(57) ABSTRACT

In an embodiment, a guidance system determines a location parameter of an object, and includes: at least one oscillating element located at the object for emitting modulated optical radiation; at least two mutually distinct signal-modifying electro-optical sensors, each of the electro-optical sensors having a detector and a demodulator for generating a demodulated electrical signal in response to detection of at least a portion of the modulated optical radiation; and a processor for determining the location parameter from the demodulated electrical signals. In another embodiment, a guidance system has aberration-corrected imaging and includes: a plurality of electro-optical sensors sharing a field of view and mutually distinctly providing a respective plurality of altered images therefrom; and an image generator module for linearly and non-linearly processing spatial frequency properties of the plurality of altered images to synthesize an aberration-corrected image for the imaging system.

15 Claims, 60 Drawing Sheets

Related U.S. Application Data continuation-in-part of application No. PCT/US2013/020154, filed on Jan. 3, 2013.

(60) Provisional application No. 61/749,764, filed on Jan. 7, 2013, provisional application No. 61/754,853, filed on Jan. 21, 2013, provisional application No. 61/810,849, filed on Apr. 11, 2013, provisional application No. 61/871,426, filed on Aug. 29, 2013, provisional application No. 61/906,289, filed on Nov. 19, 2013, provisional application No. 61/631,389, filed on Jan. 3, 2012, provisional application No. 61/634,421, filed on Feb. 29, 2012, provisional application No. 61/634,936, filed on Mar. 8, 2012, provisional application No. 61/685,866, filed on Mar. 23, 2012, provisional application No. 61/686,728, filed on Apr. 11, 2012, provisional application No. 61/687,885, filed on May 3, 2012, provisional application No. 61/655,740, filed on Jun. 5, 2012, provisional application No. 61/673,098, filed on Jul. 18, 2012, provisional application No. 61/692,540, filed on Aug. 23, 2012, provisional application No. 61/720,550, filed on Oct. 31, 2012, provisional application No. 61/729,045, filed on Nov. 21, 2012.

(51) Int. Cl.
*G05D 1/10* (2006.01)
*G01S 17/74* (2006.01)
*G01C 21/20* (2006.01)

(58) Field of Classification Search
USPC .................................................. 356/4.01
See application file for complete search history.

(56) References Cited

U.S. PATENT DOCUMENTS

| | | | |
|---|---|---|---|
| 6,184,974 B1 | 2/2001 | Neal et al. | |
| 6,363,168 B1 | 3/2002 | Kakuma | |
| 6,653,030 B2 | 11/2003 | Mei et al. | |
| 7,248,407 B2 | 7/2007 | Kwon et al. | |
| 7,256,895 B2 | 8/2007 | Castonguay | |
| 7,295,314 B1 | 11/2007 | Spady et al. | |
| 7,591,557 B2 | 9/2009 | Plummer | |
| 7,639,369 B2 | 12/2009 | Owner-Petersen et al. | |
| 7,769,419 B2 | 8/2010 | Daly | |
| 7,926,942 B2 | 4/2011 | Plummer | |
| 7,959,286 B2 | 6/2011 | Plummer | |
| 8,158,917 B2 | 4/2012 | Li et al. | |
| 8,274,031 B2 | 9/2012 | Nakai | |
| 8,296,096 B2* | 10/2012 | Kirby | G01B 11/002 702/150 |
| 8,451,452 B2 | 5/2013 | Podoleanu et al. | |
| 8,569,680 B2 | 10/2013 | Luke et al. | |
| 8,670,171 B2 | 3/2014 | Martin et al. | |
| 8,749,657 B2 | 6/2014 | Iwane | |
| 8,749,797 B1* | 6/2014 | Granade | G01S 5/163 356/401 |
| 8,822,894 B2 | 9/2014 | Zheng et al. | |
| 9,207,778 B2* | 12/2015 | Lee | G01S 3/783 |
| 9,212,899 B2 | 12/2015 | Johnson et al. | |
| 2003/0193647 A1 | 10/2003 | Neal et al. | |
| 2004/0233461 A1* | 11/2004 | Armstrong | G01C 11/025 356/620 |
| 2005/0007603 A1 | 1/2005 | Arieli et al. | |
| 2005/0249487 A1 | 11/2005 | Gutierrez | |
| 2006/0160250 A1 | 7/2006 | Bonassar et al. | |
| 2007/0122049 A1 | 5/2007 | Dowski, Jr. et al. | |
| 2007/0177011 A1 | 8/2007 | Lewin et al. | |
| 2007/0194207 A1 | 8/2007 | Wirth | |
| 2007/0247638 A1 | 10/2007 | Owner-Petersen et al. | |
| 2009/0032511 A1 | 2/2009 | Adams | |
| 2009/0034088 A1 | 2/2009 | Delaney et al. | |
| 2009/0279107 A1 | 11/2009 | Deliwala et al. | |
| 2010/0045934 A1 | 2/2010 | Neal et al. | |
| 2010/0165134 A1 | 7/2010 | Dowski, Jr. et al. | |
| 2010/0177277 A1 | 7/2010 | Kokonaski et al. | |
| 2010/0241009 A1 | 9/2010 | Petkie | |
| 2010/0302159 A1 | 12/2010 | Findlay et al. | |
| 2012/0022785 A1 | 1/2012 | Dibernardo et al. | |
| 2012/0092543 A1 | 4/2012 | Afshari et al. | |
| 2012/0327287 A1 | 12/2012 | Meyers et al. | |
| 2015/0175161 A1 | 6/2015 | Breed | |
| 2015/0234385 A1 | 8/2015 | Sandin | |

OTHER PUBLICATIONS

Chen, F., et al., "Overview of Three-Dimensional Shape Measurement using Optical Methods", "Optical Engineering", Jan. 2000, pp. 10-22, vol. 39, No. 1, Publisher: Soc'y of Photo-Optical Instrumentation Engineers, Published in: US.

Donaldson, R.R., et al., "Design and Construction of a Large, Vertical Axis Diamond Turning Machine", "Proc. of the SPIE", 1983, pp. 62-67, vol. 433, Publisher: Int'l Soc'y for Optical Engineering, Published in: US.

Gill, D.D., et al., "Design and Manufacturing of Complex Optics: The Dragonfly Eye Optic", "Sandia Report", Jan. 2007, pp. 1-32, Publisher: Sandia Nat'l Laboratories, Published in: US.

Goodman, J.W., "Introduction to Fourier Optics", "Webpage downloaded from Amazon.com Dec. 13, 2011", 1968, Publisher: McGraw-Hill Book Co., New York, N.Y., Published in: US.

Krishnan, G., et al., "Towards a True Spherical Camera", "Human Vision and Electronic Imaging XIV", 2009, p. 1-13, vol. 7240, No. 724002, Publisher: Proc. of SPIE-IS&T Electronic Imaging Keynote Address, Published in: US.

Kurtz, R., et al., "Improving the Accuracy of Surface Metrology", "Optical Engineering", Jul. 2011, pp. 1-6, vol. 50, No. 7, Publisher: Soc'y of Photo-Optical Instrumentation Engineers, Published in: US.

Leroux, C., et al., "Estimation of Centroid Positions with a Matched-Filter Algorithm: Relevance for Aberromertry of the Eye", "Optics Express", Jan. 18, 2010, pp. 1197-1206, vol. 18, No. 2, Publisher: Optical Soc'y of Am., Published in: US.

Levin, A., et al., "Understanding Camera Trade-Offs through a Bayesian Analysis of Light Filed Projections", "Computer Sci. and Artificial Intelligence Laboratory Technical Rep.", Apr. 16, 2008, Publisher: Presented at European Conference on Computer Vision (ECCV) Oct. 2008, Published in: US.

McCall, B., et al., "Fabrication of Plastic Microlens Arrays for Array Microscopy by Diamond Milling Techniques", "Micromachining and Miocrofabrication Process Technology XV—Proc. of SPIE", 2010, pp. 1-10, vol. 7590, No. 75900A, PublisherA, Publisher: Soc'y of Photo-Optical Instrumentation Engineers, Published in: US.

Min, Z., et al., "Coordinate Measurement Method Based on Coding Target", "Sixth Int'l Symp. on Precision Engineering Measurement and Instrumentation", 2010, vol. 7544, No. 754412, Publisher: Proc. of SPIE, Published in: US.

Moylan, S., et al., "Development of a Metrology Frame to Improve the Positioning Accuracy of Micro/Meso-Scale Machine Tools", "Int. J. Mechatronics and Manufacturing Systems", 2009, pp. 600-619, vol. 2, No. 5/6, Publisher: Inderscience Enterprises Ltd., Publisher in: US.

Murata, J., "Pico-Precision Displacement Sensor Using Digital Image Analysis", "Nuclear Sci. Symp. Conf. Rec.", 2005, pp. 675-679, Publisher: IEEE, Publisher in: US.

Neal, David R., et al., "Shack-Hartmann Wavefront Sensor Precision and Accuracy", "Advanced Characterization Tech. for Optical, Semiconductor, and Data Storage Components", 2002, pp. 148-160, vol. 4779, Publisher: Proc. of SPIE.

Scheiding, S., et al., "Freeform Manufacturing of a Microoptical Lens Array on a Steep Curved Substrate by use of a Voice Coil Fast Tool Servo", "Optics Express—Presented at Proc. of Structured and

(56) References Cited

OTHER PUBLICATIONS

Freeform Surfaces 2001 Spring Topical Meeting", Nov. 21, 2011, pp. 23938-23951, vol. 19, No. 24, Publisher: Optical Soc'y of Am., Published in: US.

Topa, D.M., et al., "Optimized Method for Focal Spot Location using Center of Mass Algorithms", "Proc. of SPIE", 2002, pp. 1-14, vol. 4769, No. 14, Publisher: Int'l Soc'y for Optical Engineering, Published in: US.

Vyas, A., et al., "Optimization of Existing Centroiding Algorithms for Shack Hartmann Sensor", "Proc. of the Nat'l Conf. on Innovative Computational Intelligence & Security System", Apr. 4, 2009, pp. 400-405, Published in: US.

Yin, X. et al., "Automatic Detection for Shack-Hartmann Wavefront Senor", "Int'l Conf. on Innovative Computational Intelligence & Security System", Jul. 17, 2009, pp. 1986-1991, Publisher: IEEE/ASME, Published in: SG.

"International Preliminary Report on Patentability re Application No. PCT/US11/51751", Feb. 13, 2012, p. 11 Published in: US.

"International Search Report and Written Opinion re Application No. PCT/US14/10562", Nov. 13, 2014, p. 12 Published in: US.

13733703.6 European Search Report and opinion dated Jan. 13, 2016, 11 pages.

Millioz et al., Short Time Fourier Transform Probability Distribution for Time-Frequency Segmentation. Francis Castanie. 2006, IEEE Signal Processing Society, pp. III-448-III-451, 2006. <hal-00085154>.

U.S. Appl. No. 14/365,498, Non-Final Office Action mailed Apr. 8, 2016, 25 pp.

Lohmann, A., "Space-bandwidth product of optical signals and systems," J. Opt. Soc. Am., vol. 13, No. 3, 470-473 Mar. 1996.

Neifeld, M., "Information, resolution, and space-bandwidth product," Optics Letters, vol. 23, No. 18, 1477-1479, Sep. 15, 1998.

Dardari, D., "Ranging With Ultrawide Bandwidth Signals in Multipath Environments," Proceedings of the IEEE, vol. 97, No. 2, pp. 404-426, Feb. 2009.

Lange, R. "Demodulation pixels in CCD and CMOS technologies for time-of-flight ranging," Sensors, Camera Systems for Scientific, Industrial Applications II, vol. 3965, 2000.

Van Nieuwenhove, D., "Time-of-flight Optical Ranging Sensor Based on a Current Assisted Photonic Demodulator," Proceedings Symposium IEEE/LEOS Benelux Chapter, Eindhoven, 2006.

Khademi, S., "A Sub Pixel Resolution Method," World academy of science, engineering and technology (WASET), 70, pp. 578-581, 2010.

Barbarino, S., et al., "A review of morphing aircraft," Journal of Intelligent Material Systems and Structures, vol. 22, 823-877, Jun. 2011.

Popov, A.V., "Closed-Loop Control Simulations on a Morphing Wing" Journal of Aircraft, vol. 45, No. 5, 1794-1803, Oct. 2008.

Veerman, H.P.J., "Highly Accurate Aircraft In-Flight Wing Deformation Measurements Based on Image Correlation," Advanced In-Flight Measurement Techniques Research Topics in Aerospace, pp. 15-32, 2013.

Kirmse, T., "Development of a multi camera system for flap gap observation in flight testing," 17th SFTE (EC) Symposium, Amsterdam, the Netherlands, Jun. 12-14, 2006.

Valasek, J., et al., "Vision Based Sensor and Navigation System for Autonomous Aerial Refueling," Journal of Guidance, Control, and Dynamics, vol. 28, No. 5, Sep.-Oct. 2005.

Nalpantidis, L., et al., "Stereovision-Based Algorithm for Obstacle Avoidance," LNAI vol. 5928, pp. 195-204, 2009.

PCT Patent Application No. PCT/US2014/10562 International Search Report and Written Opinion dated Nov. 13, 2014.

Notice of Allowance corresponding to U.S. Appl. No. 14/365,498, dated Aug. 22, 2016, 7 pages.

Extended European Search Report for European Patent Application No. EP 14788994, mailed Sep. 21, 2016, 8 pages.

* cited by examiner

5410

| Surf # | Type | Radius | Thick | Material | Semi-Diameter |
|---|---|---|---|---|---|
| OBJ | Standard | infinity | infinity | | Inifinty |
| STO | Standard | infinity | 0.0 | | 0.346500 |
| 2 | Even Asphere | -5.380854 | 2.185744 | Acrylic | 0.350786 |
| 3 | Even Asphere | -3.26959 | 3.955667 | | 1.020203 |
| 4 | Even Asphere | 17.01657 | 2.169088 | Acrylic | 2.720542 |
| 5 | Even Asphere | -7.570378 | 3.743155 | | 2.720542 |
| IMA | | | | | 1.904714 |

5411

| Surf # | 2$^{nd}$-order term | 4$^{th}$-order term | 6$^{th}$-order term |
|---|---|---|---|
| OBJ | | | |
| STO | | | |
| 2 | 0.00 | -0.02199 | 0.247217 |
| 3 | 0.00 | -5.038477E-4 | 4.173317E-3 |
| 4 | 0.00 | -3.475131E-3 | 2.154774E-4 |
| 5 | -0.054575 | -2.19442E-3 | 4.933097E-5 |
| IMA | | | |

| Surf # | Type | Radius | Thick | Material | Semi-Diameter | Conic |
|---|---|---|---|---|---|---|
| STO | Standard | infinity | 5.0 | | 0.1 | |
| 1 | Even Asphere | -9.08654 | 2 | Acrylic | 1.817678 | 0 |
| 2 | Even Asphere | -9.73583 | | | 2.504852 | 0 |

60101

| Surf # | 4th | 6th | 8th | 10th | 12th |
|---|---|---|---|---|---|
| 1 | -7.1483E-3 | -7.943E-4 | 5.31653E-5 | 8.3488E-6 | 0 |
| 2 | -3.6674E-3 | -7.9664E-5 | -2.721E-6 | 7.6028E-7 | 0 |

60200

| Surf # | Type | Radius | Thick | Material | Semi-Diameter | Conic |
|---|---|---|---|---|---|---|
| STO | Standard | infinity | 5.0 | | 0.1 | |
| 1 | Even Asphere | -3.19749 | 2.289 | Acrylic | 1.834167 | -28.74990 |
| 2 | Even Asphere | -3.95781 | | | 2.43182 | -16.01756 |

60201

| Surf # | 4th | 6th | 8th | 10th | 12th |
|---|---|---|---|---|---|
| 1 | 3.5532E-4 | -2.5561E-4 | 2.3189E-4 | -1.302E-5 | -1.5637E-6 |
| 2 | -2.8409E-4 | -1.765E-4 | -4.9708E-6 | 6.9355E-8 | 1.1308E-7 |

FIG. 60

OPTICAL GUIDANCE SYSTEMS AND METHODS USING MUTUALLY DISTINCT SIGNAL-MODIFYING

CROSS-REFERENCE TO RELATED APPLICATIONS

This application is a continuation of International Application No. PCT/US2014/010562 filed Jan. 7, 2014 which claims priority to U.S. Provisional Application Nos. 61/749,764 filed Jan. 7, 2013, 61/754,853 filed Jan. 21, 2013, 61/810,849 filed Apr. 11, 2013, 61/871,426 filed Aug. 29, 2013 and 61/906,289 filed Nov. 19, 2013. This application is also a continuation-in-part of International Application No. PCT/US2013/020154 filed Jan. 3, 2013 which claims priority to U.S. Provisional Application Nos. 61/631,389, filed Jan. 3, 2012, 61/634,421 filed Feb. 29, 2012, 61/634,936 filed Mar. 8, 2012, 61/685,866 filed Mar. 23, 2012, 61/686,728 filed Apr. 11, 2012, 61/687,885 filed May 3, 2012, 61/655,740 filed Jun. 5, 2012, 61/673,098 filed Jul. 18, 2012, 61/692,540 filed Aug. 23, 2012, 61/720,550, filed Oct. 31, 2012, and 61/729,045, filed Nov. 21, 2012. All of the aforementioned applications are incorporated by reference in their entireties.

BACKGROUND

Interest in commercial use of unmanned aerial vehicles (UAVs) for delivering products to customers is growing. In 2013, well-known companies have demonstrated or experimented with UAVs for use as autonomous delivery vehicles. Others have proposed using UAVs for delivering medical supplies and other critical goods in developing countries that lack transportation infrastructure.

These commercial demonstrations of UAVs have relied on GPS navigation systems for guidance. A weakness of this technology is that GPS signals do not reach all delivery locations. Such GPS "dead zones" are typically located near buildings in urban settings where many deliveries are likely to occur.

Lane departure warnings systems are among the driver-assistance features included in late-model automobiles. Prior-art systems use vision-based localization, which is both inefficient and intermittently reliable. They require capturing images using millions of image sensor pixels and computationally demanding image processing to extract lane locations. These image-based systems depend on clear views of lane markings unobstructed by, for example, rain, ice, and fog.

Seeking higher fuel efficiency and increased payload capacity, commercial airlines have investigated wing morphing, which involves dynamically deforming an aircraft's wing shape in response to in-flight conditions. Techniques for measuring wing deformation, such as deflection and torsion, have included post-processing of both monoscopic and stereoscopic images. These systems are computationally inefficient and sensitive to environmental factors such as clouds and rain, which may blur images and hence result in inaccurate measurements. The systems are also bulky if high-resolution cameras are required—especially in stereographic systems that require two cameras.

SUMMARY

In an embodiment, a guidance system determines a location parameter of an object, and includes: at least one oscillating element located at the object for emitting or reflecting modulated optical radiation; at least two mutually distinct signal-modifying electro-optical sensors, each of the electro-optical sensors having a detector and a demodulator for generating a demodulated electrical signal in response to detection of at least a portion of the modulated optical radiation; and a processor for determining the location parameter from the demodulated electrical signals.

In an embodiment, a guidance system has aberration-corrected imaging and includes: a plurality of electro-optical sensors sharing a field of view and mutually distinctly providing a respective plurality of altered images therefrom; and an image generator module for linearly and non-linearly processing spatial frequency properties of the plurality of altered images to synthesize an aberration-corrected image for the imaging system.

BRIEF DESCRIPTION OF THE DRAWINGS

FIG. 54 shows spherical and aspherical components of lens elements shown in FIG. 53, in an embodiment.

FIG. 60 shows optical configurations related to FIG. 59 in a Zemax-type of format, in an embodiment.

DETAILED DESCRIPTION OF THE EMBODIMENTS

WO Patent Application WO2013103725A1 entitled "Coded localization systems, methods and apparatus", filed on Jan. 3, 2013, is hereby incorporated herein by reference in its entirety.

The presence of GPS dead zones is a drawback of GPS-based UAVs, and other systems, especially those used as autonomous delivery vehicles. Disclosed herein are optical guidance systems and methods that may complement or replace GPS navigation to guide the UAV to its destination, for example during the final few hundred meters of its journey. The optical guidance system with mutually distinct signal-modifying sensors and methods disclosed herein are configured with electro-optical sensors for detection of optical radiation. Radio-frequency signals are ever present in populated areas, for example originating from cellular networks or wireless internet. The present optical systems and methods inherently avoid interference from ambient radio-frequency signals, as such signals are not detected by the electro-optical sensors. In the present disclosure, optical radiation is radiation having a carrier frequency in the optical range spanning ultraviolet, visible, and infrared frequencies. Radio-frequency refers to frequencies in the range from about 3 kHz to about 300 GHz. The present system also uses temporal modulation to reject interference at the carrier frequency of the electro-optical sensors.

Herein, "mutually distinct" signal modification refers to signal modification that is mutually distinct such that, for example, the modification of identical or substantially identical signals incident on the sensors produces modified signals mutually distinct from each other. Also herein, mutually distinct signal-modifying sensors are sensors having mutually distinct signal modification. Mathematically, "mutually distinct" may be understood as a degree of how orthogonal the signal modifications are, in either spatial or temporal domains. Herein, the terms "mutually distinct" and "orthogonal" are used interchangeably.

Figure 1:
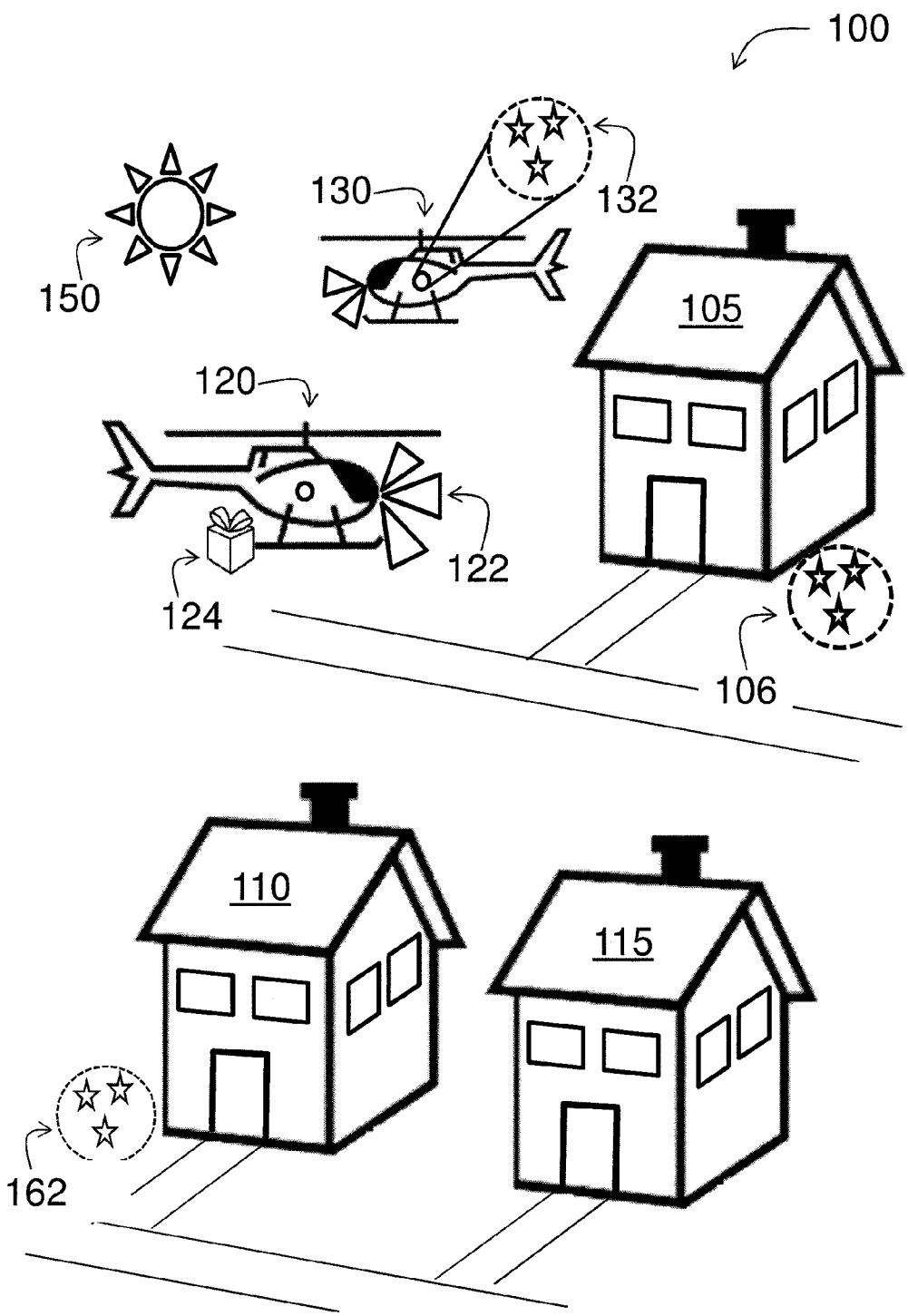
FIG. 1 illustrates a drone-delivery scenario employing an optical guidance system with mutually distinct signal-modifying electro-optical sensors, in an embodiment.

FIG. 1 illustrates a drone-delivery scenario 100 employing an optical guidance system with mutually distinct signal-modifying electro-optical sensors 122 described in more detail below. A drone 120 is tasked with delivering a package 124 to a building 105. Drone 120 utilizes an optical guidance system to perform this task. The optical guidance system includes mutually distinct signal-modifying electro-optical sensors 122 mounted on drone 120, and three oscillating elements 106 located at the delivery area. In the present disclosure, oscillating elements may be transmitters that generate and emit optical radiation, or oscillating elements may be retro-reflectors that reflect a portion of optical radiation from a transmitter located elsewhere. For example, in embodiments where the oscillating elements are retro-reflectors, the transmitter may be located near the electro-optical sensors used to detect the optical radiation. Electro-optical sensors 122 detect optical radiation transmitted by the three oscillating elements 106. Electro-optical sensors 122 include a plurality of sensors for mutually distinctly modifying the detected signals. Based thereupon, the guidance system determines three localization references, provided by oscillating elements 106, and uses these to estimate the location and orientation of the ground surface of the delivery area with respect to package delivery drone 120.

Scenario 100 includes another package delivery drone 130 operating in the same area as package delivery drone 120. Package delivery drone 130 is equipped with oscillating elements 132. Electro-optical sensors 122 of package delivery drone 120 detect optical radiation from oscillating elements 132. The guidance system thereby provides the location and orientation of package delivery drone 130 to package delivery drone 120 for collision avoidance.

Scenario 100 further includes a building 110 having a delivery area with oscillating elements 162. This delivery area is not active since building 110 is not expecting a package to be delivered and is not operating oscillating elements 162. Oscillating elements 162 may be triggered, for example by a homeowner or automatically, with a message from a package delivery tracking system. In the event that multiple deliveries are to be made to nearby locations, for example to delivery areas associated with oscillating elements 162 and 106, the optical radiation provided by oscillating elements 162 and 106 would differ in at least one of modulation, polarization, and wavelength. Further, the optical radiation from oscillating elements 106, 132, and 162 may be modulated, for example at radio-frequency frequencies or higher frequencies, to enable distinction from other radiation. Other radiation includes, for example, sunlight from sun 150, optical radiation from other oscillating elements operating in the area and of no interest to package delivery drone 120, or reflections of optical radiation from oscillating elements off windows in buildings 105, 110, 115. The optical radiation from oscillating elements 106 and/or oscillating elements 162 may be modulated to identify the particular building address. Electro-optical sensors 122 mutually distinctly demodulate a signal associated with received optical radiation to distinguish between different optical radiation signals incident thereon.

Figure 2:
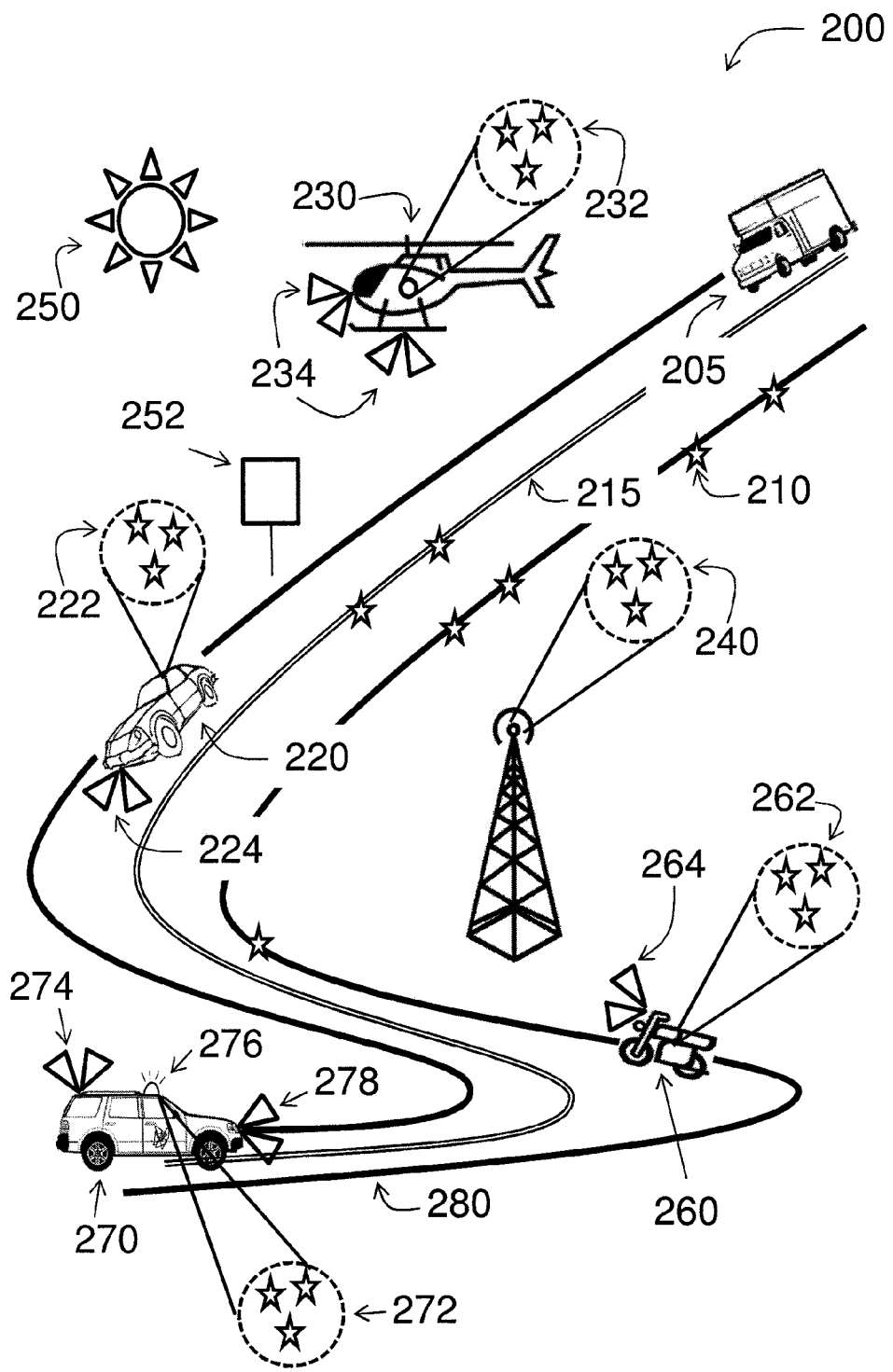
FIG. 2 illustrates an optical guidance system using mutually distinct signal-modifying sensors to provide driver-assisted system for enhancing driver safety, in an embodiment.

FIG. 2 illustrates one exemplary optical guidance system 200 using mutually distinct signal-modifying sensors 224, 234, 264, 274, 278 in a transportation scenario that enhances driver safety. Conventional lane departure warning systems suffer from high-bandwidth demands, which increase system cost, and dependence on unobstructed views of lane markings, which hinders functionality. The optical guidance system of FIG. 2 is insensitive to common lane marking obstructions such as fog or rain.

System 200 includes oscillating elements, for example, active transmitters and passive retro-reflectors 210 along the edges of the roadway 280 and along the centerline 215. Moped 260 is approaching a hill and using sensors 264 to accurately estimate road edge location. Moped 260 also hosts transmitters 262 that make the moped more visible to other vehicles with sensors. Transmitters 262 are configured to communicate with sensors 224 on vehicle 220 for example, so that vehicle 220 may estimate at least one of location, direction, speed, and orientation of moped 260. Similarly, vehicle 220 supports transmitters 222 that moped sensors 264 cooperate with to estimate at least one of location, direction, speed, and orientation of vehicle 220. Truck 205 is moving downhill toward vehicle 220 and moped 260 and has no sensors to see the instrumented roadway and does not benefit from the infrastructure without further assistance through signage or other means.

System 200 also includes a tower with transmitters 240 to provide a global reference that is in a plane different from the plane of the roadway. These transmitters augment the roadway transmitters in times of obscuration such as by snow, dirt, sand and debris on the roadway. Orientation from the tower system may be less precise than orientation from the roadway based systems. Under extreme obscuration, the tower provides at least a low precision estimate of "where is the road?" whereas the roadway sensors, under good conditions, provide high precision information as to "where is the edge of the lane?" Surface conditions may also be estimated based on the performance of roadway sensors, which will degrade under extreme weather conditions based on visible wavelength scattering and obscuration effects.

To provide maintenance to the infrastructure and safety to travelers, an air surveillance vehicle 230 is equipped with sensors 234 that communicate with roadway oscillating elements: transmitters and passive retro-reflectors 210, transmitters 222 and 262 as well as transmitters 272. Transmitters 272 are for example located in the light bar 276 of emergency vehicle 270 and may be modulated in a manner to identify the vehicle as an emergency vehicle. Emergency vehicle 270 also has sensors 274 that look skyward to communicate with transmitters 232 on air surveillance vehicle 230, enabling the maintenance crews to track location and orientation of each other. Sensors 234 and 278 may also communicate with transmitters 222, 210, 262, and 240 to assess the roadway situation and convey messages to active signage 252 to alert oncoming traffic, for example, of truck 205 that may not be equipped with the sensors disclosed herein. Transmitters and sensors are modulated to remove the ambient effects of the sun 250 and reflections off the roadway 280 and other vehicles 220.

In one embodiment, sensors 264, 224, and 278 house active transmitters that provide modulated illumination directed toward the passive retro-reflector sections of 210 along roadway 280 and centerline 215. In another embodiment, sensors 264, 224, and 278 have active transmitters that provide modulated illumination directed toward the passive retro-reflector portions of vehicles such as front, side, and rear reflectors, license plates, and safety tape or markers.

In another embodiment, sensors 264, 224, and 278 also produce aberration-corrected images objects in their respective fields of view, for example, lane markings obscured by rain or fog.

Prior-art imaging systems for measuring aircraft wing deformation suffer drawbacks similar to the lane-detection prior art: demanding computational processing and sensitivity to aberrating media between wings and imaging system. Accordingly, the inventors have developed a dynamic motion measuring system that overcomes these problems.

Figure 3:
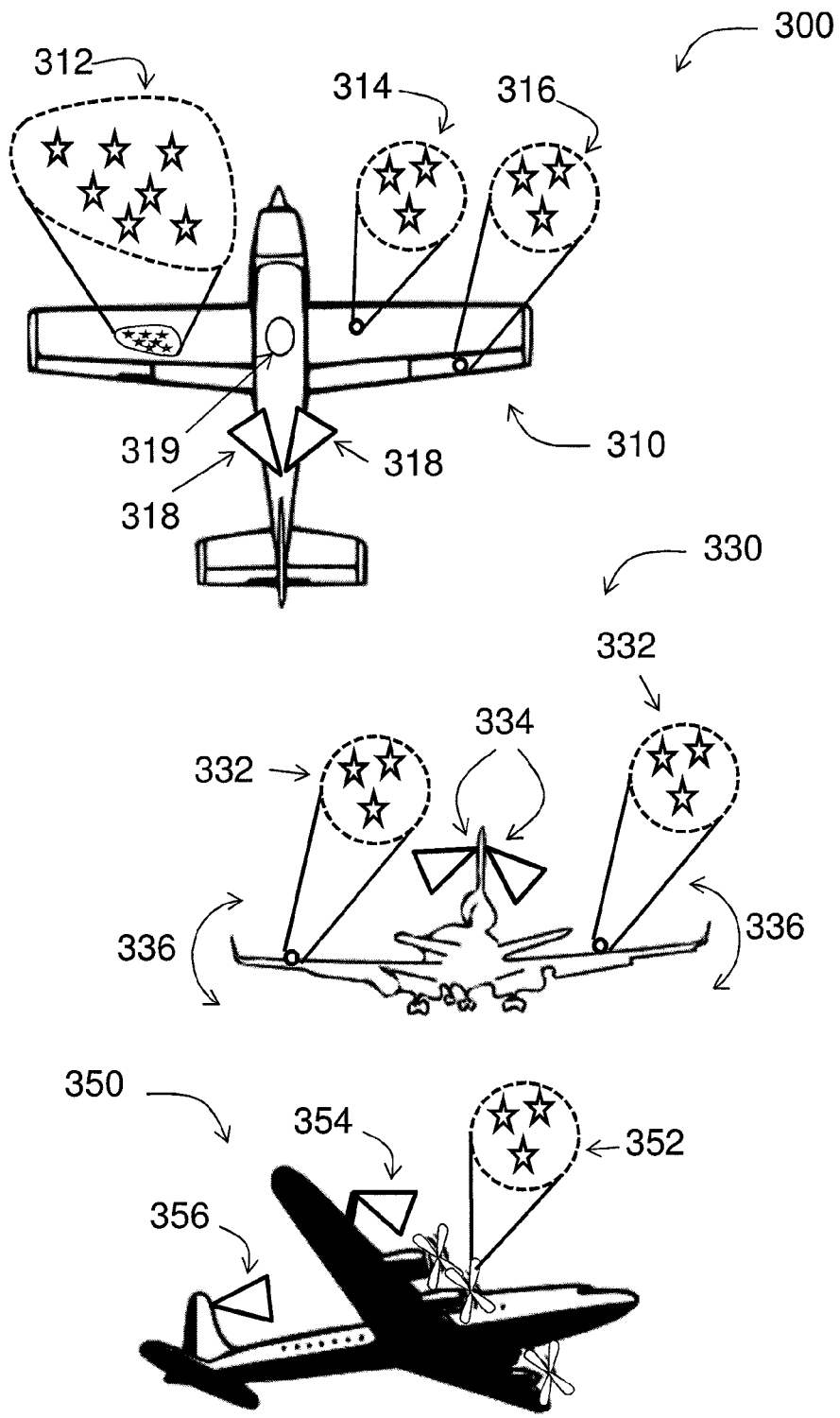
FIG. 3 shows a guidance system for measuring dynamic motion employing mutually distinct signal-modifying electro-optical sensors for measurement of surface profiles of airplane wings, in an embodiment.

FIG. 3 shows a guidance system for measuring dynamic motion employing mutually distinct signal-modifying electro-optical sensors for measurement of surface profiles of airplane wings. System 300 shows airplane 310 using sensors 318 to monitor transmitters 312, 314 and 316. In this embodiment, transmitters 312 are distributed in a field or array to provide high precision surface profile monitoring. Transmitters 314 are positioned on the wing surface to provide wing flex, orientation, attack angle and translation measurements. Transmitters 316 are , for example, on a control surface and provide direct surface angle information. In one embodiment transmitters 316 on a control surface may be used as part of a feedback loop to affect a control mechanism 319. In another embodiment airplane 330 is configured to measure wing flex 336 relative to the sensors 334 during wind shear events by having sensors 334 mounted off the wings and in communication with oscillating elements 332, which could be transmitters or retro-reflectors. In another embodiment airplane 350 contains sensors 354 in communication with retro-reflectors 352, which are positioned on the rotating propeller blade. In this embodiment, the sensor 354 is for example providing a modulated illumination signal that is reflecting off 352 and returning to 354. Sensor 356 is also providing a modulated illumination signal that is reflecting off 352 and returning to 356 and is distinct from the signal from sensor 354 in at least one of modulation, polarization, and wavelength.

Figure 4:
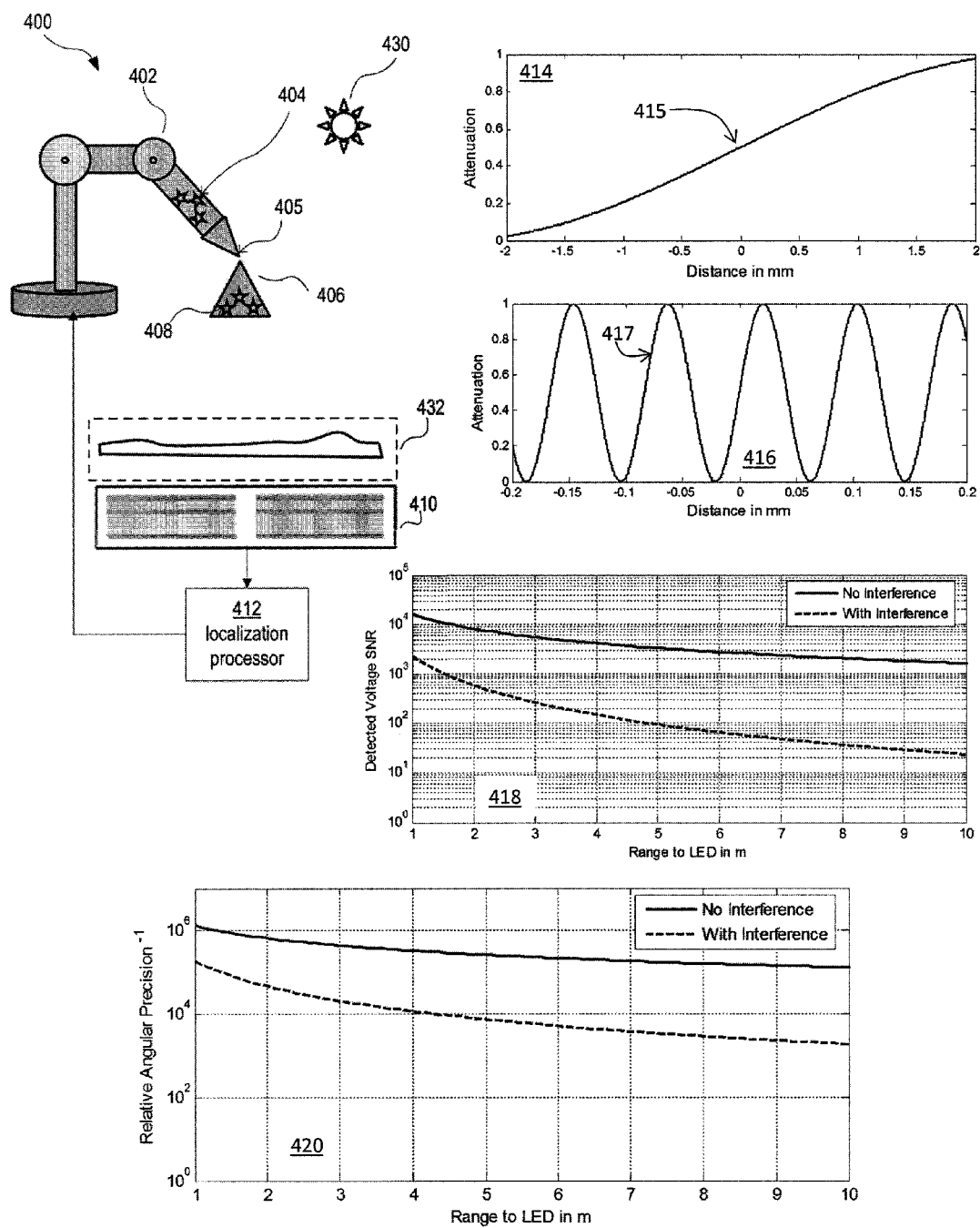
FIG. 4 describes a guidance system employing mutually distinct signal-modifying electro-optical sensors, where a positioner is moving a point to be positioned to a reference object, in an embodiment.

FIG. 4 describes a guidance system 400 with mutually distinct signal-modifying electro-optical sensors. Positioner 402 is moving a point 405 to be positioned to the tip of a reference object 406. Positioner 402 and reference object 406 include oscillating elements 404 and 408, transmitters or retro-reflectors for example, that are detected by sensor array 410 through potentially aberration medium 432. In this embodiment, the oscillating elements 404 and 408 are transmitters, for example LEDs, that transmit mutually-distinct electromagnetic signals to be received by sensor array 410. The potential aberrating medium 432 between sensor array 410 and elements 404,408 acts to reduce the precision of guidance system 400; it is for example a window or cover with optical surfaces that are not flat or transparent to optical quality.

The sensor elements in sensor array 410 include imaging lenses that map the angle of the incident signal transmitted by 404 and 408 to a position on the sensor. One sensor comprising sensor array 410 has sinusoidal intensity response function 415, which has a continuum of grayscale levels over a 4-mm range. The width of the detector in sensor array 410 is 4 mm. A second sensor has a higher-frequency intensity response function 417, which has a continuum of grayscale levels with one period approximately 1/100 of the period of IRF 415. IRF 417 is about 4 mm wide. Therefore, in this example IRF 417 has 100× as many cycles as IRF 415 across the same size detection area. An additional IRF (not shown) is clear, or no grayscale attenuation. This clear channel is the reference channel. Comparison of the detected amplitude levels from IRF 415 and IRF 417 to the clear channel enables both a low and high resolution estimate of angle to the oscillating elements.

The IRF is an amplitude transmission function, for example a position-dependent transmission function. Additionally, one sensor can have an IRF that has no position-dependent transmission function. This channel acts as a reference, or clear channel, if the transmitted intensity or range is not known.

The fields of view of these sensors overlap, and angle of the objects relative to the sensor are determined by localization processor 412 that receives the detected intensities on each sensor array element. Because the sensor array elements include spatially-varying IRFs, measured intensity on each sensor element can be mapped to a position (in the case of sensor element with IRF 415) or number of candidate positions (in the case of sensor element with IRF 417) on the sensor. The sensor with IRF 415 provides a "course" estimate relative object angle, because each intensity value corresponds to one position on the sensor element, which is mapped to a relative angle value. The signal intensity measured by a sensor element with IRF 417 provides more precision—to within the oscillation period. The relative angles can be decoded by comparison to the clear channel, if the transmitted power is not known.

In an example of this embodiment, sensor elements with IRF 415 and IRF 417 each measure an intensity of 0.4, with a single pixel sensor, relative to the incident signal intensity from oscillating elements 404 and 408. (Alternatively, they measure a value of 0.4 relative to the clear channel if the incident signal intensity is not known.) On the sensor element with IRF 416, this means that the signal could have been incident on the sensor at many positions corresponding to where IRF 417 equals 0.4. Localization processor 412 selects among these positions according to the single position on the sensor with IRF 415 such that incident signal would result in a measured relative intensity of 0.4. After computing the relative position between point 4450 and reference object 406, the localization processor employs an iterative feedback algorithm to send instructions to positioner 402 that determines how positioner 402 will next move point 450

Plot 418 shows the signal-to-noise ratio (SNR) of voltage detected by sensor array 410 as a function of its distance to reference object 406. The solid curve and dotted curve show the SNR in the absence and presence, respectively, of ambient light interference 430. By modulating the radiation from the oscillating elements and demodulating the detected signal the effect of the unmodulated ambient light interference 430 on the SNR can be greatly reduced. The majority of the effect of the unmodulated ambient light interference 430 after detection and demodulation is shot noise.

Plot 420 shows the relative angular precision as a function of this distance with and without ambient light interference 430. Relative angular precision is normalized to the guidance system field of view, in degrees. The system 400 has a field of view of ±20 degrees. Plot 420 shows, for example, that at a distance of 4.5 meters from the target point, the relative precision of this guidance system employing mutually distinct signal-modifying electro-optical sensors is better than one part in 10,000 even with strongly interfering signals.

In an embodiment of guidance system 400, aberrating medium 432 is between positioner 402 and point 405. In this embodiment sensor array 410 performs aberration-correcting imaging, as described in FIG. 31 through FIG. 57.

Figure 5:
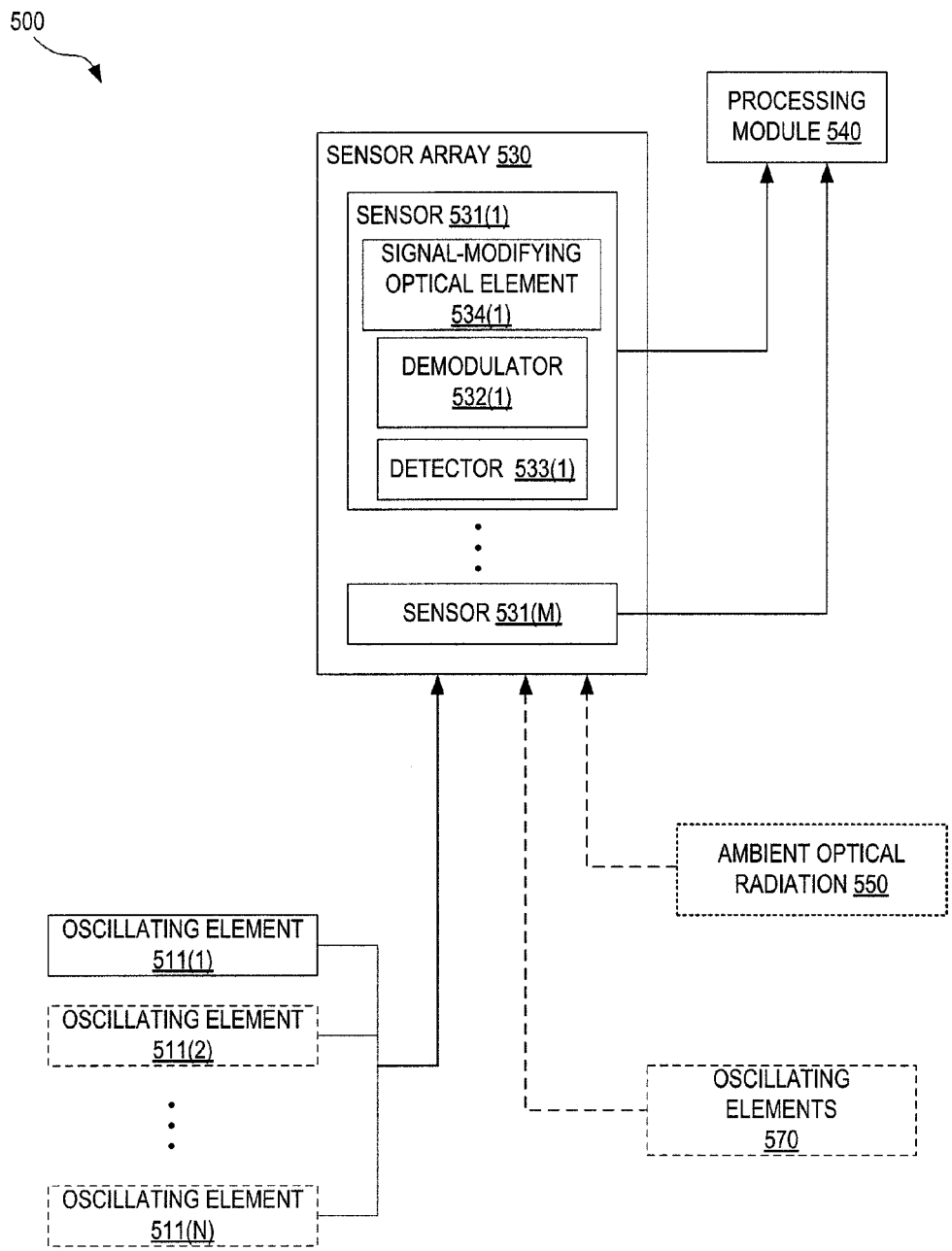
FIG. 5 illustrates an optical guidance system using mutually distinct signal-modifying sensors and oscillating elements, in an embodiment.

FIG. 5 illustrates one exemplary optical guidance system 500 using mutually distinct signal-modifying sensors 531. Optical guidance system 500 includes oscillating elements 511, a sensor array 530, and a processing module 540. Optical guidance system 500 may be implemented in scenarios 100 (FIG. 1), 200 (FIG. 2), 300 (FIG. 3), and/or 400 (FIG. 4). For example, oscillating elements 511 and sensor array 530 may be implemented as oscillating elements 106 (FIG. 1) and electro-optical sensors 122 (FIG. 1), respectively. In another example, oscillating elements 511 and sensor array 530 may be implemented as oscillating elements 210 (FIG. 2) and electro-optical sensors 224 (FIG. 2), respectively.

Oscillating elements 511 include at least oscillating element 511(1) and may further include any number of oscillating elements 511(2) through 511(N). Oscillating elements 511 provide modulated optical radiation. Sensor array 530 includes a plurality of mutually distinct electro-optical sensors 531. Sensor array 530 may further include one or more electro-optical sensors that are not mutually distinct, without departing from the scope hereof. Sensor array 530 may include any number of sensors 531. In an embodiment, sensor array 530 includes at least two sensors 531. Each sensor 531 includes an optical detector 533, for detecting optical radiation, and a demodulator 532 for demodulating a signal associated with the optical radiation to generate a demodulated electrical signal.

Demodulators 532(i) are mutually distinct such that each of sensors 531(i) generates demodulated electrical signals associated with incident optical radiation of different modulation frequencies, including optical radiation emitted by oscillating elements 511. Each of demodulators 532 (532(1), 532(2), . . . , 532(M)) demodulates a signal associated with incident optical radiation using a modulation frequency that is different for any other one of the M demodulators 532. In one embodiment, each demodulator 532 demodulates an electrical signal generated by the corresponding optical detector 533. In another embodiment, each demodulator 532 demodulates optical radiation propagating towards the corresponding optical detector 533.

In certain embodiments, sensors 531 further include mutually distinct signal-modifying optical elements 534, for example those disclosed in WO2013103725A1, incorporated by reference herein in its entirety. Signal-modifying optical elements 534 impose, for example, a change in phase, amplitude, or polarization of incident optical radiation. That is, each of the M signal-modifying optical elements 534 imposes a modification on optical radiation incident thereon that is different for any other one of the M signal-modifying optical elements 534. In an embodiment, signal-modifying optical elements 534 cooperate with demodulators 532 such that sensors 531 impose a combination of (a) demodulation of a signal associated with incident optical radiation and (b) a change in, for example, phase, amplitude or polarization of incident optical radiation. In this embodiment, the demodulated electrical signals produced by demodulators 532 are representative of modifications imposed by both demodulators 532 and signal-modifying optical elements 534.

Processing module 540 is communicatively coupled with sensors 531 to process the demodulated electrical signals received therefrom to determine one or more location parameters of oscillating elements 511. Exemplary location parameters include distances from oscillating elements 511 to sensor array 530, orientation of sensor array 530 with respect to oscillating elements 511, relative location and orientation of sensor array 530 and oscillating elements 511.

In an embodiment, oscillating elements 511 provide optical radiation having a modulation frequency in the radio-frequency (RF) range or higher. In another embodiment, demodulators 532 are configured to demodulate with a signal that matches the modulation frequency of optical radiation of particular interest. For example, the demodulation frequencies and signals of demodulators 532 are configured to match respective modulation frequencies and signals of oscillating elements 511.

In an embodiment, each optical detector 533(i) is a single-pixel photodetector, for example a photodiode. In another embodiment, optical detectors 533 are implemented in a pixel array such that each of optical detectors 533 correspond to a different pixel of the pixel array. The pixel array is, for example, a complementary metal-oxide-semiconductor (CMOS) image sensor or a charge-coupled device (CCD) image sensor.

Sensors 531 may be arranged in any spatial configuration within sensor array 530. In one embodiment, sensors 531 are arranged along a line. In another embodiment, sensors 531 are arranged within a plane but not all lie on the same line, such that sensors 531 define a plane. This embodiment has utility, for example, when the location parameter to be determined includes the three-dimensional orientation of sensor array 530 with respect to one or more oscillating elements 511, or when the location parameter to be determined includes the three-dimensional position of one or more oscillating elements 511 with respect to sensor array 530.

In yet another embodiment, sensors 531 are arranged such that subsets of sensors act on a subset of the field of view (FOV) of the entire system. This embodiment allows a collection of relatively simple and low cost systems to collectively have very wide field of view.

Optionally, optical guidance system 500 is operating in the presence of ambient optical radiation 550, such as light from sun 150 (FIG. 1), and/or additional oscillating elements 570 not of interest to optical guidance system 500, for example oscillating elements 162 (FIG. 1). In an embodiment, demodulators 532 are configured to reject signals associated with ambient optical radiation 550 and oscillating elements 570. For example, oscillating elements 570 are configured to emit optical radiation with modulation frequencies different from those of oscillating elements 511. In another example, oscillating elements 570 are reflections related to oscillating elements 511(1), 511(2), etc. In this case signals from oscillating elements 570 are rejected because their measured range, or temporal phase, are large compared to the measured ranges (phases) of oscillating elements 511(1), 511(2), etc. Typical ambient optical radiation, such as sunlight or street lights, is not modulated and associated signals are therefore rejected by demodulators 532.

In one embodiment, processing module 540 is integrated with sensor array 530. For example, processing module 540 and sensor array 530 may be located on the same circuit board. Processing module 540 may be integrated into one of sensors 531, which then functions as a master with other sensors 531 being slaves. In another embodiment, processing module 540 is separate from sensor array 530. For example, processing module 540 and sensor array 530 share an enclosure, or processing module is located on a separate computer at a distance away from sensor array 530.

Figure 6:
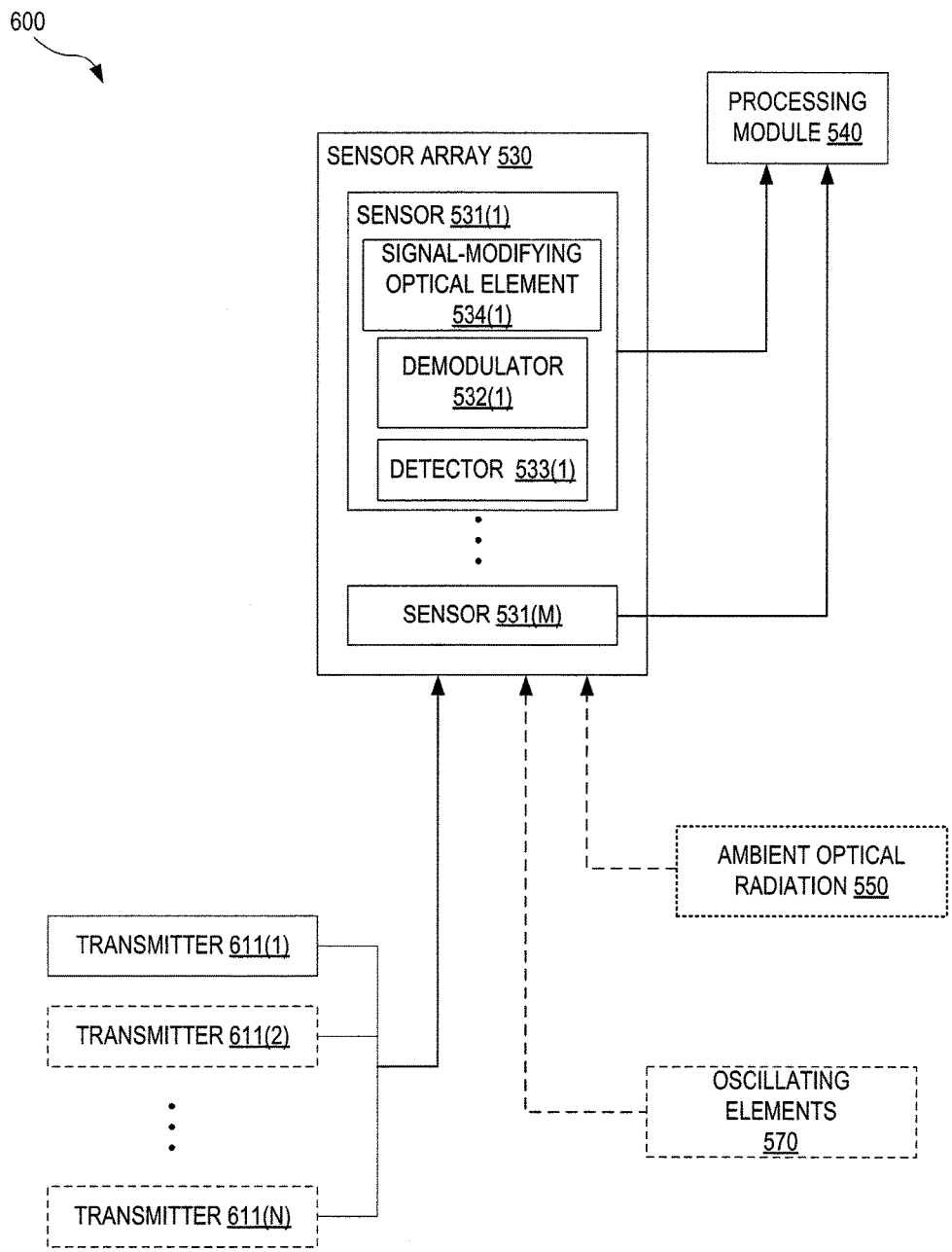
FIG. 6 illustrates an optical guidance system using mutually distinct signal-modifying sensors and transmitters, in an embodiment.

FIG. 6 illustrates one exemplary optical guidance system 600 using transmitters and mutually distinct signal-modifying sensors. Optical guidance system 600 is an embodiment of optical guidance system 500 (FIG. 5). Optical guidance system 600 is identical to optical guidance system 500 (FIG. 5) except that oscillating elements 511 (FIG. 5) are replaced by transmitters 611. Transmitters 611 generate and emit modulated optical radiation. Transmitters 611 are an embodiment of oscillating elements 511.

Figure 7:
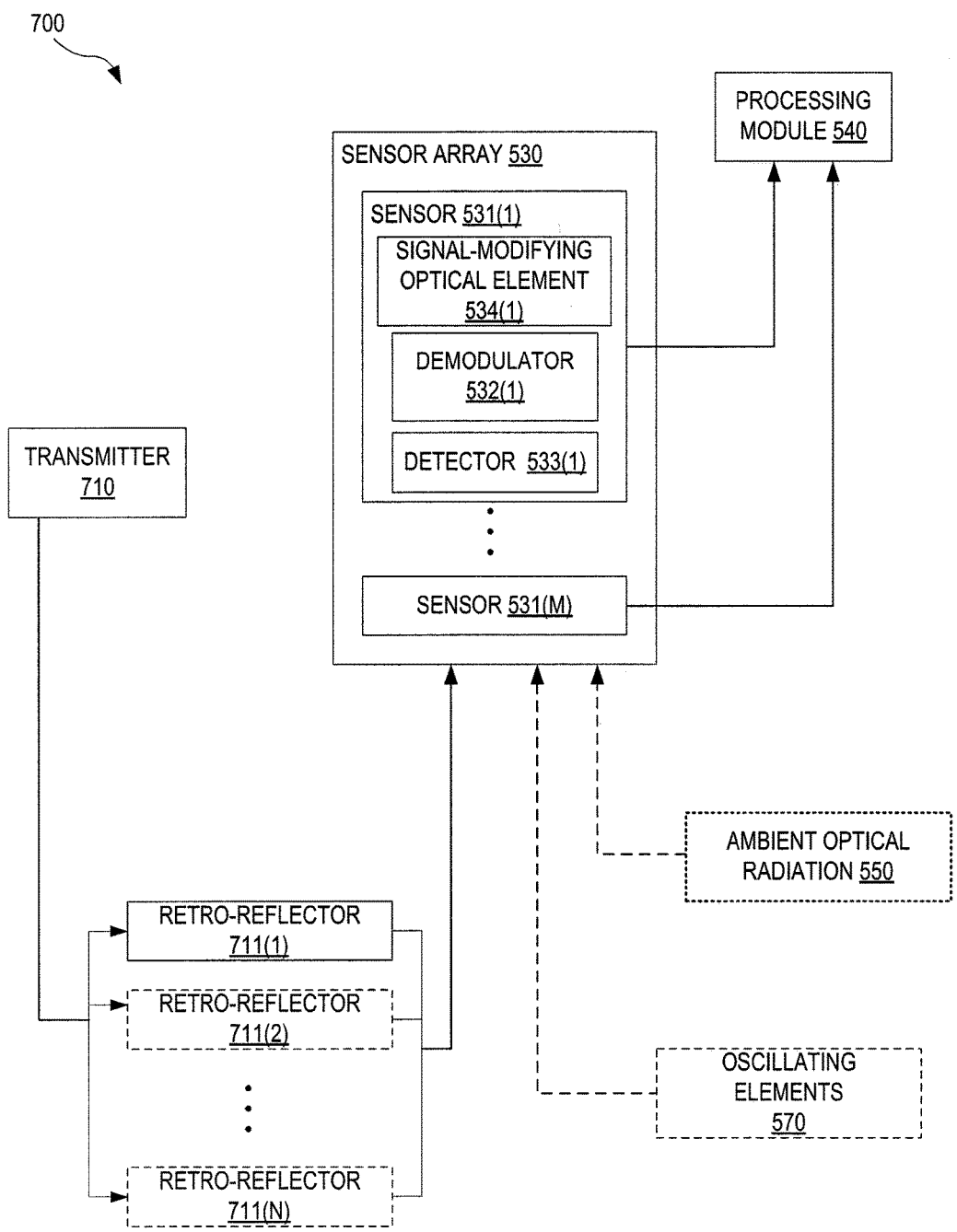
FIG. 7 illustrates an optical guidance system using mutually distinct signal-modifying sensors, transmitters, and retro-reflectors, in an embodiment.

FIG. 7 illustrates one exemplary optical guidance system 700 using retro-reflectors and mutually distinct signal-modifying sensors. Optical guidance system 700 is an embodiment of optical guidance system 500 (FIG. 5). Optical guidance system 700 is identical to optical guidance system 500 (FIG. 5), except that optical guidance system 700 further includes a transmitter 710 and that oscillating elements 511 (FIG. 5) are replaced by retro-reflectors 711. Transmitter 710 generates and emits modulated optical radiation. Retro-reflectors 711 reflect towards sensor array 530 at least a portion of the modulated optical radiation emitted by transmitter 710. Retro-reflectors 711 are an embodiment of oscillating elements 511. In certain embodiments, retro-reflector 711 is located close to sensor array 530. For example, transmitter 711 is integrated with sensor array 530 to minimize the number of separate modules required to form optical guidance system 700. Transmitter 710 may be intermittently steered toward retro reflectors 711(1), 711(2), etc. through MEMS-based mirrors, for example.

Figure 8:
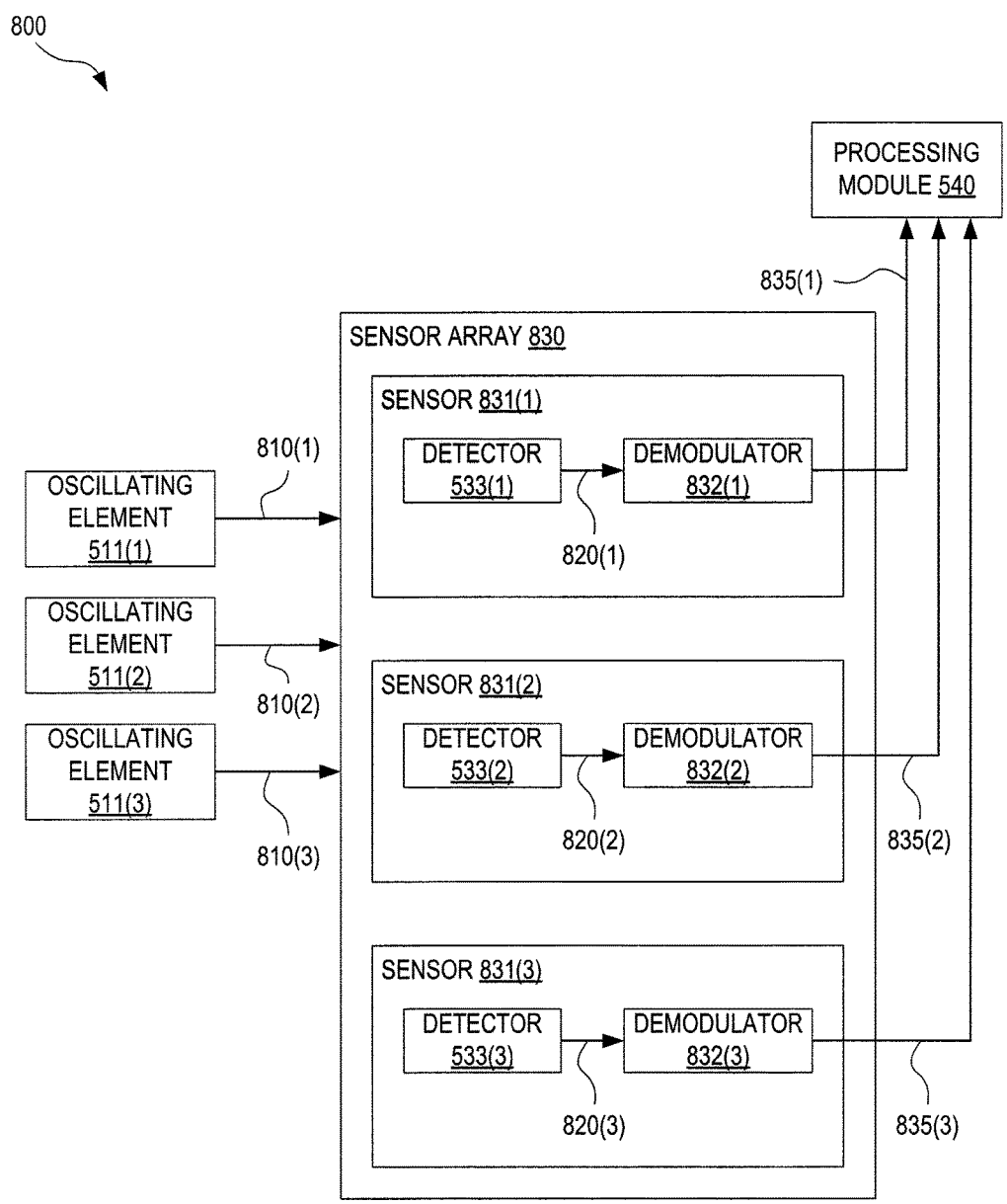
FIG. 8 illustrates an optical guidance system using three mutually distinct signal-modifying sensors and three oscillating elements, in an embodiment.

FIG. 8 illustrates one exemplary optical guidance system 800 using oscillating elements and mutually distinct signal-modifying sensors. Optical guidance system 800 is an embodiment of optical guidance system 500 of FIG. 5. Optical guidance system 800 includes three oscillating elements 511(1), 511(2), and 511(3) (FIG. 5), a sensor array 830, and processing module 540 (FIG. 5). Sensor array 830 is an embodiment of sensor array 530 (FIG. 5). Sensor array 830 includes three mutually distinct signal-modifying electro-optical sensors 831(1), 832(2), and 832(3). Each of sensors 831 is an embodiment of sensor 531 (FIG. 5). Each of sensors 831 includes detector 533 and a demodulator 832 for demodulating an electrical signal generated by detector 533 in response to detection of optical radiation incident thereon. In an embodiment, demodulators 832 include a filter for rejecting higher-frequency components such that the output of demodulator 832 is a lower-frequency signal. Demodulators 832 are embodiments of demodulators 532 (FIG. 5).

Sensor array 830 receives modulated optical radiation 810(1), 810(2), and 810(3) from respective oscillating elements 511(1), 511(2), and 511(3). Each of modulated optical radiation 810(i) may be incident on one, two, or all of detectors 533(i). Modulated optical radiation 810(1), 810(2), and 810(3) have mutually distinct modulation frequencies. In response to incident optical radiation, each detector 533(i) generates an electrical detector signal 820(i), which is communicated to the corresponding demodulator 832(i). Each demodulator 832(i) generates a demodulated electrical signal 835(i). Demodulators 832(1), 832(2), and 832(3) are matched to respective oscillating elements 511(1), 511(2), and 511(3), such that the demodulation frequency of demodulator 832(i) is the same as the modulation frequency of modulated optical radiation 810(i) emitted by oscillating element 511(i). Consequently, demodulator 832(i) will upon detection of modulated optical radiation 810(i) generate demodulated electrical signal 835(i) representative of the modulation phase shift incurred by the modulated optical radiation 810(i) when travelling from oscillating element 511(i) to detector 533(i). Filter 834(i) ensures that signals associated with other oscillating elements 511(j), where i is different from j, are rejected and therefore do not contribute to demodulated electrical signal 835(i).

Processing module 540 processes demodulated electrical signals 835 to calculate, from relative amplitude and phase of the demodulated electrical signals, the distance and relative location between each oscillating element 511(i) and the corresponding detector 533(i). In an embodiment, oscillating elements 511 are arranged in a non-linear configuration, and sensors 831 are arranged in a non-linear configuration. In this embodiment, processing module 540 may, by triangulation, determine the three-dimensional location and three-dimensional orientation of oscillating elements 511 with respect to sensor array 830.

Figure 9:
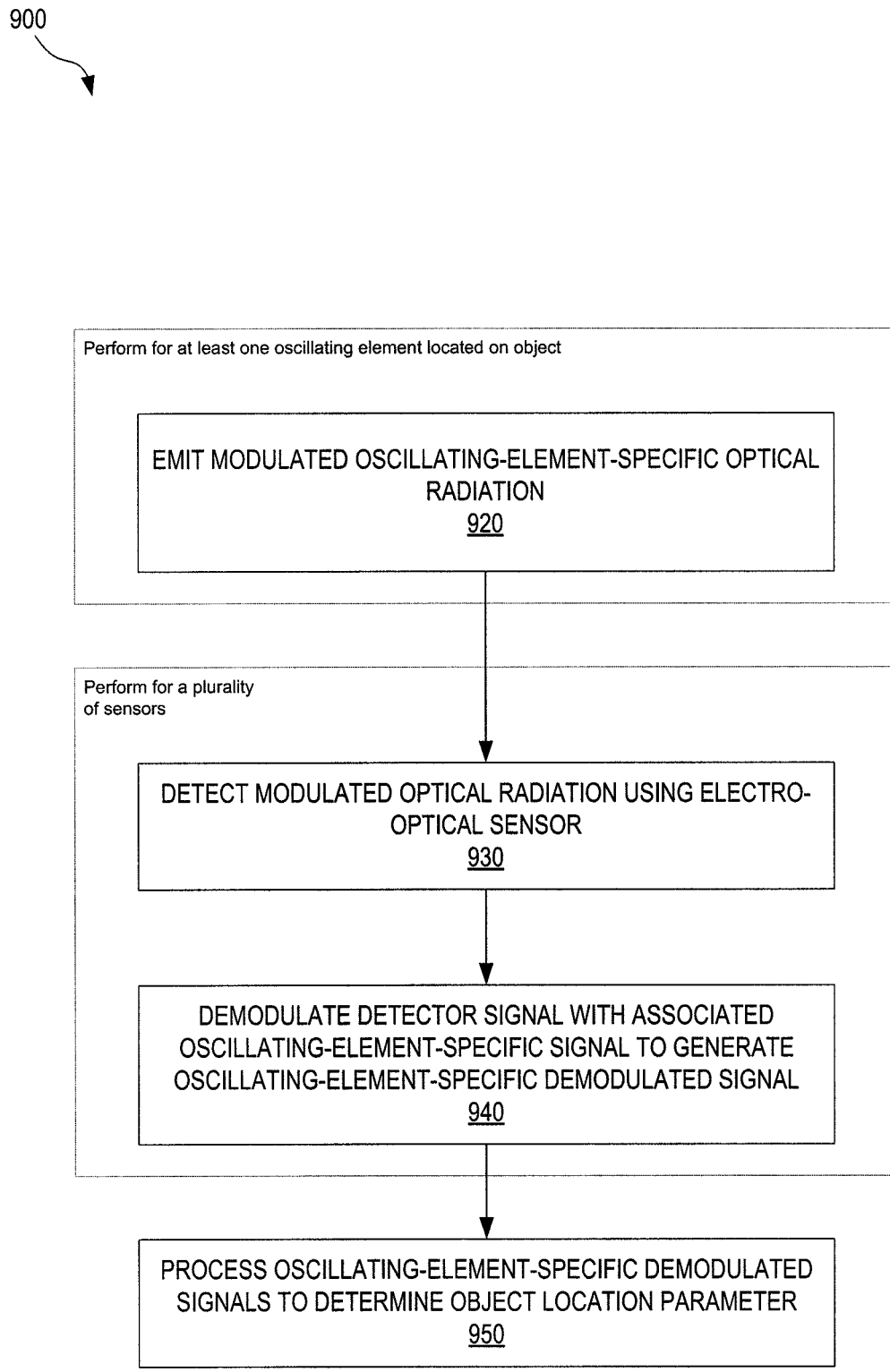
FIG. 9 is a flow chart illustrating an optical guidance method using mutually distinct signal-modifying sensors to determine a location parameter of an object, in an embodiment.

FIG. 9 is a flow chart illustrating one exemplary optical guidance method 900 using mutually distinct signal-modifying sensors to determine a location parameter of an object. Optical guidance method 900 may be performed by optical guidance systems 500 (FIG. 5), 600 (FIG. 6), 700 (FIG. 7), or 800 (FIG. 8). Optical guidance method 900 includes a step 920, to be performed for each of at least one oscillating element located at the object, steps 930 and 940, to be performed for each of a plurality of mutually-distinct signal-modifying electro-optical sensors, and a processing step 950. Optical guidance method 900 is, for example, used in scenario 100 (FIG. 1) to determine a location parameter of oscillating elements 106 with respect to electro-optical sensors 122 mounted on package delivery drone 120.

In step 920, modulated optical radiation is emitted by the oscillating element. The modulation frequency is specific to the particular oscillating element. For example, an oscillating element 511(i) (FIGS. 5 and 8) emits modulated optical radiation 810(i) (FIG. 8).

In step 930, the modulated optical radiation generated in step 920 is detected by a detector associated with one of a plurality of mutually distinct signal-modifying electro-optical sensors. For example, a detector 533(i) (FIGS. 5 and 8) detects modulated optical radiation 810(i) (FIG. 8). In step 940, a detector signal, generated in response to the detection in step 930, is demodulated using a demodulation signal having the same frequency as the modulated optical radiation emitted by a particular one of the at least one oscillating element in step 920. This generates a demodulated electrical signal specific to the particular one of the at least one oscillating element of step 920. For example, a demodulator 832(i) (FIG. 8) demodulates electrical detector signal 820(i) (FIG. 8) to generate demodulated electrical signal 835(i) (FIG. 8).

In step 950, all demodulated electrical signals, specific to particular ones of the at least one oscillating element, are processed to determine a location parameter for the object. For example, processing module 540 (FIGS. 5 and 8) processes demodulated electrical signals 835(1), 835(2), and 835(3) to determine the distance between each oscillating element 511(i) and corresponding detector 833(i), or to determine the three-dimensional location and three-dimensional orientation of oscillating elements 511 (FIGS. 5 and 8) with respect to sensor array 830 (FIG. 8).

Figure 10:
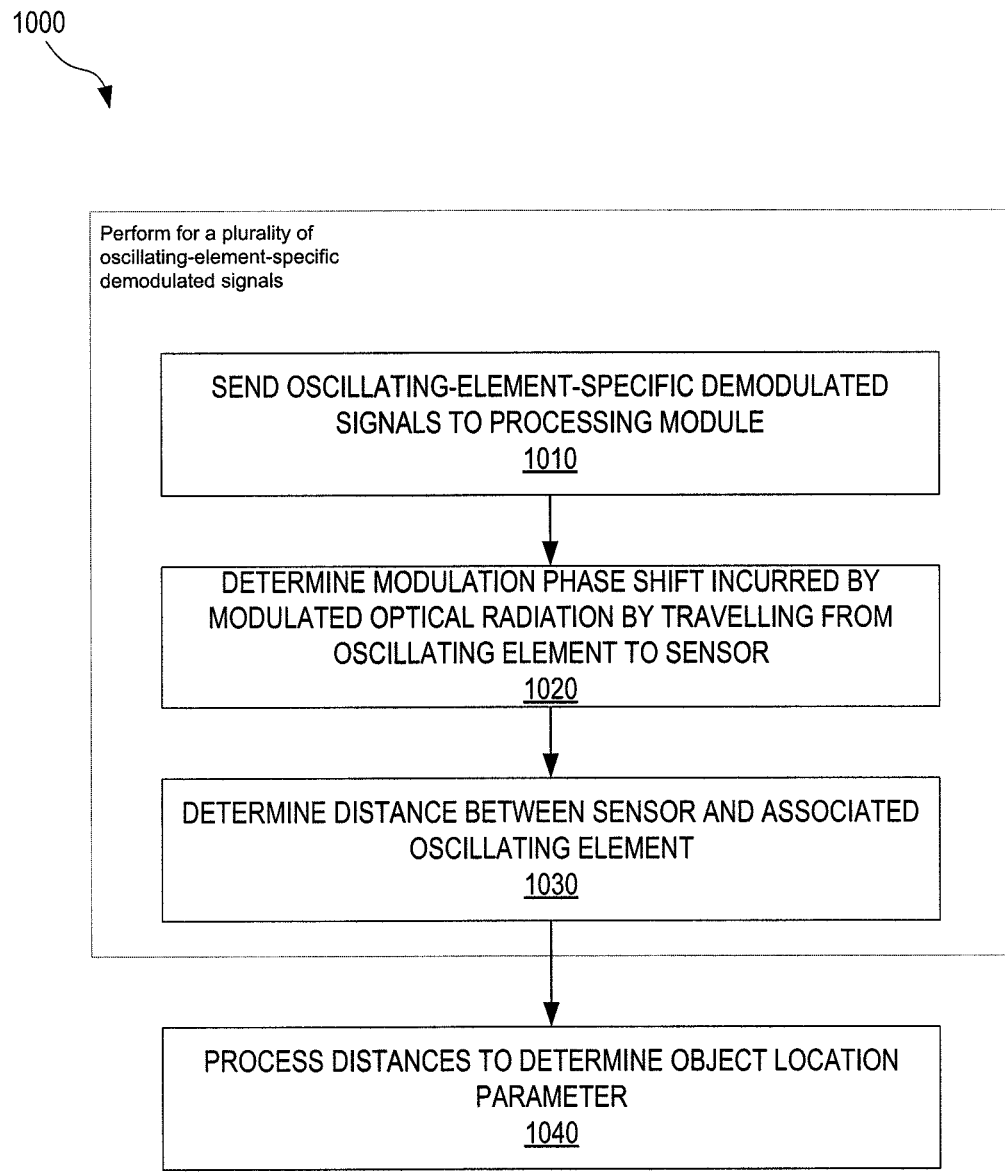
FIG. 10 is a flow chart illustrating a method for processing oscillating-element-specific demodulated signals to determine object location parameter, in an embodiment.

FIG. 10 is a flow chart illustrating one exemplary method 1000 for performing step 950 of method 900 (FIG. 9). Steps 1010, 1020, and 1030 of method 1000 are performed for each demodulated electrical signal generated in step 940 of method 900 (FIG. 9). In step 1040, the demodulated electrical signal is sent to a processing module. For example, a demodulator 832(i) of system 800 (FIG. 8) sends demodulated electrical signal 835(i) (FIG. 8), specific to oscillating element 511(i) (FIGS. 5 and 8) to processing module 540 (FIGS. 5 and 8).

In step 1020, the processing module determines the amplitude and phase shift incurred by the modulated optical radiation when propagating from the oscillating element to the sensor associated therewith. The amplitude will generally be a function of the angle to the oscillating object, relative to the orientation of the electro-optical sensor, while the phase will be a function of the range to the oscillating object. For example, processing module 540 (FIGS. 5 and 8) processes a demodulated electrical signal 835(i) received from demodulator 832(i) (FIG. 8) to determine the amplitude and phase shift incurred by modulated optical radiation 810(i) when travelling from oscillating element 511(i) (FIGS. 5 and 8) to detector 533(i) (FIGS. 5 and 8) or sensor 831(i) (FIG. 8). In step 1030, the processing module processes the amplitude and phase shift, generated in step 1020, to determine the distance between the oscillating element and sensor associated with the demodulated electrical signal. For example, processing module 540 (FIGS. 5 and 8) processes the amplitude and phase shift associated with demodulated electrical signal 835(i) (FIG. 8) to determine the distance from oscillating element 511(i) (FIGS. 5 and 8) to detector 533(i) (FIGS. 5 and 8) or sensor 831(i) (FIG. 8).

The resolution of the distance determination is a function of the modulation frequency. With a modulation frequency of v=20 MHz the wavelength $\lambda$ of this signal is approximately $\lambda=c/v=15$ m, where c is the speed of light. A general rule for distance estimation from coherent phase detection is a distance resolution on the order of $\lambda$/SNR, where SNR is the signal-to-noise ratio. For a modulation frequency of 20 MHz and an SNR of 1000, the range resolution is around 1.5 cm. A modulation frequency of 30 GHz translates to a 10-mm wavelength and distance resolution of about 10 microns with an SNR of 1000. This illustrates a benefit of using an optical carrier frequency for the radiation emitted by the oscillating elements. By using an optical carrier frequency, the modulation frequency may be high. For example, the modulation frequency may be in the upper radio-frequency range (30 GHZ or greater) or even be beyond the radio-frequency range and for instance be a microwave or optical frequency. This enables distance determination at high resolution. This may also, with sufficient resolution, enable depth discrimination in order to avoid interference from optical radiation emitted by the oscillating elements and then reflected off other surfaces before reaching the guidance system. Using method 1000, the optical guidance systems disclosed herein are capable of achieving SNR on the order of thousands to tens of thousands even in the presence of strong interference from other radiation sources, such as sunlight or modulated optical radiation from other oscillating elements.

In a step 1040, the distances determined in step 1030 are processed to determine the object location parameter. For example, processing module 540 (FIGS. 5 and 8) processes distances between oscillating elements 511(i) (FIGS. 5 and 8) and respective sensors 831(i) (FIG. 8) to determine the three-dimensional location and three-dimensional orientation of oscillating elements 511 (FIGS. 5 and 8) with respect to sensor array 830 (FIG. 8). In an embodiment, step 1040 includes correcting for distances between oscillating elements and the object or a particular point within the object. In another embodiment, step 1040 utilizes triangulation for determining the location parameter.

Figure 11:
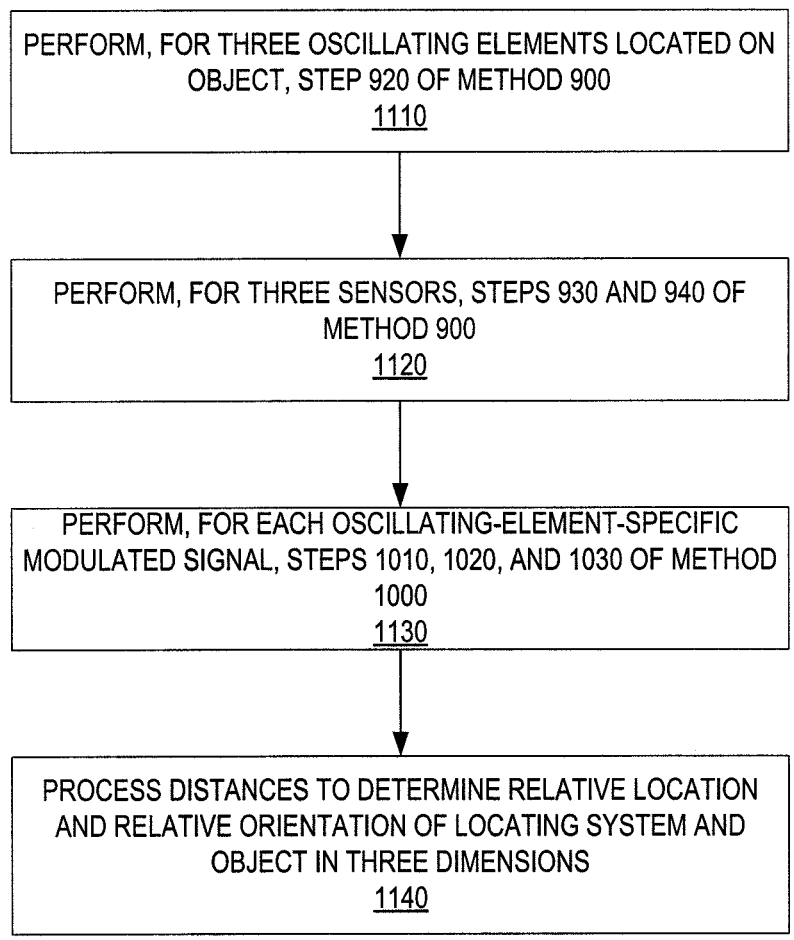
FIG. 11 is a flow chart illustrating an optical guidance method for determining the three-dimensional location and three-dimensional orientation of an object relative to an array of mutually distinct signal-modifying electro-optical sensors, in an embodiment.
Figure 12:
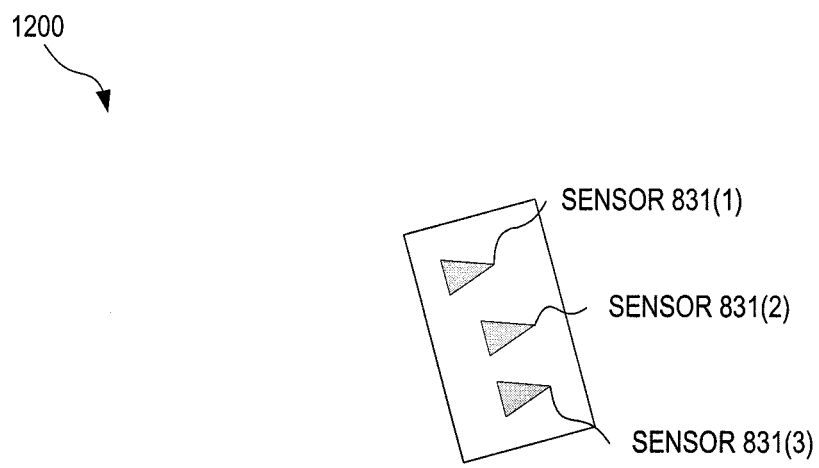
FIG. 12 illustrates sensors and corresponding oscillating elements for an optical guidance system employing mutually distinct signal-modifying electro-optical sensors, in an embodiment.
Figure 12:
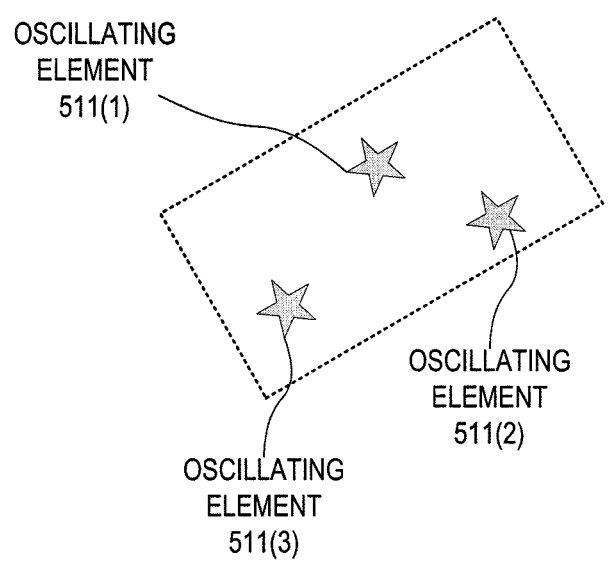

FIG. 11 is a flow chart illustrating one exemplary optical guidance method 1100 for determining the three-dimensional location and three-dimensional orientation of an object relative to an array of mutually distinct signal-modifying electro-optical sensors. Method 1100 is an embodiment of method 900 (FIG. 9), using method 1000 (FIG. 10), tailored for use with optical guidance system 800 (FIG. 8). The object is equipped with three oscillating elements, for example, oscillating elements 511(1), 511(2), and 511(3) of FIG. 8, arranged in a non-linear configuration. The sensor array includes three sensors, for example sensors 831(1), 831(2), and 831(3) of sensor array 830. The sensor array may be arranged as discussed in connection with guidance system 400 (FIG. 4) with three different amplitude vs. angle responses. FIG. 12 illustrates a scenario 1200 representative hereof.

In a step 1110, method 1100 performs step 920 of method 900 (FIG. 9) for each of three oscillating elements located on the object. In a step 1120, method 1100 performs steps 930 and 940 of method 900 (FIG. 9) for each of three electro-optical sensors included in the sensor array. In a step 1130, method 1100 performs steps 1010, 1020, and 1030 of method 1000 (FIG. 10) for each of three demodulated electrical signals generated by a respective one of the three electro-optical sensors. In a step 1140, method 1100 processes the three distances determined in step 1130 to determine the three-dimensional location and three-dimensional orientation with respect to the sensor array.

FIG. 12 shows sensors 831 and corresponding oscillating elements 511 for one exemplary optical guidance system employing mutually distinct signal-modifying electro-optical sensors. In an embodiment, sensors 831 are arranged collinearly. In another embodiment, sensors 831 are not collinearly arranged.

Figure 13:
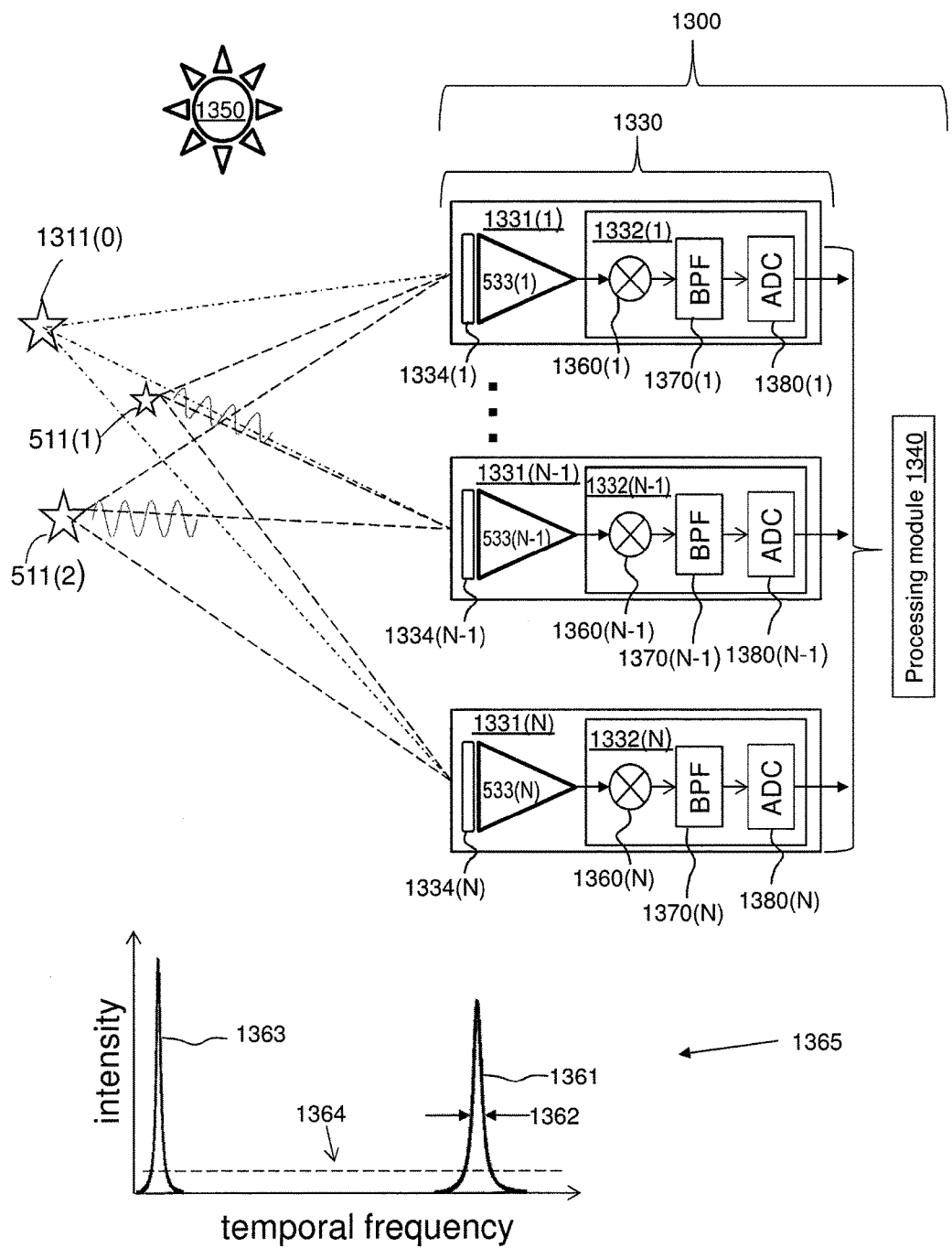
FIG. 13 illustrates an optical guidance system for obtaining location parameter of an object in the presence of ambient noise, and employing mutually distinct signal-modifying electro-optical sensors, in an embodiment.
Figure 14:
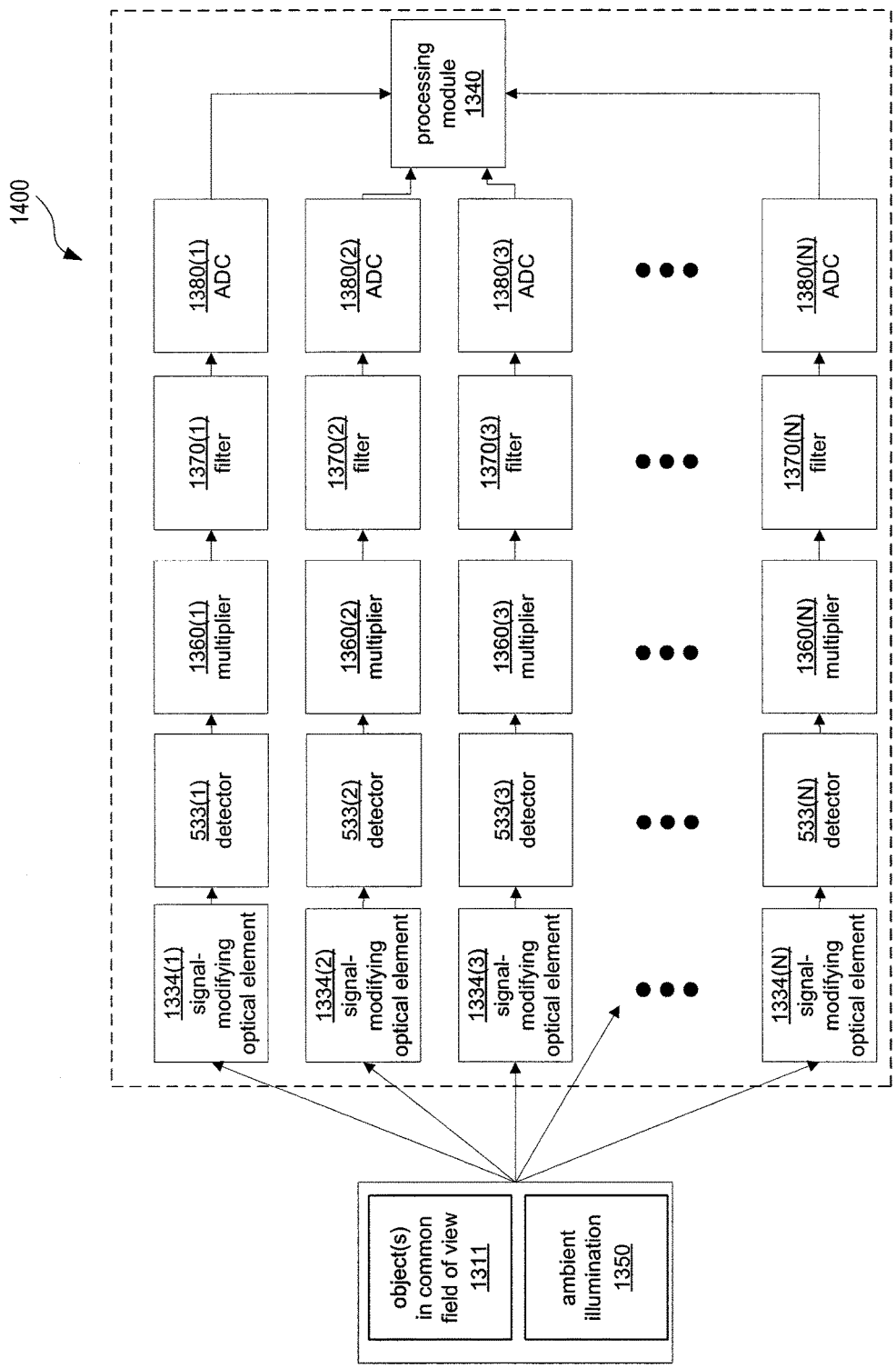
FIG. 14 is FIG. 13 rendered as a system block-diagram.

FIG. 13 and FIG. 14 illustrate exemplary optical guidance system 1300, 1400, respectively, obtaining location parameter of an object in the presence of ambient noise, and employing mutually distinct signal-modifying electro-optical sensors. Optical guidance system 1300 or 1400 is for example an embodiment of optical guidance system 500 (FIG. 5). Optical guidance system 1300 includes oscillating elements 511 (FIG. 5) and a sensor array 1330. Oscillating elements 511 include specific oscillating elements 511(1)

and 511(2). Oscillating element 1311(0) represents a reflection from oscillating element 511(1), and as such is at a farther apparent range than 511(1). Sensor array 1330 includes a plurality of mutually distinct signal-modifying electro-optical sensors 1331, which are embodiments of sensors 531 (FIG. 5). Each sensor 1331($i$) includes a detector 533($i$) (FIG. 5), for detecting modulated optical radiation emitted by oscillating elements 511, and a demodulator 1332($i$) for demodulating an electrical signal generated by detector 533($i$) in response to incident modulated optical radiation. Optionally, sensors 1331 further include signal-modifying optical elements 1334, which are embodiments of signal-modifying optical elements 534 (FIG. 5). Demodulators 1332 are embodiments of demodulators 532 (FIG. 5). Each detector 533($i$) is mutually distinct from other detectors 533($j$) such that the amplitude of each demodulated signal is a function of the specific configuration of the optics and electronics of 533($i$).

Each demodulator 1332($i$) includes multiplier 1360($i$) communicatively coupled with detector 533($i$), filter 1370($i$) communicatively coupled with multiplier 1360($i$), and analog-to-digital converter 1380($i$) communicatively coupled with filter 1370($i$). Each multiplier 1360($i$) multiplies an electrical signal generated by corresponding detector 533($i$), in response to modulated optical radiation incident thereon, with a modulated electrical signal having the same modulation frequency as the modulation frequency of modulated optical radiation emitted by a corresponding one of oscillating elements 511. The multiplied signal generated by multiplier 1360($i$) is filtered by filter 1370($i$) to remove high-frequency components. Filter 1370($i$) thereby rejects signals originating from modulated optical radiation having modulation frequency different from the modulation frequency of the signal used by multiplier 1360($i$). Filter 1370($i$) is for example a bandpass filter or a low-pass filter. Accordingly, multiplier 1360($i$) and filter 1370($i$) cooperate to match sensor 1331($i$) with a particular oscillating element, for example oscillating element 511(1), as discussed in connection with FIG. 8 for an oscillating element 511($i$) and corresponding sensor 831($i$). Analog-to-digital converter 1380($i$) converts analog output of filter 1370($i$) to a digital signal. In an embodiment, this digital signal is an amplitude estimate of the signal received from filter 1370($i$). In another embodiment, the digital signal generated by analog-to-digital converter 1380($i$) includes an estimate of the modulation phase shift incurred by the modulated optical radiation when travelling to detector 533($i$) from corresponding matched oscillating element 511($i$).

The modulation signals of multipliers 1360 may be the same, if the relative physical distances from respective electro-optical sensors 1331 are small compared with the modulation wavelength. The modulation signals of multipliers 1360 may each have a distinct phase if the distance between the electro-optical sensors 1331($i$) is large compared to the modulation wavelength. In this case the different modulation associated with multipliers 1360 are essentially beam forming.

A processing module 1340, which is an embodiment of processing module 540 (FIG. 5), is communicatively coupled with analog-to-digital converters 1380 for processing of digital signals received therefrom to determine one or more location parameters of oscillating elements 511 or an object associated therewith.

In an exemplary use scenario, optical guidance system 1300 operates in the presence of strong ambient optical radiation 1350, such as sunlight. Over a broad range of wavelengths, strong ambient optical radiation 1350 may dramatically influence the measurement precision of oscillating elements 511. To reduce the negative influence of strong ambient illumination, optical guidance system 1300 includes mutually distinct temporal signal modification and mutually distinct spatial signal modification. The temporal signal modification of optical guidance system 1300 is provided by multipliers 1360, which are matched to individual ones of oscillating elements 511. The spatial signal modification of optical guidance system 1300 is provided by signal-modifying optical elements 1334. In this example, signal-modifying elements 1334 may include mutually distinct, spatially varying amplitude transmission functions for enhanced localization capability. In certain embodiments, both spatial and temporal signal-modifying elements are cooperatively configured to reduce the size, weight, power, and cost of optical guidance system 1300 while achieving the highest three-dimensional localization precision of oscillating elements 511.

Chart 1365 illustrates the separation of signals near a center frequency 1361, related to a particular oscillating element 511 such as oscillating element 511(1), from signal 1363 related to strong ambient optical radiation 1350 and shot noise 1364 related to all wanted and unwanted signals sensed by optical guidance system 1300. The modulation scheme utilized by optical guidance system 1300 may be amplitude modulation. Oscillating elements 511 may emit modulated optical radiation that temporally follows a biased sinusoid pattern. Each oscillating element 511 radiates at a different modulation frequency. The demodulation signal associated with multipliers 1360 of demodulators 1332 is purposely set to act as a match filter relative to the radiation of one of the objects. The demodulation signal used by multipliers 1360 is, for example, a sinusoid near the center frequency 1361. Filter 1370 is, for example, a bandpass filter purposely set to the center frequency 1361 with bandwidth 1362. By not being modulated, the majority of the strong ambient illumination spectrum is at DC, far from center frequency 1361. Other sources may exist also outside of the center frequency 1361 and bandwidth 1362 and represent interfering signals as does signal 1363. Through modulation of optical radiation emitted by oscillating elements 511 and subsequent demodulation by demodulators 1332, the influence of these interfering signals is greatly reduced. The main effect of these interfering signals is their addition to shot noise 1364. The shot noise 1364 sampled by analog-to-digital converter 1380 in sensor 1331 may be minimized by minimizing bandwidth 1362.

The effect of oscillating element 1311(0), which is an unwanted reflection from oscillating element 511(1), can be minimized by range discrimination. For example, by changing the frequency of the oscillating elements 511, and corresponding demodulation signals of multipliers 1360, range estimates and range discrimination can be performed. As reflections always appear to be at a larger apparent range, range discrimination may be used to remove the effect of reflections. See FIG. 17 and accompanying text describe discrimination between direct and multi-path signals.

In one embodiment, sensor array 1330 is configured as a collection of isolated single pixels. In another embodiment, sensor array 1330 is configured as an array of pixels similar to a common CMOS pixel array found in, for example, mobile phone cameras and other imaging systems.

Figure 15:
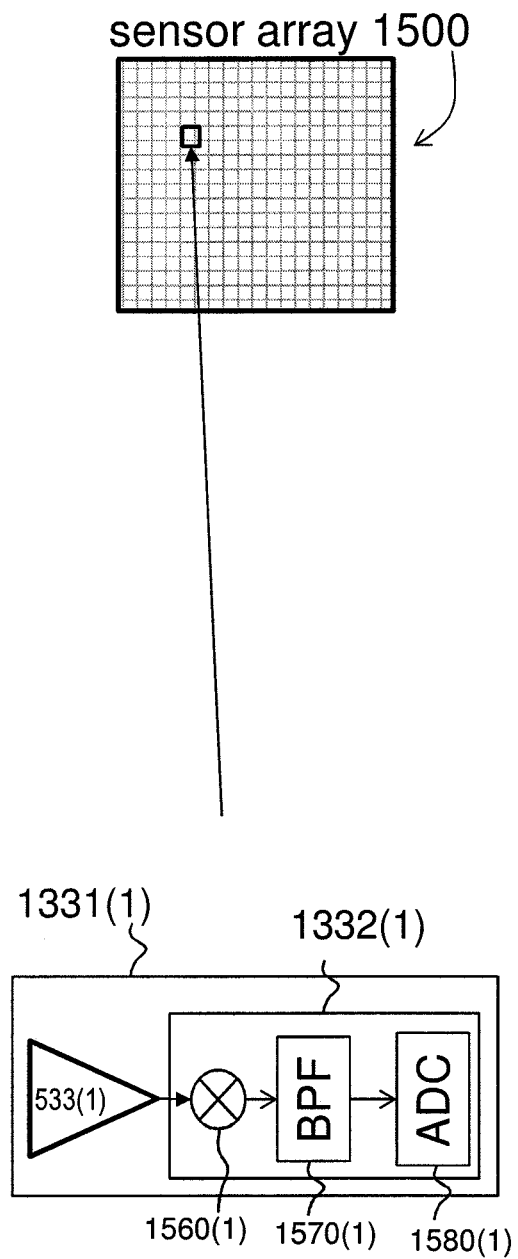
FIG. 15 illustrates an electro-optical sensor array used in optical guidance systems employing mutually distinct signal-modifying electro-optical sensors, in an embodiment.

FIG. 15 illustrates one exemplary electro-optical sensor array 1500 used in optical guidance systems employing mutually distinct signal-modifying electro-optical sensors. Sensor array 1500 is an embodiment of sensor array 1330 of FIG. 13, wherein each of at least a subset of pixels of sensor array 1500 is sensor 1331 of FIG. 13. In this embodiment, sensor 1331 is one component of a parallel analog channel for every pixel of the sensor array 1500. The modulation/demodulation of sensor 1331 is purposely configured to comply with the constraints of CMOS detectors, such as limited area or number of transistors, in order to reduce cost. The demodulation signal used by multiplier 1560 is, for example, a binary signal that is implemented with switched transistors. The phase of the binary switched signal may be varied in order to match that of the transmitted signal, such as through a phase-lock-loop (PLL), quadrature sampling, or known in advance. By demodulating with only the two binary signal values, the demodulation may be implemented with only a very small number of switched transistors per pixel. Filter 1570 may be implemented as part of analog-to-digital converter 1380. Analog-to-digital converter 1580 may be shared among many pixels, i.e., among many sensors 1331, such as a row or column or another collection of multiple pixels. In certain embodiments intended for high-performance, each sensor 1331 has its own analog-to-digital converter 1580. This type of configuration may be readily implemented in backside-illuminated image sensors (BSI), where additional metal layers may be designed for multiplier 1560, filter 1570, and analog-to-digital converter 1580.

Figure 16:
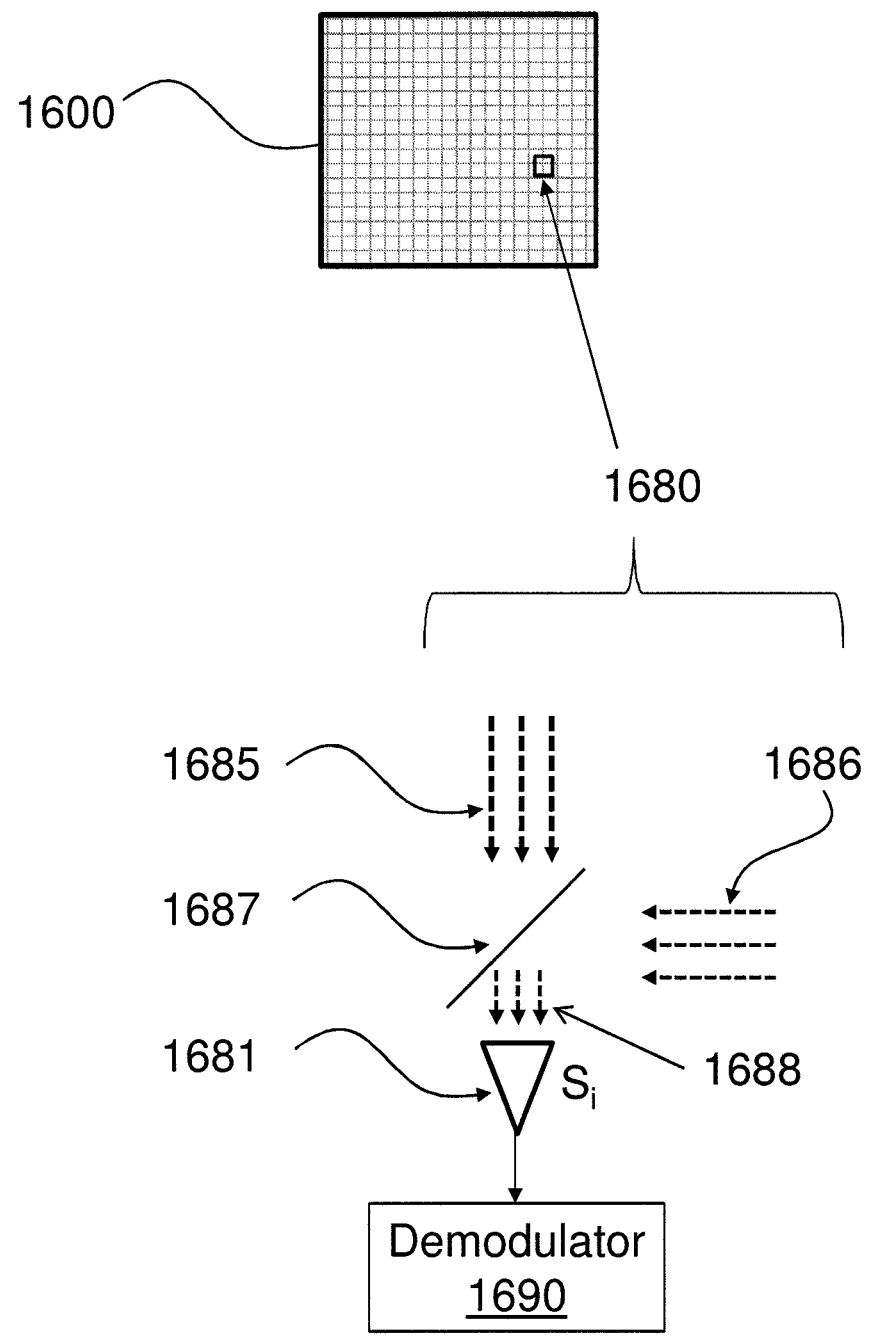
FIG. 16 illustrates an electro-optical sensor array used in optical guidance systems employing mutually distinct signal-modifying electro-optical sensors, where pixel-level optical demodulation occurs, in an embodiment.

FIG. 16 illustrates one exemplary electro-optical sensor array 1600 used in optical guidance systems employing mutually distinct signal-modifying electro-optical sensors. Electro-optical sensor array 1600 may be implemented as sensor array 530 of optical guidance system 500 (FIG. 5). Each of at least a portion of pixels of sensor array 1600 is an electro-optical sensor 1680. Sensor 1680 is an embodiment of sensor 531 (FIG. 5), configured for optical demodulation of incident modulated optical radiation. Sensor array 1600 is therefore of utility in embodiments of optical guidance system 500 (FIG. 5), wherein the modulation frequency of modulated optical radiation emitted by oscillating elements 511 (FIG. 5) is in the optical or THz range.

Sensor 1680 includes an optical beamsplitter 1687, an electro-optical sensor 1681, and a demodulator 1690. Incident modulated THz radiation 1685 interferes with a THz demodulation signal 1686 at beamsplitter 1687 to produce interference signal 1688. Interference signal 1688 has lower frequency than incident modulated THz radiation 1685 and THz demodulation signal 1686. Interference signal 1688 is sampled by an electro-optical sensor 1681 and further processed by a demodulator 1690. Demodulator 1690 may demodulated in the GHz and MHz range. In an embodiment, multiple demodulators 1690 of sensor array 1600 share the same analog-to-digital converter. In another embodiment, each demodulator 1690 has its own analog-to-digital converter.

Figure 17:
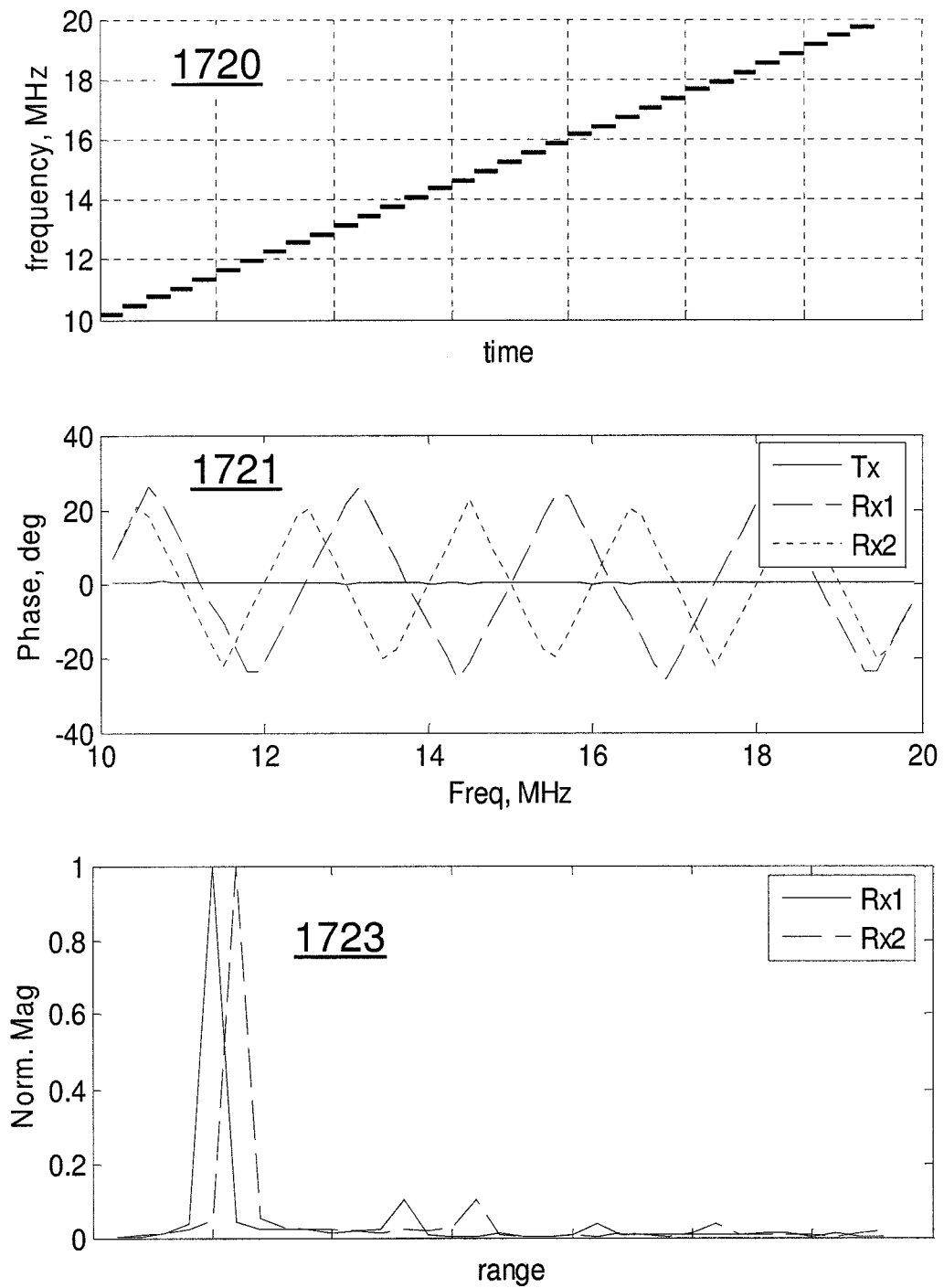
FIG. 17 illustrates an example of use of an optical guidance system employing mutually distinct signal-modifying electro-optical sensors, wherein the emitted modulated optical radiation is stepped-frequency modulated, in an embodiment.

FIG. 17 illustrates an example of use of optical guidance system 700 (FIG. 7) employing mutually distinct signal-modifying electro-optical sensors, wherein the modulated optical radiation emitted by transmitter 710 (FIG. 7) is stepped-frequency modulated. Graph 1720 shows a simulation of stepped-frequency modulation, where modulated optical radiation with a range of modulation frequency steps is emitted by transmitter 710 (FIG. 7). The signal received by a sensor 531 (FIGS. 5 and 7) from a retro-reflector 711 is demodulated by mixing it with the transmit signal of transmitter 710 (FIG. 7) and the angle of the demodulation signal is low pass filtered, resulting in a phase angle estimate 1721.

Demodulation is achieved by multiplying the received signal by the complex signal $\exp(j\omega(t)t+\phi)$ where $\omega(t)$ is the transmit signal angular frequency, t is time, and $\phi$ is the transmit signal phase. Phase angle estimate 1721 is the output of the low pass filter. 1721Rx1 represents the demodulated phase from the desired signal from an oscillating element. 1721Rx2 represents an undesired reflection of optical radiation originating from the same oscillating element. In one embodiment, phase angle estimate 1721 is the mean of the demodulated signal at each transmitted frequency. Phase angle estimate 1721 is Fourier transformed and multiplied by the speed of light to yield distance estimates 1723, for the distance between retro-reflector 711 and sensor 531. 1723Rx1 represents the amplitude of the desired signal from the oscillating element while 1723Rx2 represents the amplitude of the undesired reflection. Range discrimination processing may be used to select the signal with the closest range, thereby rejecting the undesired reflection. The signal processing in this example of use may be applied also in optical guidance systems 500 (FIG. 5), 600 (FIGS. 6), and 800 (FIG. 8), and optical guidance methods 900 (FIGS. 9) and 1000 (FIG. 10).

Figure 18:
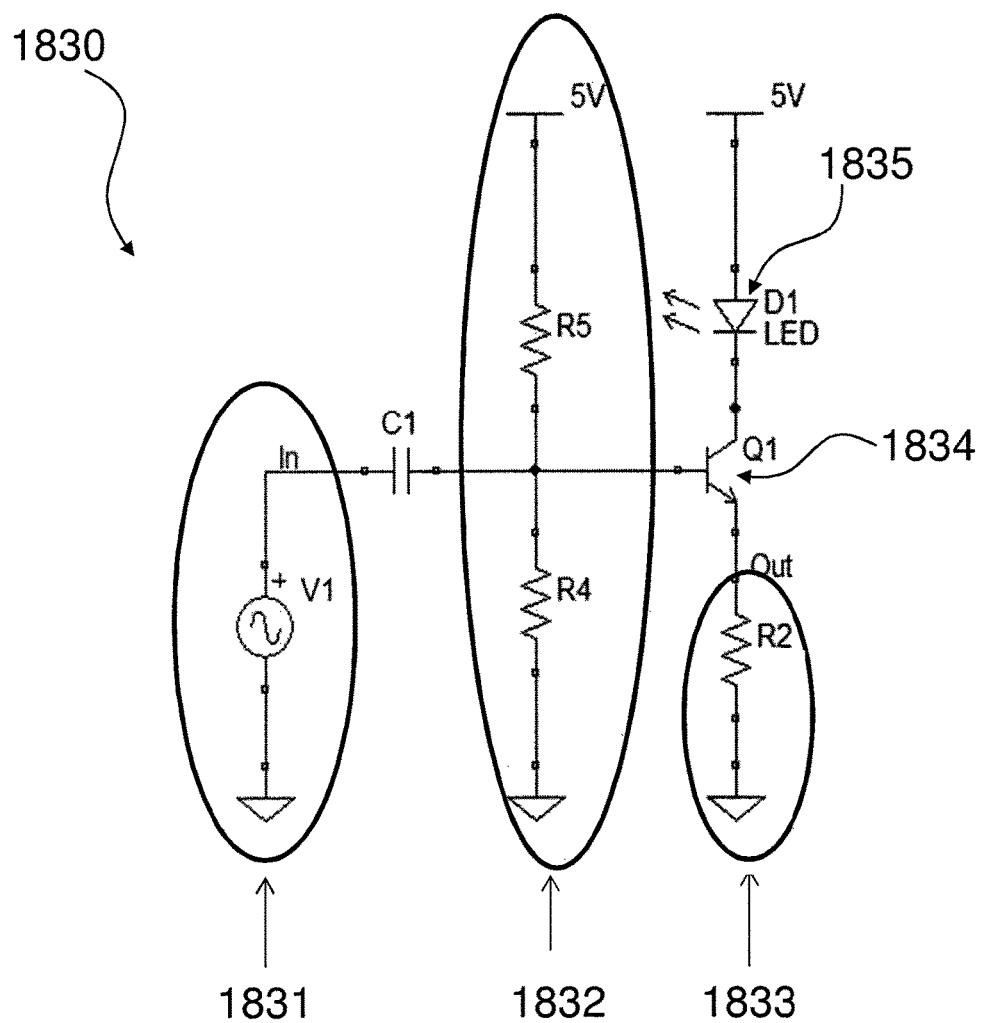
FIG. 18 illustrates embodiments of transmitters with an electro-optical sensor.
Figure 18:
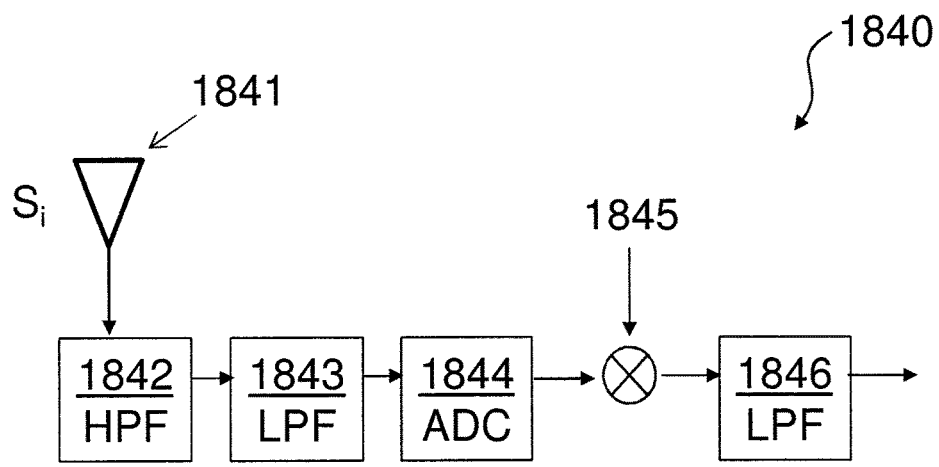

FIG. 18 illustrates one exemplary transmitter 1830, an embodiment of transmitters 611 (FIG. 6) or transmitter 710 (FIG. 7) together with an electro-optical sensor 1740, an embodiment of sensor array 530 (FIG. 5).

Transmitter 1830 includes a signal generator section 1831 communicatively coupled with a biasing section 1832 that is coupled with a transistor 1834, a light-emitting diode (LED) 1835, and a resistor section 1833. LED 1835 emits modulated optical radiation. Signal generator section 1831 provides a zero-mean sinusoid, which is coupled to a biasing section 1832. The output of biasing section 1832 drives transistor 1834 that drives LED 1835. The power output of LED 1835 is limited by the resistor in resistor section 1833, the operating voltage and the conversion efficiency of the LED. Signal generator section 1831 provides the modulating signal, while biasing section 1832 ensures that the voltage to LED 1835 is always positive and therefore the LED is radiating for all parts of the signal.

If the modulation frequency of transmitter 1830 is less than one-half an analog-to-digital digitization frequency, then the corresponding sensor may be sensor 1840. Sensor 1840 includes an electro-optical detector 1841, communicatively coupled with a high pass filter (HPF) 1842 that has pass band gain greater than one. HPF 1842 is communicatively coupled with a low-pass filter (LPF) 1843 that has gain of approximately one in the pass band of the filter and gain much smaller than one in the stop band. HPF 1842 serves to provide gain to high frequencies within the pass band while suppressing DC and low frequency interference. LPF 1843 is communicatively coupled with an analog-to-digital converter (ADC) 1844 that digitizes the band pass filtered modulated signal for digital signal processing. The demodulation in sensor 1840 is then carried out using a software demodulator 1845 and LPF 1846. LPF 1846 is a low pass filter implemented in software, for example, a moving average finite impulse response (FIR) filter.

Figure 19:
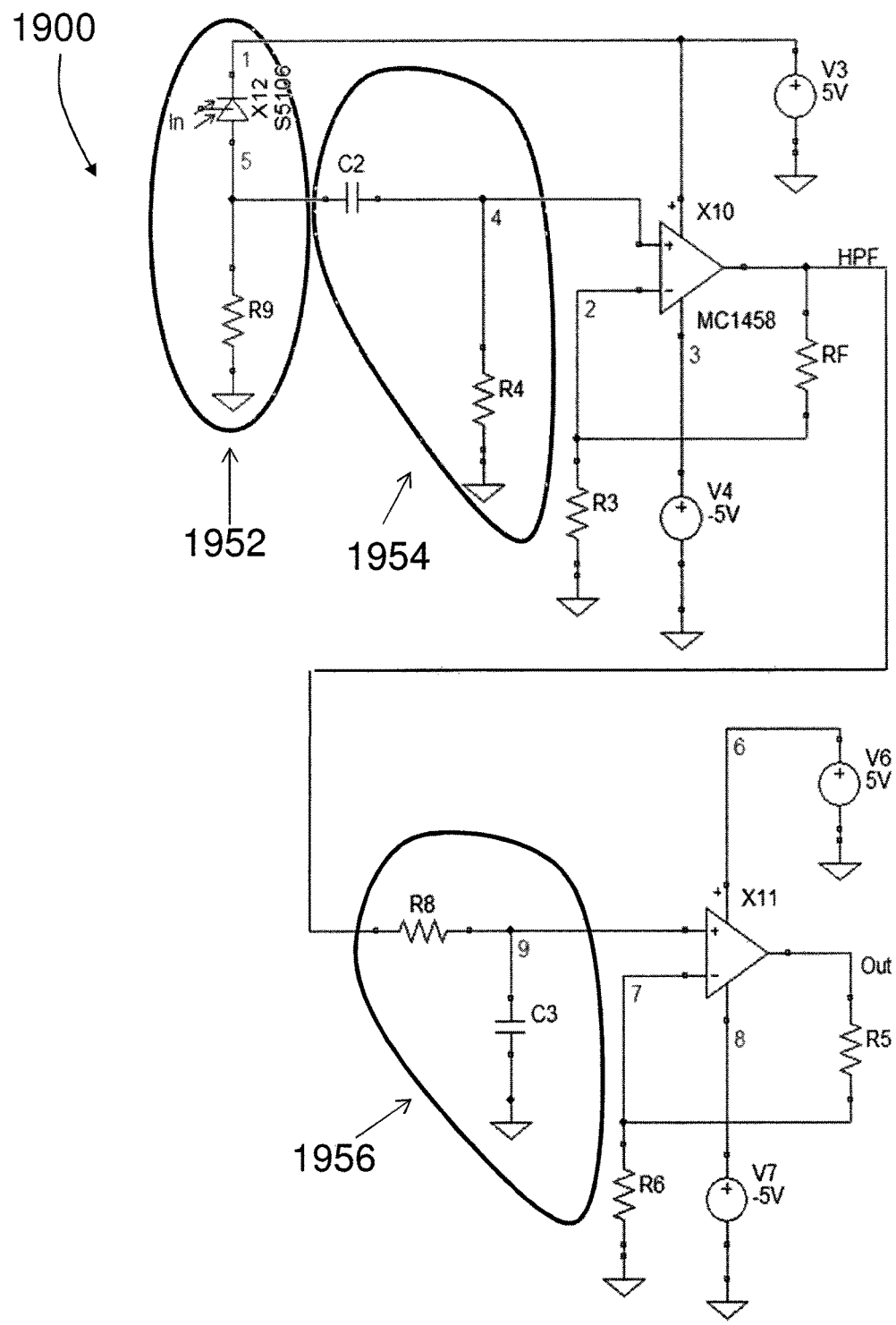
FIG. 19 illustrates one exemplary sensor for a guidance system employing mutually distinct signal-modifying electro-optical sensors, in an embodiment.

FIG. 19 illustrates one exemplary sensor 1900, which is an embodiment of sensor 1840. A photodetector element 1952 includes a photodetector X12 S5106 coupled to a gain resistor R9. Gain resistor R9 is chosen such that $I_{pd} \times R9 \ll V_{supply}$, where $I_{pd}$ is the photodetector current and $V_{supply}$ is for example V3 and V6 in FIG. 19. The photodetector current is generated by at least one of a low-frequency interference optical radiation, for example ambient illumination, and a modulated optical radiation. The resistor R9 serves to convert all photodetector current due to modulated or ambient illumination to a voltage, so a high ambient illumination coupled with a high resistance value R9 will generate a high voltage, possibly high enough to saturate the circuitry. A low value for R9 allows for small amplification of the raw photodetector current, allowing high gains to be applied after processing. A high pass filter section 1954 removes the low frequency interference signal and provides gain to the high frequencies where the gain of the high frequencies is related to the ratio of resistors RF and R3. A low pass section 1956 reduces overall bandwidth and noise while providing near unity gain in the pass band. The combination of high pass filter section 1954 and low pass filter section 1956 provide a band pass filter function. While the filters shown are active filters, passive RC filters may be employed in stages where gain greater than one is not required. The cutoff frequencies are determined by the RC combination in each of filter sections 1954 and 1956, where $f_c=1/(2\pi \cdot R4 \cdot C2)$ for high pass filter section 1954 and $f_c=1/(2\pi \cdot R8 \cdot C3)$ for low pass filter section 1956. In an embodiment, this modulated signal is digitized, and demodulation of the digitized signal occurs in software.

Figure 20:
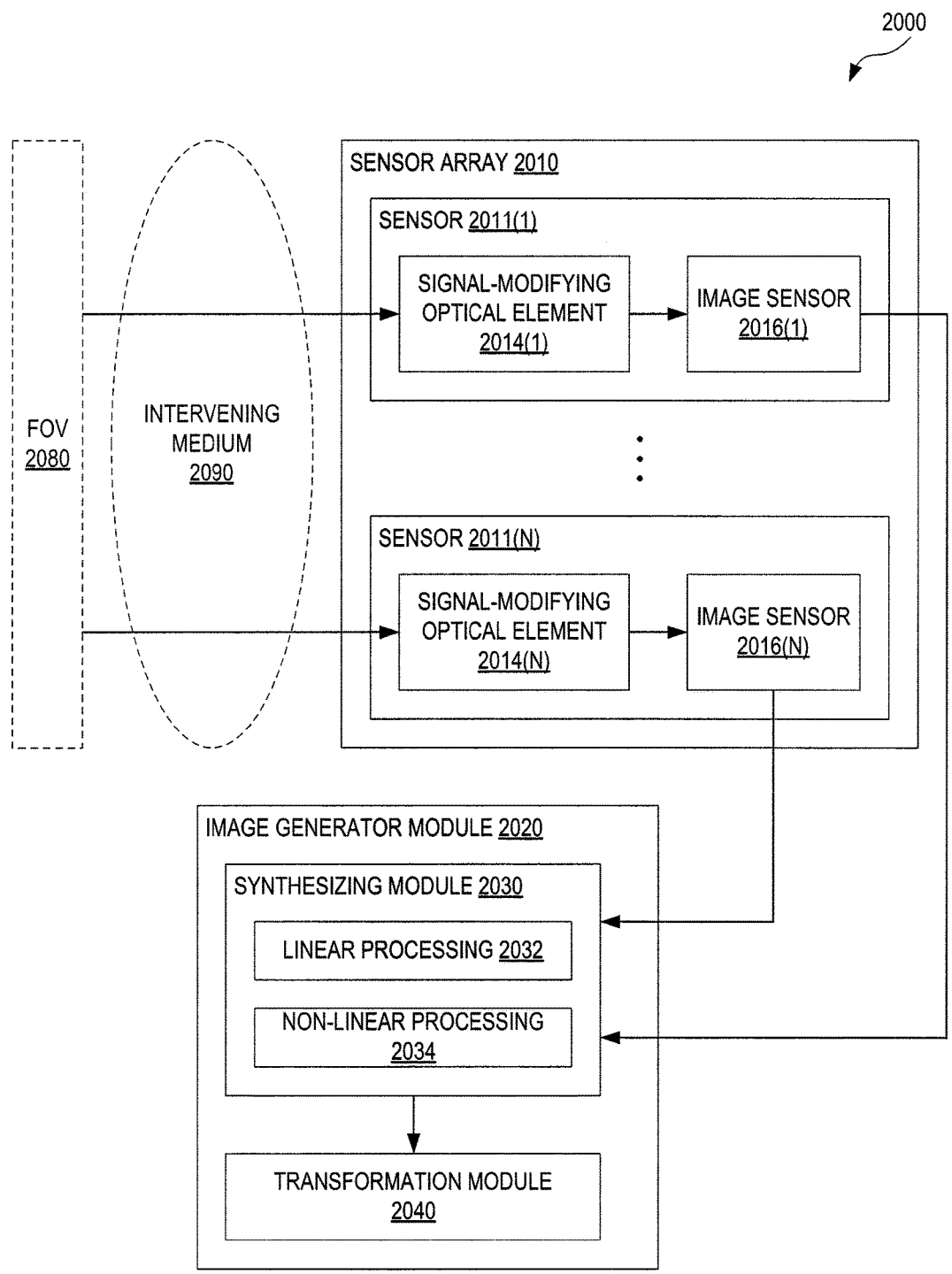
FIG. 20 illustrates an exemplary optical guidance system with mutually distinct signal-modifying sensors with a common field of view, in an embodiment.

FIG. 20 illustrates one exemplary optical guidance system 2000 with mutually distinct signal-modifying sensors. Sensor array 2010 includes a quantity N electro-optical sensors 2011 that have a common field of view (FOV) 2080. Intervening medium 2090 may exist between objects in the FOV 2080 and sensor array 2010. Intervening medium 2090 introduces aberrations to the images of objects in FOV 2080 that guidance system 2000 is capable of correcting.

Each electro-optical sensor 2011($i$) includes a signal-modifying element 2014($i$). Signal-modifying optical elements 2014 are mutually distinct from each other. That is, each of the N signal-modifying optical elements 2014 imposes a modification on the optical radiation incident on it that is different for each of the N signal-modifying optical elements 2014. A signal-modifying optical element may, for example, change the phase, amplitude, or polarization of the incident optical radiation in a spatially-dependent manner.

Signal-modifying optical elements 2014 may also be present in embodiments of guidance systems that impose mutually distinct temporal modifications on signals using sensors 531($i$) (FIG. 5). These systems include system 500 (FIG. 5), system 600 (FIG. 6), system 700 (FIG. 7), and system 1400 (FIG. 14).

Each electro-optical sensor 2011($i$) also includes an image sensor 2016($i$). In an embodiment, each of the N image sensors 2016 is a separate image sensor module. In a different embodiment, each of the N image sensors 2016 are implemented as a region of pixels on an image sensor module, where each electro-optical sensor 2011($i$) images to a different region of pixels on the image sensor module pixel array.

Image generator module 2020 receives the signals generated by image sensors 2011 in response to optical radiation incident thereon. Image generator module 2020 includes a synthesizing module 2030. Image generator module 2020 includes a linear processing module 2032 and a non-linear processing module 2034 for linearly and non-linearly, respectively, processing of signals received from sensor array 2010. Transformation module 2040 is communicatively coupled with synthesizing module 2030 and transforms a signal received therefrom to determine an aberration corrected image or a related parameter. For example, transformation module 2040 may determine a parameter for an object within FOV 2080, such as its location or orientation.

Figure 21:
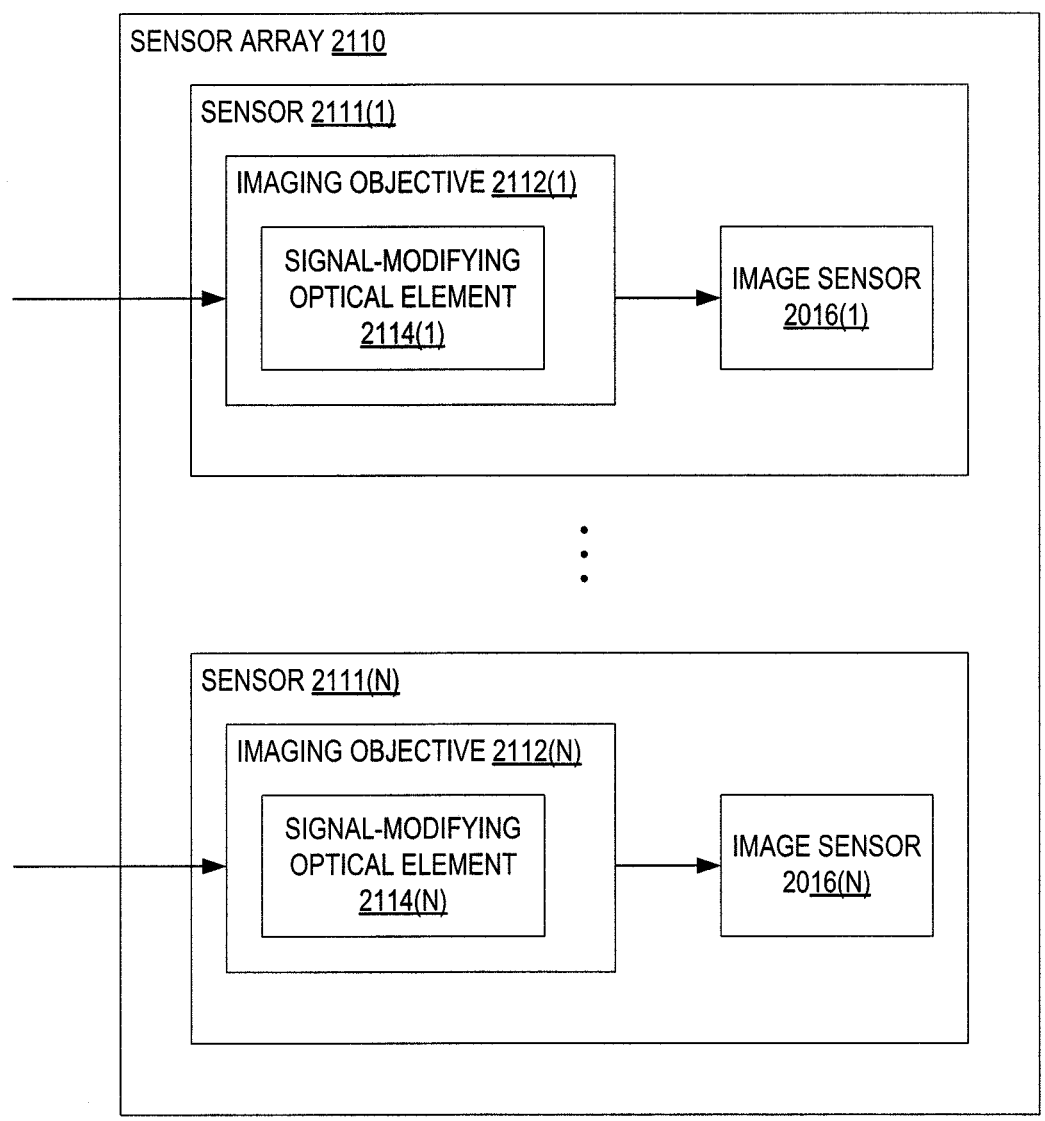
FIG. 21 shows an embodiment of a sensor array with a signal-modifying element as part of an imaging objective.

FIG. 21 illustrates one exemplary sensor array 2110, which is an embodiment of sensor array 2010 (FIG. 20). Sensor array 2110 includes N sensors 2111, where respective signal-modifying elements 2114 are incorporated into the respective imaging objectives 2112.

Figure 22:
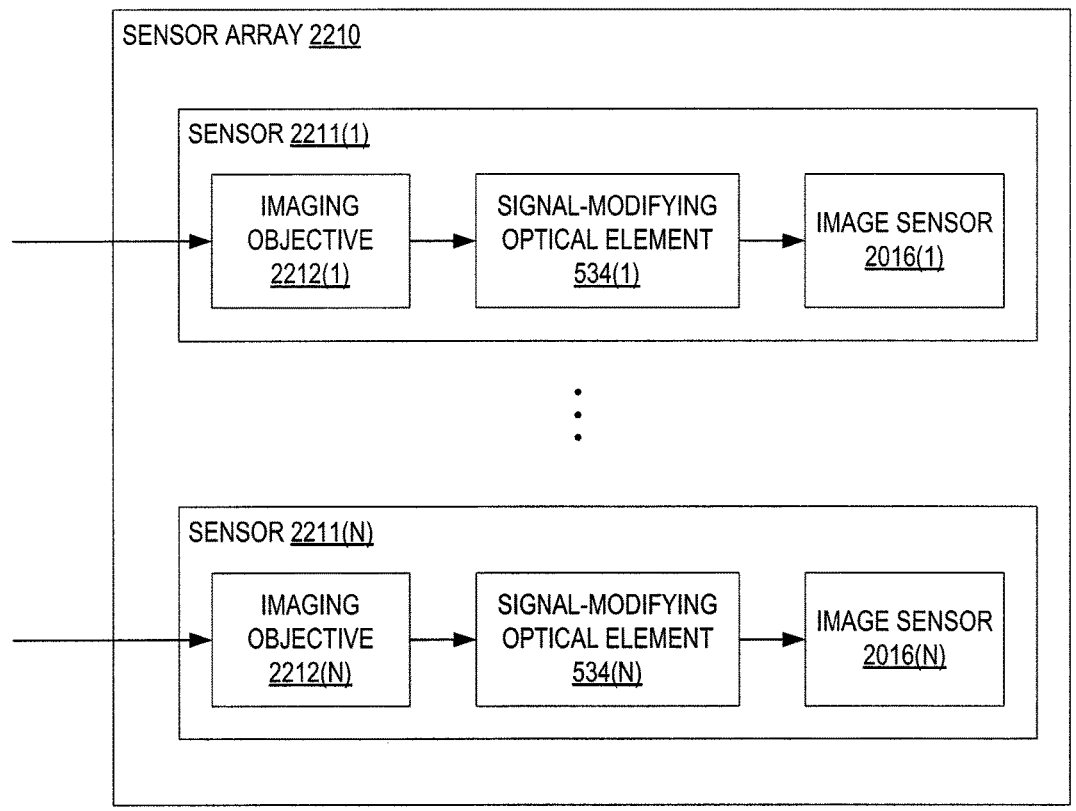
FIG. 22 shows an embodiment of a sensor array with a signal-modifying element a distinct element from an imaging objective.

FIG. 22 illustrates one exemplary sensor array 2210, which is an embodiment of sensor array 2010 (FIG. 20). Sensor array 2210 includes N sensors 2211, where respective signal-modifying elements 2214 imaging objectives 2212 are separate sensor components.

Figure 23:
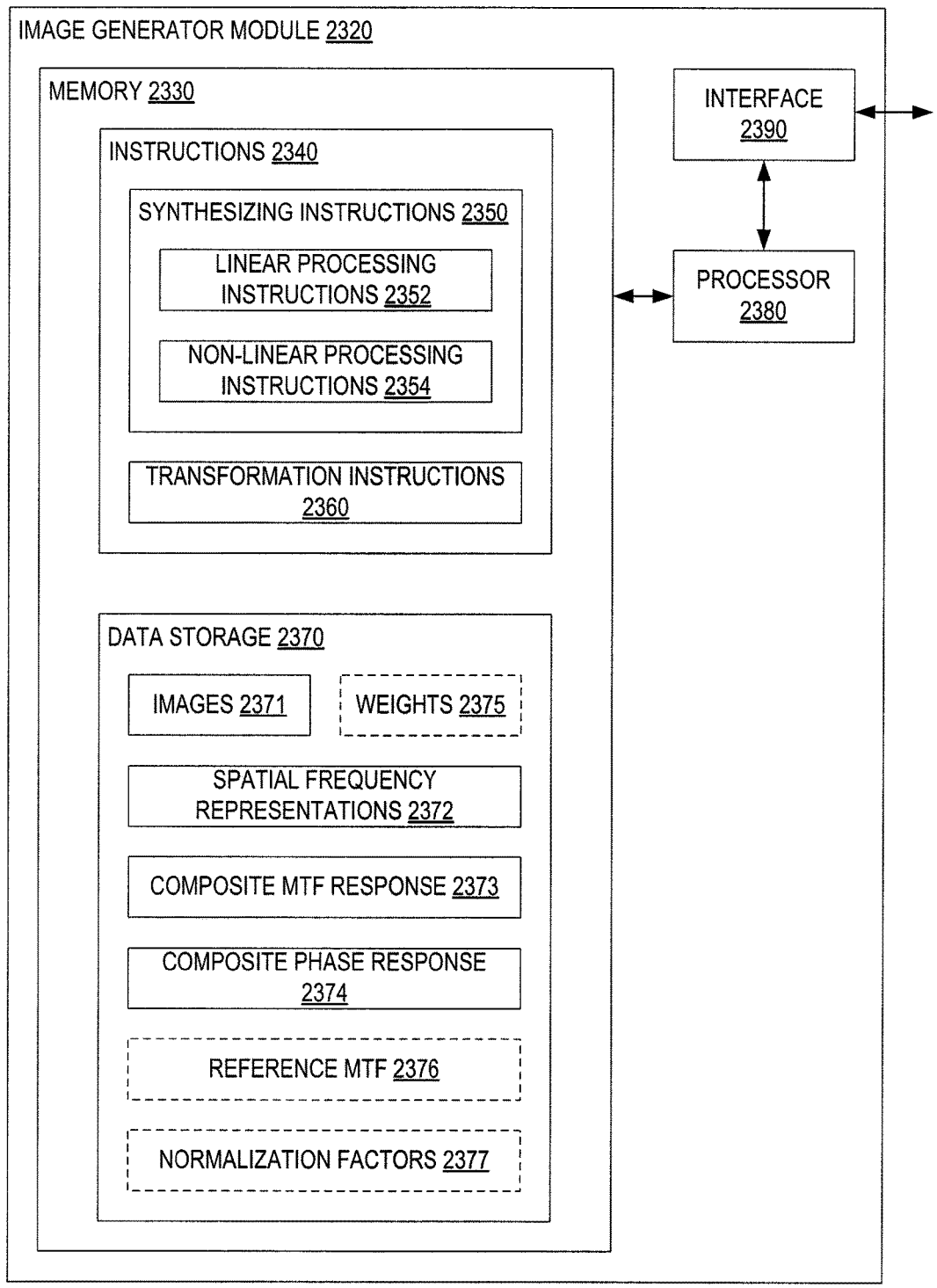
FIG. 23 illustrates an image generator module that includes memory, a processor, and an interface, in an embodiment.

FIG. 23 illustrates one exemplary image generator module 2320, which is an embodiment of image generator module 2020 that includes memory 2330, processor 2380, and interface 2390. Memory 2330 is communicatively coupled with processor 2380, which is communicatively coupled with interface 2390. Memory 2330 includes machine-readable instructions 2340 encoded in a non-volatile portion of memory 2330. Instructions 2340 include synthesizing instructions 2350 and transformation instructions 2360. Synthesizing instructions 2350 together with processor 2380 are an embodiment of synthesizing module 2030 (FIG. 20), such that processor 2380 may execute synthesizing instructions 2350 to perform the function of synthesizing module 2030 (FIG. 20). Likewise, transformation instructions 2360 together with processor 2380 are an embodiment of transformation module 2040 (FIG. 20). Synthesizing instructions 2350 include linear processing instructions 2352 and non-linear processing instructions 2354. Linear processing instructions 2352 together with processor 2380 are an embodiment of linear processing module 2032 (FIG. 20). Non-linear processing instructions 2354 together with processor 2380 are an embodiment of non-linear processing module 2034 (FIG. 20). Memory 2330 also includes data storage 2370, which includes images 2371 captured by each sensor 2011. Spatial frequency representations 2372 are the 2D Fourier transforms of images 2371, where the independent variables are spatial frequencies in two orthogonal directions. The values of the spatial frequency representations 2372 are, in the most general case, complex quantities. The composite MTF response 2373 and composite phase response 2374 are computed from the spatial frequency representations 2372 and stored in memory 2330. Data storage 2370 may also include weights 2375, used for computing the complex phase response, a reference MTF 2376, and normalization factors 2377. Interface 2390 is communicatively coupled with sensor array 2010 (FIG. 20) such that image generator module 2320 may receive images captured by image sensors 2016 (FIG. 20). In an embodiment, interface 2390 is further communicatively coupled to a separate computer system or a user. Interface 2390 may, for example, do one or both of the following; render an image for viewing and render a response for guidance.

Figure 24:
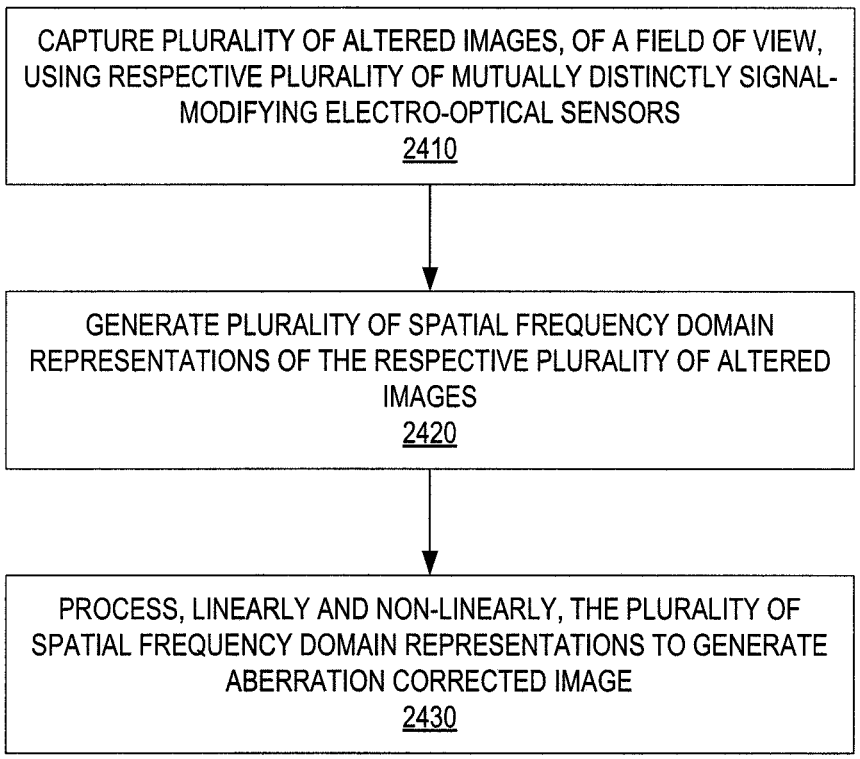
FIG. 24 illustrates an exemplary guidance method with aberration-corrected imaging, in an embodiment.

FIG. 24 illustrates one exemplary method 2400 for aberration-corrected imaging in an optical guidance system with mutually distinct signal-modifying sensors. Method 2400 is, for example, implemented within guidance system 2000. Although method 2400 is discussed below with respect to guidance system 2000, method 2400 may be used with other systems that perform imaging through aberrating media. Additionally, guidance system 2000 may operate under a method other than that of FIG. 24.

In step 2410, method 2400 captures a plurality of altered images, sharing a common field of view, using a respective plurality of mutually distinctly signal-modifying electro-optical sensors. Each electro-optical sensor imposes a modification upon the signal that is mutually distinct from modifications imposed by the other sensors. In an example of step 2410, sensor array 2010 of system 2000 in FIG. 20 captures a plurality of images sharing a common field of view.

In step 2420, method 2400 generates a plurality of spatial frequency domain representations of the respective plurality of altered images. As noted above, values of the spatial frequency representations are, in the most general case, complex quantities. In an example of step 2420, linear processing module 2032 (FIG. 20) of synthesizing module 2030 of system 2000 linearly processes a plurality of images received from sensor array 2010 to generate spatial frequency representations of the images.

In step 2430, method 2400 processes, linearly and non-linearly, the plurality of spatial frequency domain representations to generate aberration corrected image. In an example of step 2430, linear processing module 2032 and non-linear processing module 2034 of image generator module 2020 (FIG. 20) linearly and non-linearly, respectively, process a plurality of spatial frequency domain representations to generate an aberration corrected image.

Figure 25:
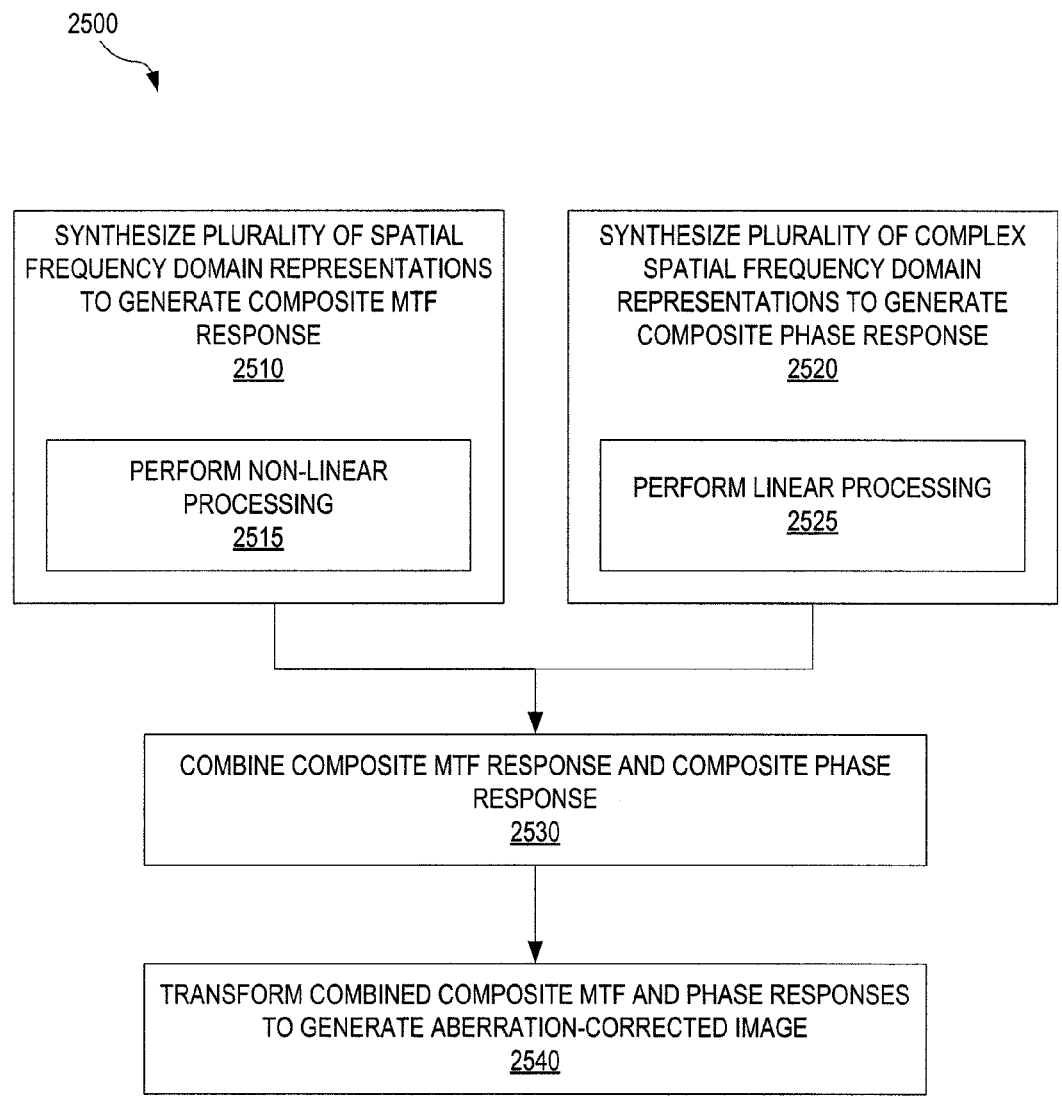
FIG. 25 illustrates an exemplary guidance method with aberration-corrected imaging that employs non-linear processing compute the composite OTF magnitude response, and linear processing to compute a composite OTF phase response, in an embodiment.

FIG. 25 illustrates one exemplary method 2500, which is an embodiment of step 2430 of method 2400. In step 2510, method 2500 synthesizes the plurality of spatial frequency representations to generate a composite MTF response. Step 2510 includes a linear processing step 2515. In step 2520, method 2500 synthesizes the plurality of spatial frequency representations to generate a phase response. Step 2520 includes a linear processing step 2525. In step 2530, method 2500 combines the composite MTF response from step 2510 and composite phase response from 2520. In step 2540, method 2500 transforms the combined composite MTF and phase responses to generate an aberration-corrected image.

Figure 26:
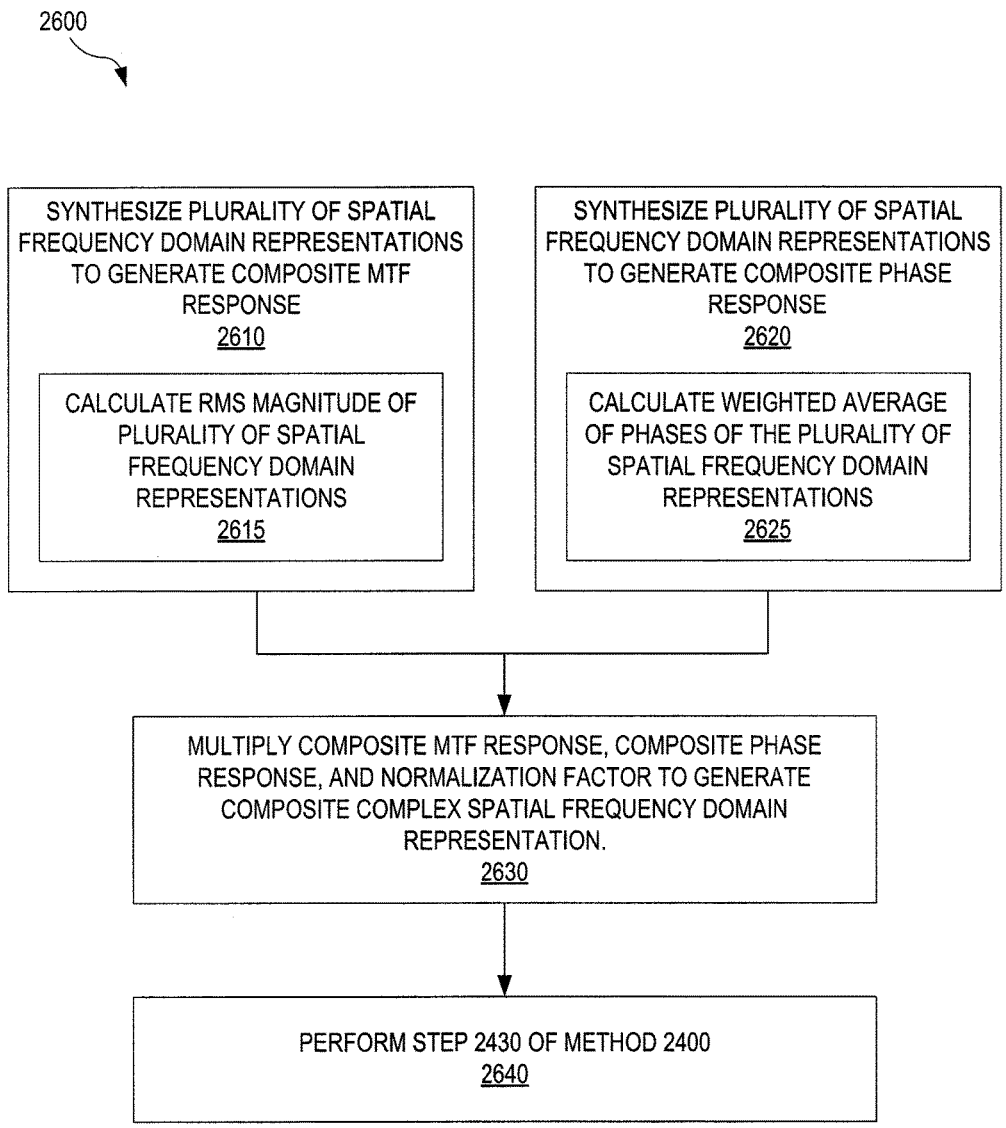
FIG. 26 illustrates an exemplary guidance method with aberration-corrected imaging that employs non-linear processing compute the composite OTF magnitude response, and linear processing to compute a composite OTF phase response, in an embodiment.

FIG. 26 illustrates a second exemplary method for restoring image clarity that employs non-linear processing compute the composite OTF magnitude response, and linear processing to compute a composite OTF phase response. Method 2600 is identical to method 2500 (FIG. 25) except for steps 2515, 2525, and 2530 of method 2500 being replaced by respective embodiments thereof: steps 2615, 2625, and 2630. Step 2615 calculates the root-mean-square (rms) magnitude of the plurality of spatial frequency domain representations. Step 2625 calculates a weighted average of phases of the plurality of spatial frequency domain representations. Step 2630 multiplies the composite MTF response, the composite phase response, and normalization factor to generate composite complex spatial frequency domain representation of the image captured by the sensor array. In an example of implementing method 2600, the image generator module 2020 system 2000 performs method 2600.

Figure 27:
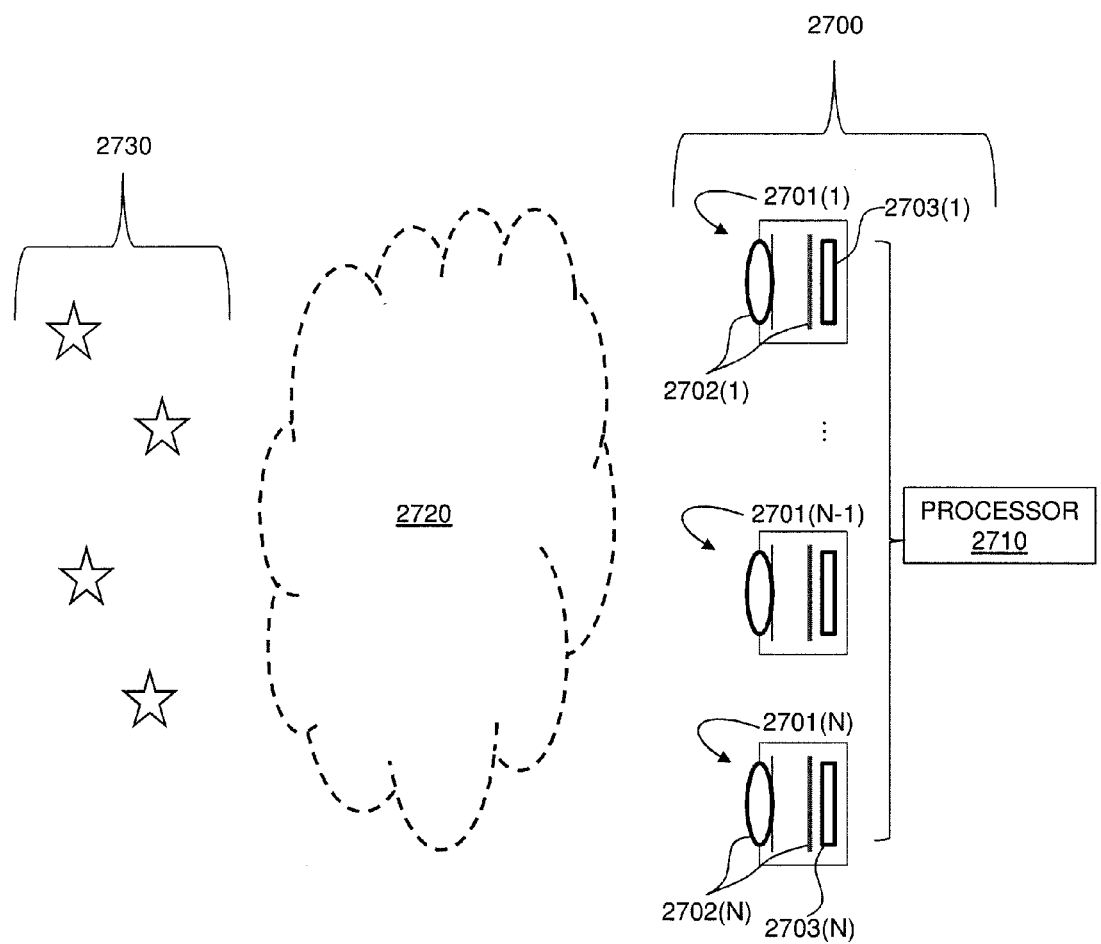
FIG. 27 illustrates one guidance system employing mutually distinct signal-modifying electro-optical sensors that measures information about distant objects by orthogonally sampling radiated or reflected energy from distant objects, in an embodiment.

FIG. 27 illustrates one exemplary optical guidance system 2700 employing mutually distinct signal-modifying electro-optical sensors. Optical guidance system 2700 is an embodiment of system 2000. Optical guidance system 2700 measures information about objects 2730 by orthogonally sampling radiated or reflected energy from objects 2730 and processing these measurements with processor 2710. The detectors of the mutually-distinct sensors 2701(i) may be single pixel or array detectors.

Between guidance system 2700 and objects 2730 is a potentially aberrating medium 2720 that acts to change the optical characteristics of the optical radiation generated by or reflecting off of objects 403. The properties of aberrating medium 2720 may be known or unknown. The plurality of electro-optical sensors 2701 includes a respective plurality of mutually distinct signal-modifying components 2702 and a respective plurality of optical detectors 2703. The signal-modifying components 2702 may, in general, be a lens with a distinct phase/amplitude profile and/or a distinct phase amplitude profile near detector 2703. Detector 2703 may be a single pixel detector or a detector array. The sensors 2701 of guidance system 2700 are mutually distinct in order to orthogonally sample information about objects 2730, in some domain, and relative to the other channels of 2700. Having orthogonal samples reduces the cross information between pairs of sensors and maximizes the Fisher Information of the system thereby increasing overall system precision. Optical guidance system 2700 may further include additional electro-optical sensors that are not mutually distinct or distinct from sensors 2701, without departing from the scope hereof.

Optical guidance system 2700 may also be very low cost as it is composed of low-cost components. System 2700 represents one configuration of specialized low-cost orthogonal sensors 2701 so that information about the 3D localization of objects 2730 is measured as precisely as possible.

Referring again to optical guidance system 1300 (FIGS. 13 and 14), in an embodiment, the sensor array in guidance system 1300 includes mutually-distinct signal modifying optical components 2702 of FIG. 27, implemented as signal-modifying optical elements 1334. This embodiment includes sensors that impose two types of mutually-distinct modifications on the signal. One is a spatially-varying modification of the signal as incident optical radiation, as in system 2700. The other is a temporally varying modification of the signal after it is converted from optical radiation to an electrical current.

Figure 28:
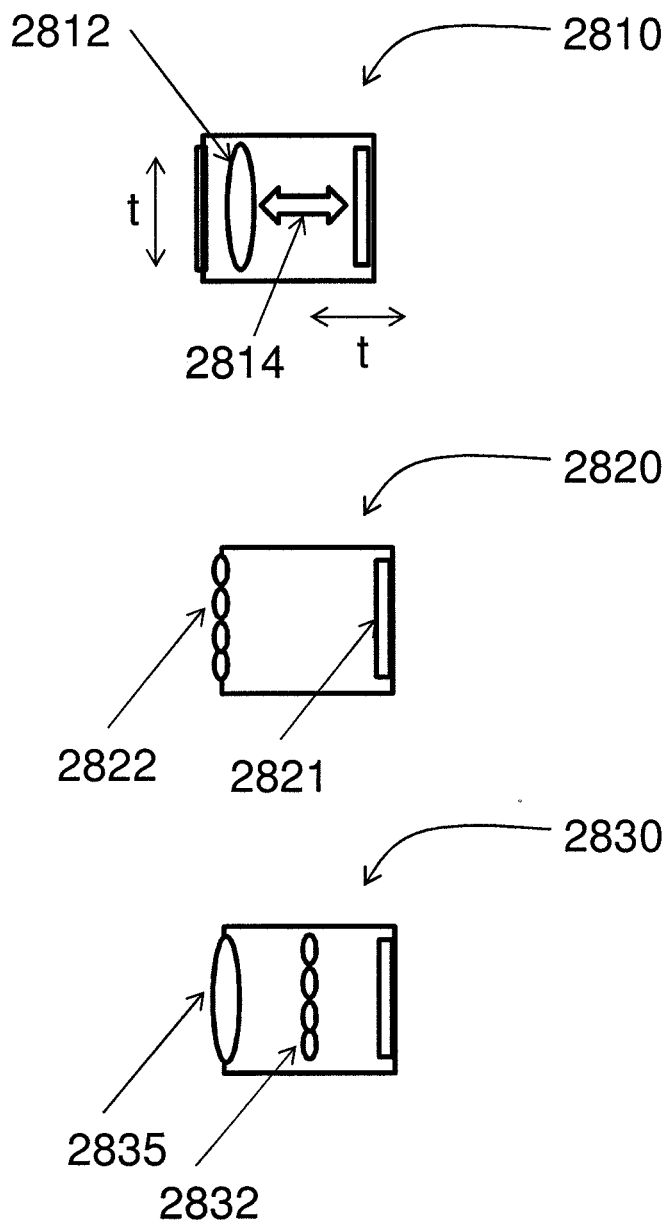
FIG. 28 describes three optical configurations for electro-optical sensors used in the optical guidance system with mutually distinct signal-modifying sensors, in an embodiment.

FIG. 28 describes three general optical configurations for mutually-distinct sensors 531 of FIG. 5 using signal-modifying optical element 534 (FIG. 5), or for mutually distinct sensors 2011 of FIG. 20. System 2810 describes a time-varying system that is relevant if objects are stationary on the time scale needed to alter at least one of the optical components 2812 and possibly focus by changing separation 2814 or through a second-order phase term at 2812. Temporal modification of 2812 and 2814 may, for example, both be performed opto-mechanically through liquid lens devices, such as those supplied by Varioptic of Lyon, France.

System 2820 describes a system with an array of mutually distinct optics 2822, in general aspheric optics. The individual optical channels formed by the mutually distinct optics 2822 are designed to produce mutually-distinct measurements. The detector 2821 in 2820 may be an array detector or a collection of single-pixel detectors.

System 2830 is similar system 2820 except that a common objective lens 2835 is used before the array of mutually distinct optics 2832. The common objective lens 2835 may present parallel light, focused light, or something between, to the mutually distinct optics 2832. The general optical characteristics of FIG. 28 may be used singularly or together in particular systems.

Figure 29:
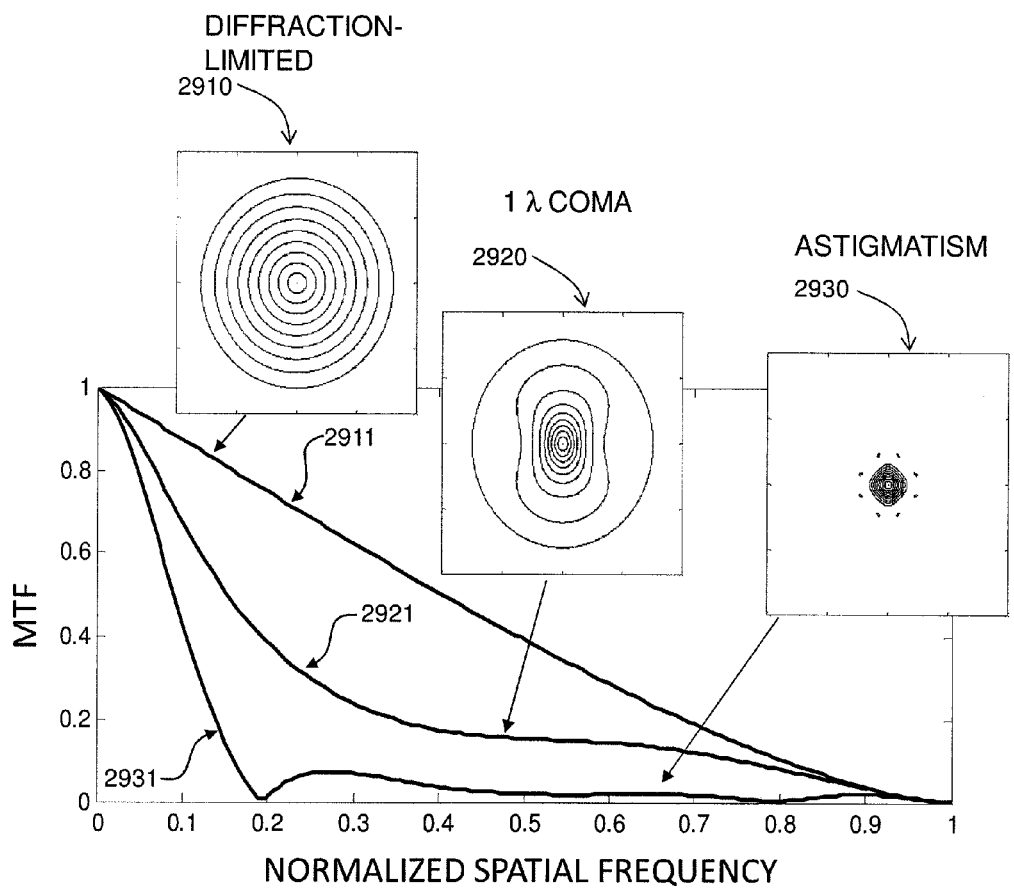
FIG. 29 describes degradation of spatial resolution of a conventional imaging system due to aberrations, as quantified by the system's modulation transfer function (MTF), in an embodiment.

FIG. 29 describes degradation of spatial resolution of a conventional imaging system, as quantified by the system's modulation transfer function (MTF). Aberrations cause a loss of MTF power in classical imaging systems. Aberrations in systems such as those of FIG. 13 and FIG. 27 may act to dramatically reduce precision of localization estimates of objects. Aberrations, such as due to aberrating medium 2720 of FIG. 27 are one such example. Aberrations may also be purposely used in the system, such as to achieve extended depth of field. In an example, by careful design of the mutually distinct electro-optical sensors 401 of a guidance system 400 in FIG. 4, the recovery of the "lost OTF" due to aberrations may be realized and the highest precision localization estimates enabled.

A diffraction-limited imaging system produces a 2D MTF given by 2910 in FIG. 29, where the peak MTh magnitude is at the center. A horizontal slice through the origin of this 2D MTF produces the MTF 2911. A system with one wavelength of coma produces a 2D MTF 2920. A horizontal slice through this 2D MTF produces the MTF 2921. A system with one wavelength of astigmatism produces a 2D MTF 2930. A horizontal slice through this MTF produces the MTF 2931.

Figure 30:
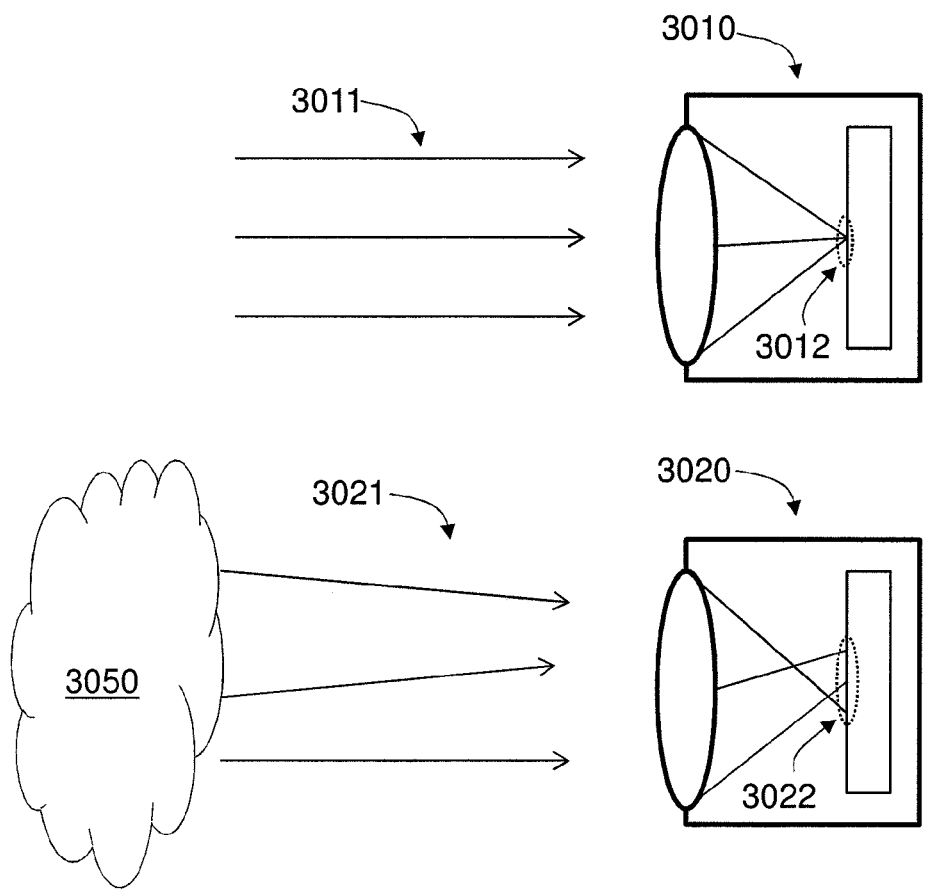
FIG. 30 shows loss of MTF power from a ray-based perspective.

FIG. 30 describes, by example, the fundamental loss of MTF power from a ray-based perspective. Ideal system 3010 acts on rays 3011 from a distant point, essentially at infinity, to form an ideal point-spread function (PSF) or image of a point 3012. The actual characteristics of the image of a point 3012 are related to the details of ideal system 3010.

System 3020 is similar to ideal system 3010, except that an aberrating medium 3050 has changed the relative direction (and/or amplitude and phase) of the rays from a distant point, essentially at infinity. The resulting rays at the image of a point 3022 are no longer ideal and produce an aberrated image of the distant point. An aberrated image classically is associated with a loss of MTF at some spatial frequencies. An important question is "Where did this MTF power go?" If this lost power, hereinafter termed lost OTF, can be understood, then can it be recovered and how?

Figure 31:
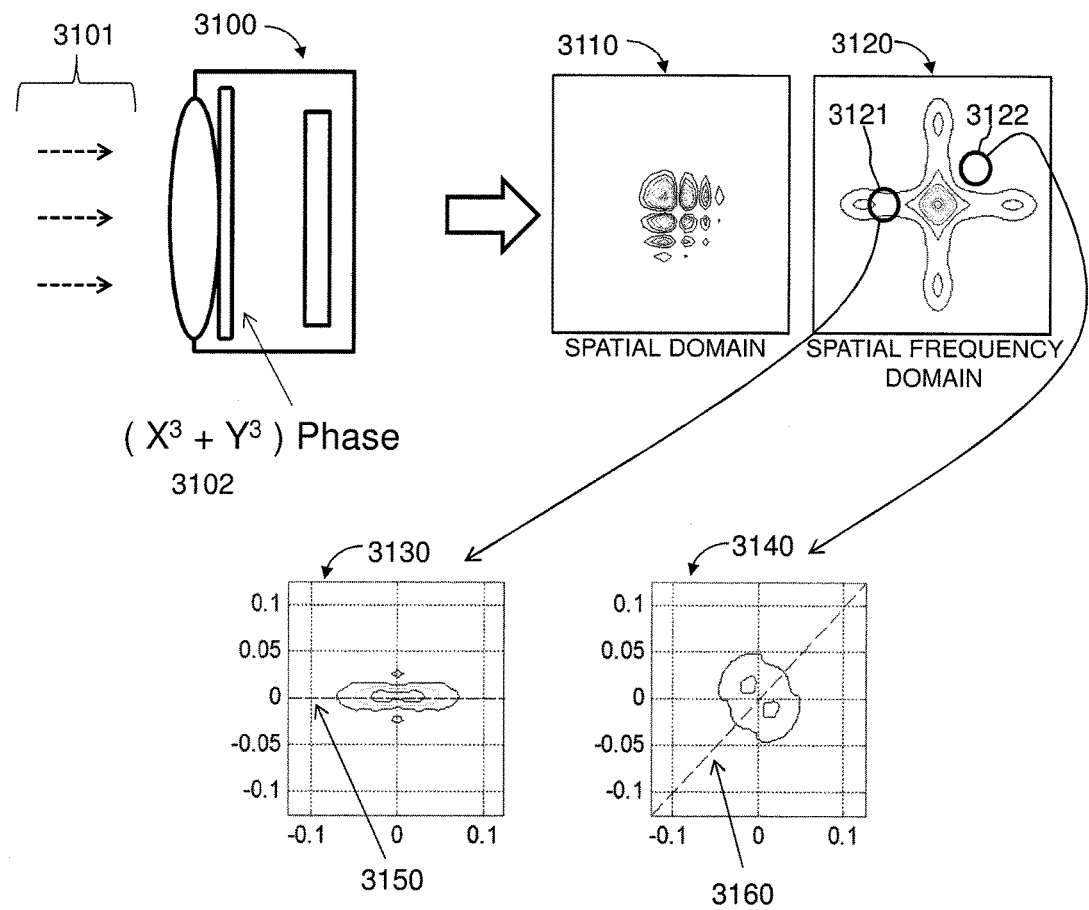
FIG. 31 shows a complex system response (CSR) and how to recover lost MTF power in a guidance system employing mutually distinct signal-modifying electro-optical sensors, in an embodiment.

FIG. 31 shows a complex system response (CSR) and how to recover lost MTF power in a guidance system employing mutually distinct signal-modifying electro-optical sensors. The spatial frequency system 3100 images parallel light 3101 from a distant point, essentially at infinity. The lens on spatial frequency system 3100 is an ideal lens purposely modified by a cubic phase function 3102, where the function is (x^3+y^3). This phase function is an easily described form of aberration.

The resulting image of the distant point is represented in the spatial domain by the PSF 3110 and in the spatial frequency domain by its corresponding OTF 3120. Only the magnitude of OTF 3120, or the MTF, is shown in FIG. 31. Neither of these representations describes where the lost OTF power went. The particular OTF points 3121 and 3122 that contain magnitude and phase are represented in Complex System Responses (CSR) 3130 and 3140 respectively. OTF point 3121 is at a horizontal spatial frequency and OTF point 3122 is at a diagonal spatial frequency, both at the same radial distance from the origin. In general, a CSR represents particular complex OTF points in terms of generalized misfocus in the vertical and horizontal directions. The origin of CSRs 3130 and 3140 represents the OTF points 3121 and 3122 respectively, while the remaining regions of 3130 and 3140 represent the OTF points for the particular spatial frequencies at OTF points 3121 and 3122 with different generalized misfocus. Generalized misfocus is one-dimensional misfocus, such as $\alpha \cdot x^2$ or $\beta \cdot y^2$, where two orthogonal dimensions have different misfocus properties. Classical misfocus is two dimensional such as $\alpha \cdot (x^2 + y^2)$, where two orthogonal dimensions have identical misfocus properties. The value at the origin of the CSR represents the OTF of the particular spatial frequency with zero misfocus.

The classical misfocus line 3150 on CSR 3130 is horizontal. The classical misfocus line 3160 on CSR 3140 is diagonal. These represent the classical misfocus lines for the two particular spatial frequencies at OTF points 3121 and 3122 respectively.

To understand the orientation of the misfocus line 3150, recall that CSR 3130 represents OTF values for imaging an object containing a non-zero horizontal spatial frequency $v_x$ and a vanishingly small range of vertical spatial frequencies $\Delta v_y$ centered about zero, as shown by point 3121. Only magnitudes of the OTF, or MTF, are shown in the figure. Hence, in the limit that $\Delta v_y \rightarrow 0$, the OTF values in CSR 3130 are constant for $|v_y|>0$. Misfocus line 3160 is similar to 3150, but is rotated by 45 degrees because OTF values in CSR 3140 correspond to OTF point 3122 is at a diagonal spatial frequency.

The CSR 3130 displays system power spread along the classical misfocus line 3150. Therefore, this spatial frequency system 3100 displays an extended depth of field. CSR 3140 describes a system that has power far from the classical misfocus line 3160. While there is power along the classical misfocus line, spatial frequency system 3100 has lost OTF power at this, and many other spatial frequencies.

By understanding the CSR and purposely designing electro-optical sensors 401 of orthogonal sampling systems 400 (FIG. 4), 2000 (FIG. 20), and 2700 (FIG. 27) to take advantage of the CSR by designing CSR filters, the effect of aberrations on specialized systems may be greatly reduced. Signal-modifying optical elements of sensors of systems 400 (FIG. 4), 2000 (FIG. 20), and 2700 (FIG. 27) may include CSR filters as discussed herein. For example, the plurality of signal-modifying optical elements 2014 (FIG. 20) may be a respective plurality of mutually distinct CSR filters. In certain embodiments, the plurality of mutually distinct CSR filters forms a basis set for spanning general misfocus.

Figure 32:
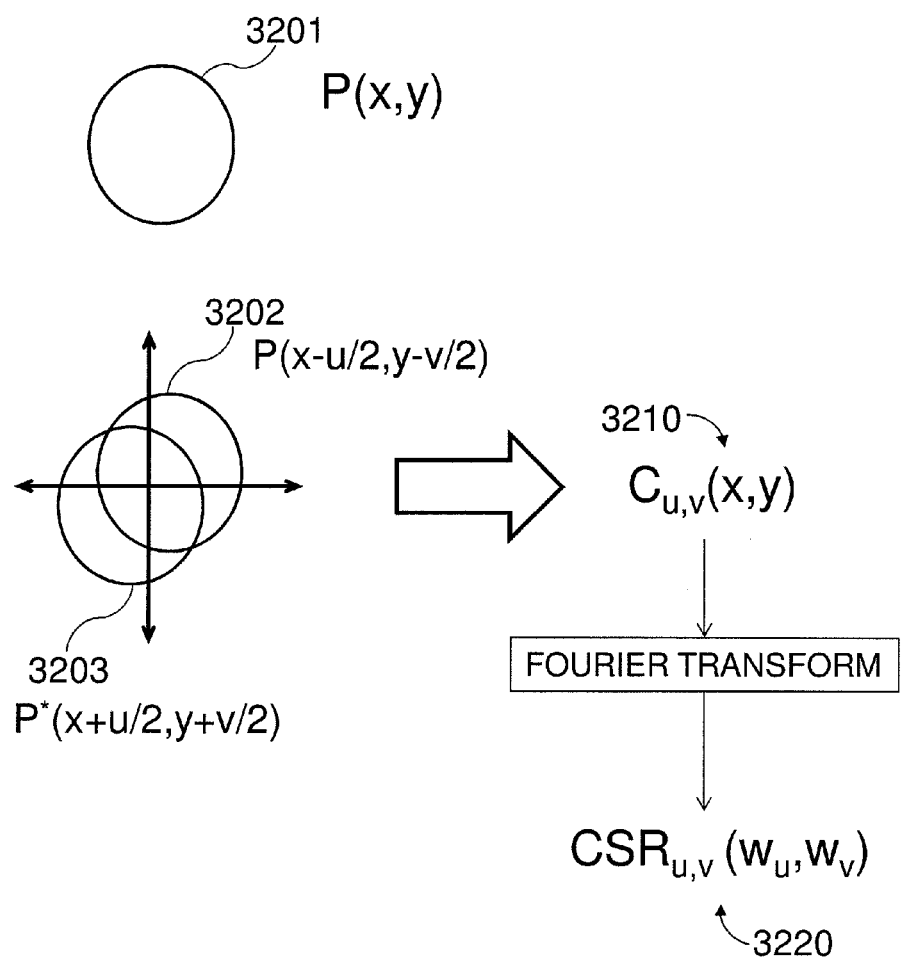
FIG. 32 shows forming the CSR based on exit pupil of a sensor in a guidance system employing mutually distinct signal-modifying electro-optical sensors, in an embodiment.

FIG. 32 shows forming the CSR based on exit pupil of a sensor in a guidance system employing mutually distinct signal-modifying electro-optical sensors. The CSR is a bilinear function of the exit pupil of an imaging system. FIG. 32 describes the process of foaming the CSR based on exit pupil 3201 P(x,y). In general, this exit pupil is a complex quantity containing amplitude and phase as a function of spatial position. A shifted version of the exit pupil, 3202 P(x−u/2,y−v/2) and a shifted and conjugated version 3203 P*(x+u/2,y+v/2) are multiplied point-by-point. The result is the 2D correlation 3210 $C_{u,v}(x,y)$. This correlation is a function of both of the two dimensional shifts u and v. The 2D Fourier Transform of $C_{u,v}(x,y)$ results in the CSR $CSR_{u,v}(w_u,w_v)$ 3220. The classical OTF related to the two shifts u and v is found by summing the correlation function $C_{u,v}(x,y)$ over u and v. The classical OTF for the two spatial shifts u and v is equal to the origin of the CSR or OTF(u,v)=CSR (0,0). An important property of the CSR is that for every spatial frequency the sum of the squared values of the CSR is a constant for every phase aberration of the exit pupil 3201.

Since the exit pupil P(x,y) is in general a complex quantity, $C_{u,v}(x,y)$ and the $CSR(w_u,w_v)$ are also complex quantities. All plots of the CSR shown herein will display the magnitude while all calculations will involve the actual complex values.

Figure 33:
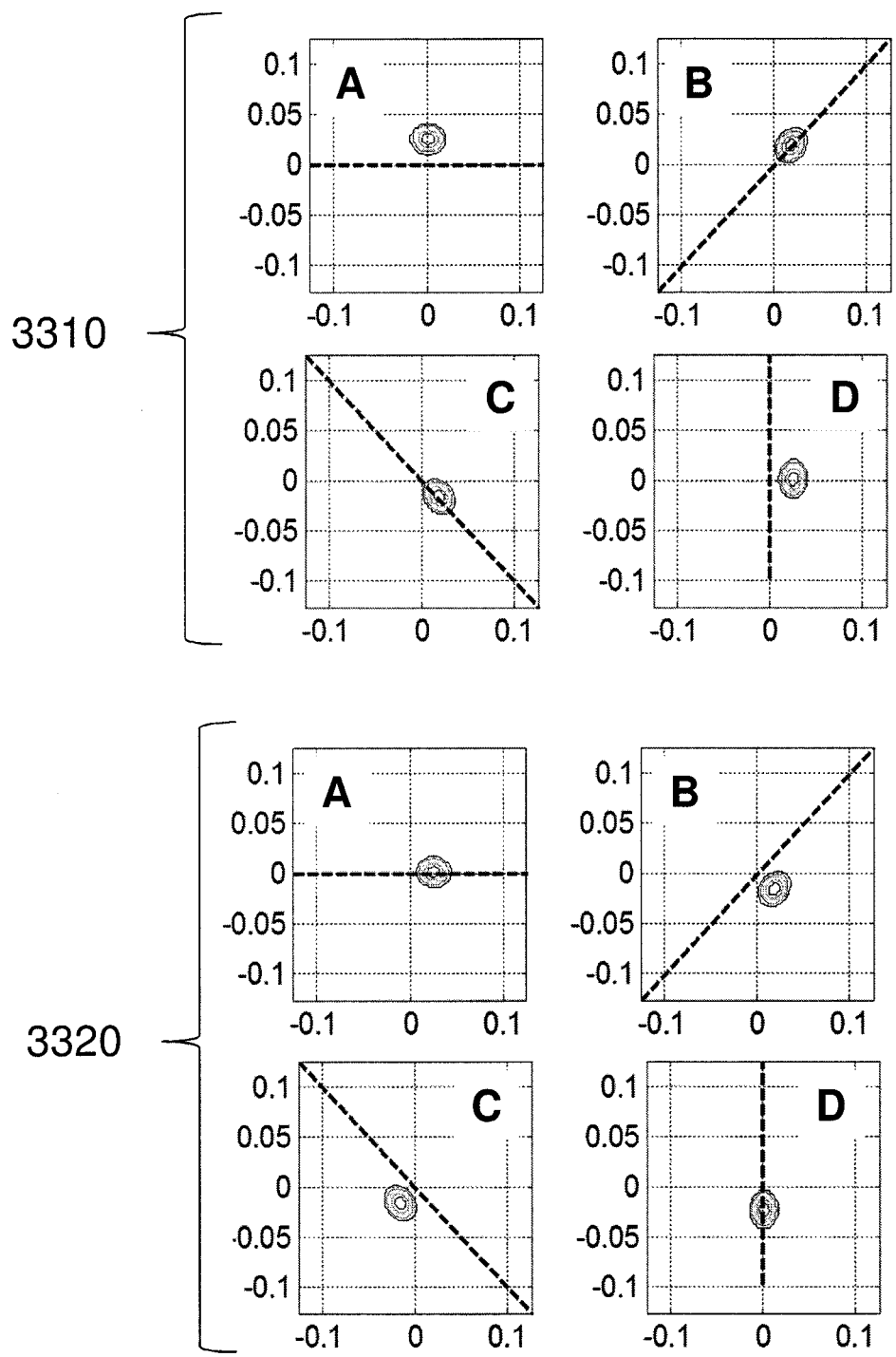
FIG. 33 describes building blocks of CSR filters based on astigmatic components, in an embodiment.

FIG. 33 describes "building blocks" of CSR filters. The building blocks are orthogonal and so enable individual channels of electro-optical sensor 2701 of FIG. 27 to have the minimum amount of cross information and the maximum amount of Fisher Information. CSR filters are used to control the system effects of aberrations and to recover the lost OTF power. Plots 3310 and plots 3320 describe the CSR for one spatial frequency for 4 different angles. The spatial frequency of the CSRs throughout will be normalized to a maximum of 1.0, and shown to 0.25 out of this maximum value. The graphs A, B, C and D represent horizontal, left diagonal, right diagonal and vertical spatial frequencies respectively. The classical misfocus line in A is horizontal, in B it is diagonal up to the right, in C it is diagonal down to the right, and it is vertical in D.

The CSR blocks of plots 3310 and 3320 are made through imaging systems with astigmatic components. The exit pupil 3201 in FIG. 32 is specially designed for each of the signal-modifying components 2702 of the optical guidance system 2700 of FIG. 27. For the plots 3310 the astigmatic component is defined as $P(R,\theta)=R^2 \sin(2\theta)$, while for the plots 3320 the astigmatic component is defined as $P(R,\theta)=R^2 \cos(2\theta)$. Here, $R=(x^2+y^2)^{(1/2)}$ and $\theta=\arctan(y/x)$ where R is the radius in the aperture plane and $\theta$ is the angle about the aperture plane.

The corresponding graphs A, B, C, D in plots 3310 and 3320 are orthogonal. The power as a function of generalized misfocus for the two component functions generate CSRs that do not overlap. Linear combinations of these CSRs may span the entire generalized misfocus space.

Adding misfocus to the exit pupil 3201 from FIG. 32 has the effect of translating the CSR power parallel to the misfocus line. Changing the amplitude of the astigmatic component translates the CSR power linearly about the misfocus axes. These two astigmatic components are called building blocks of CSR filters because linear combinations of them may span any desired region of the CSR.

Figure 34:
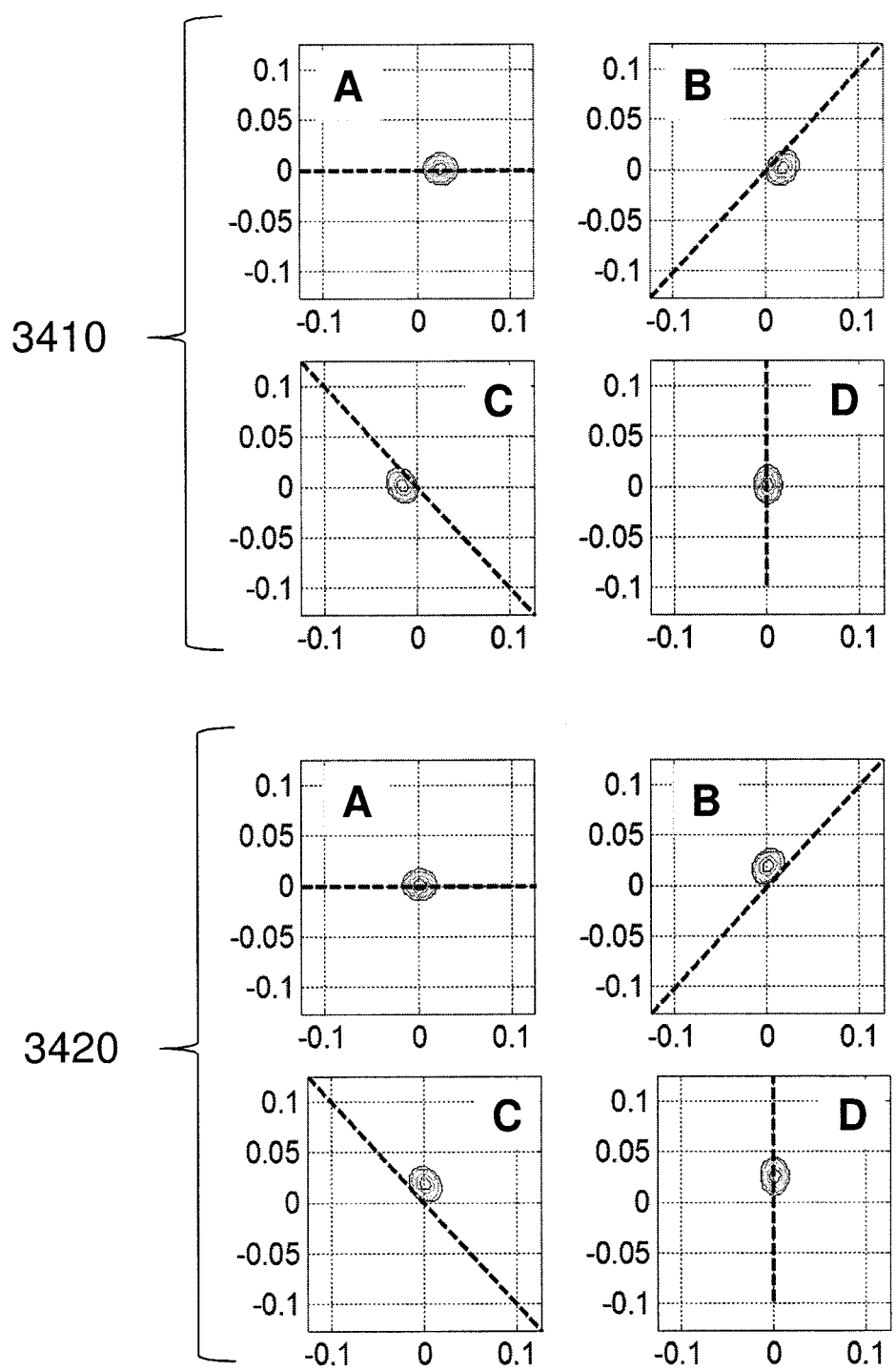
FIG. 34 shows a set of building blocks for CSR filters, based on cylindrical components, in an embodiment.

FIG. 34 shows a different set of building blocks for CSR filters, this time from cylindrical components. Cylindrical components have exit pupil 3201 from FIG. 32 that have the form of 1D lenses, such as $x^2$ or $y^2$. Plot 3410 is related to cylindrical components of the form $P(x,y)=x^2$, while the plots 3420 are related to cylindrical components of the form $P(x,y)=y^2$. For each respective graph A, B, C or D the cylindrical components also form an orthogonal set. There is essentially no CSR overlap for any two graphs in FIG. 34. However, the horizontal and vertical spatial frequencies, A and D, only translate along the respective misfocus axes. This is not the case with the astigmatic components from FIG. 33.

Figure 35:
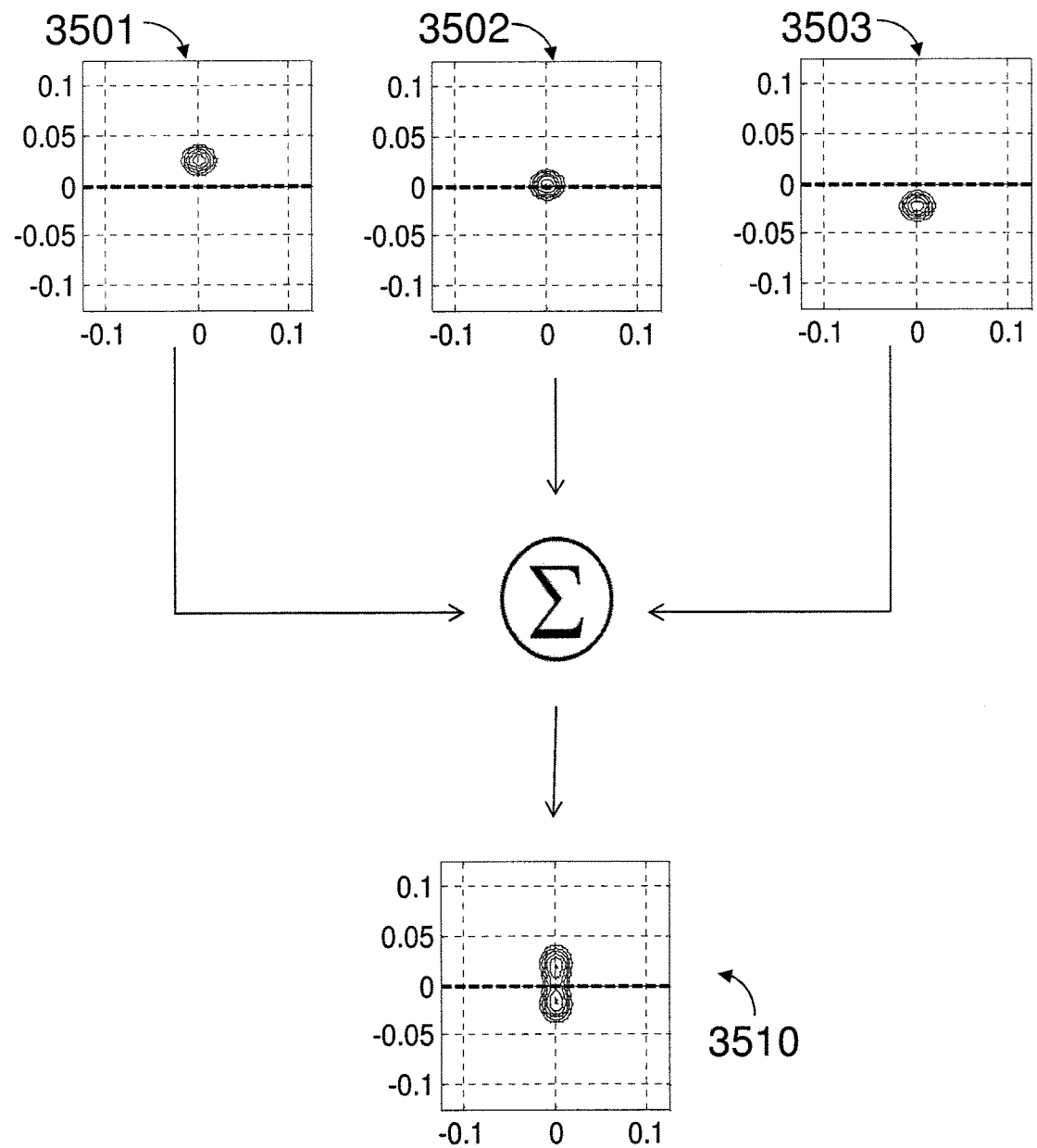
FIG. 35 shows CSR filter constructed from CSR building blocks, in an embodiment

The building blocks of FIG. 33 are used to form CSR filters shown in FIG. 35. The building blocks 3501, 3502 and 3503 describe the complex CSRs for the horizontal spatial frequency (with normalized radial spatial frequency of 0.25) for three different building blocks a $P(r,\theta)=a\, R^2 \sin(2\theta)$, $P(r,\theta)=0$, and $P(r,\theta)=-a\, R^2 \sin(2\theta)$, where a=¾ of a wavelength. Linearly varying the amplitude of the astigmatic component linearly translates the CSR. By linearly summing the complex CSR building blocks the resulting CSR filter 3510 results. This filter is broad about the misfocus line centered at zero misfocus. In general, complex weights may be used to form the CSR filter by weighting each CSR described by building blocks 3501, 3502, 3503, although unity weights will be used herein.

Figure 36:
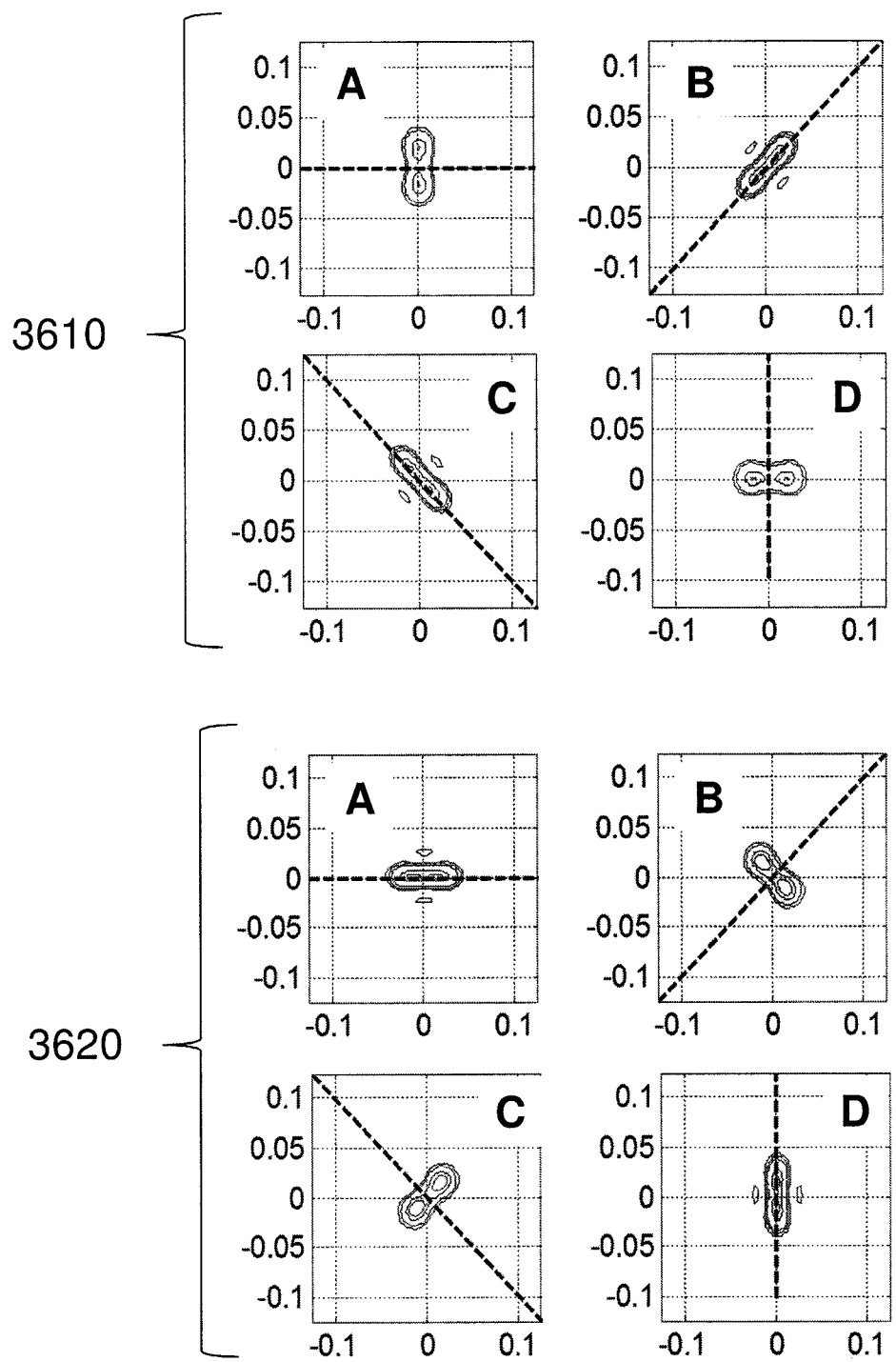
FIG. 36 shows a single CSR filter example from FIG. 35 for 4 angles and both sine and cosine astigmatic building blocks from FIG. 33, in an embodiment.

FIG. 36 shows a single CSR filter example from FIG. 35 for four angles and both sine and cosine astigmatic building blocks from FIG. 33. Plots 3610 represents the CSR filters from the linear combination of sine astigmatic building blocks with +a, 0 and −a amplitude, where a=¾ wavelength. CSR filters 3620 are constructed from the linear combination of cosine astigmatic building blocks with +a, 0 and −a amplitude, and again a=¾ wavelength. CSR filter 3610A is the same as CSR filter 3510 in FIG. 35. CSR filters 3610A, 3610D, 3620B and 3620C are all perpendicular to their respective classical misfocus lines. These filters are particularly useful at recovering OTF power that is typically lost due to aberrations in classical imaging systems. The other CSR filters (3610B 3610C, 3620A and 3620D) are all concentrated along the respective classical misfocus lines and would exhibit extended depth of field characteristics. These CSR filters, which vary only in one parameter, are 1D CSR filters.

Figure 37:
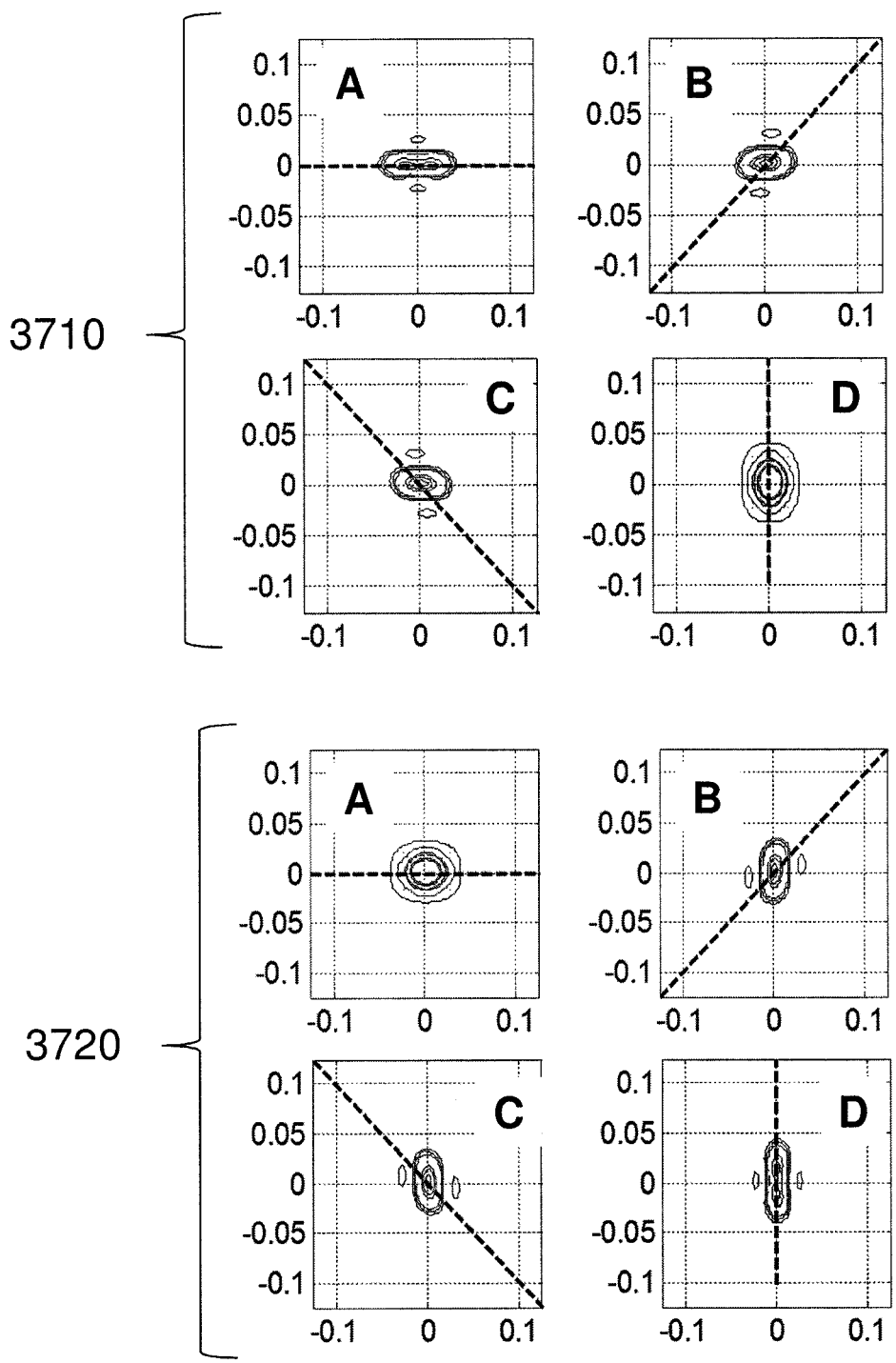
FIG. 37 illustrates CSR filters related to the cylindrical building blocks from FIG. 34, in an embodiment.

FIG. 37 illustrates CSR filters 3710 and 3720 related to the cylindrical building blocks from FIG. 34. CSR filters 3710 and 3720 are similar to respective CSR filters 3610 and 3620 in FIG. 36, except that the power of CSR filters 3710 and 3720 is more closely concentrated on or near the respective misfocus axes than from the astigmatic building blocks from FIG. 34.

Figure 38:
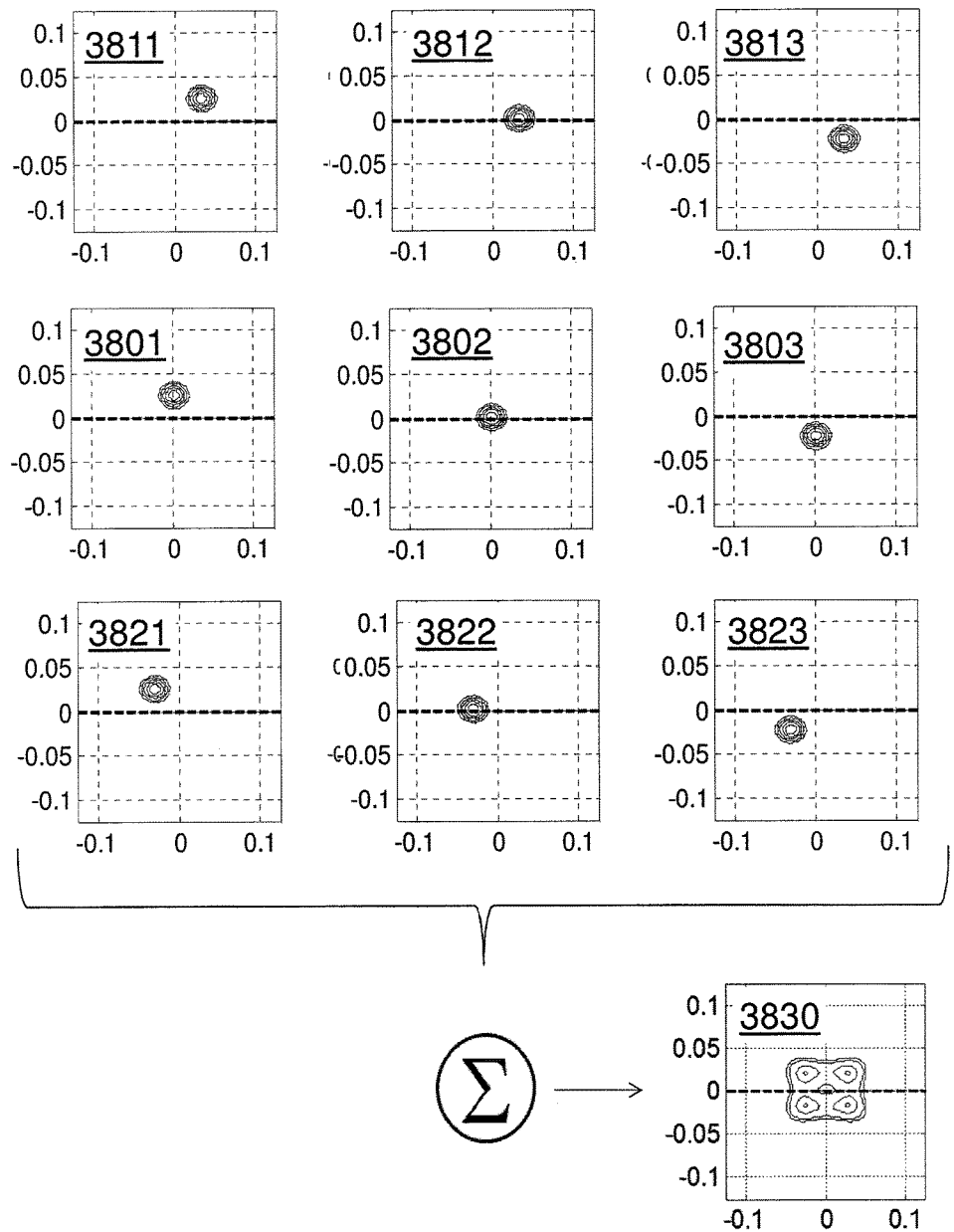
FIG. 38 describes a set of C SR filters that include astigmatism and misfocus, in an embodiment.

FIG. 38 describes a set of CSR filters 3811-3813, 3801-3803, and 3821-3823 that include astigmatism and misfocus. The CSR filters are linear combinations of sine astigmatic building blocks from FIG. 35 with the addition of misfocus. These CSR filters vary in two parameters and are 2D CSR filters. CSR building blocks 3801, 3802 and 3803 are the same as the CSR building blocks 3501, 3502 and 3503 of FIG. 35. The CSR building blocks on the top row of FIG. 38 are translated parallel to the misfocus line through the addition of +1 wave of misfocus to the respective exit pupils. The bottom row represents the same situation but it −1 wave of misfocus translating the CSR building blocks in the opposite direction. The linear combination of all building blocks results in the CSR filter 3830. This particular CSR filter is generally rectangular and centered on the zero misfocus point.

Figure 39:
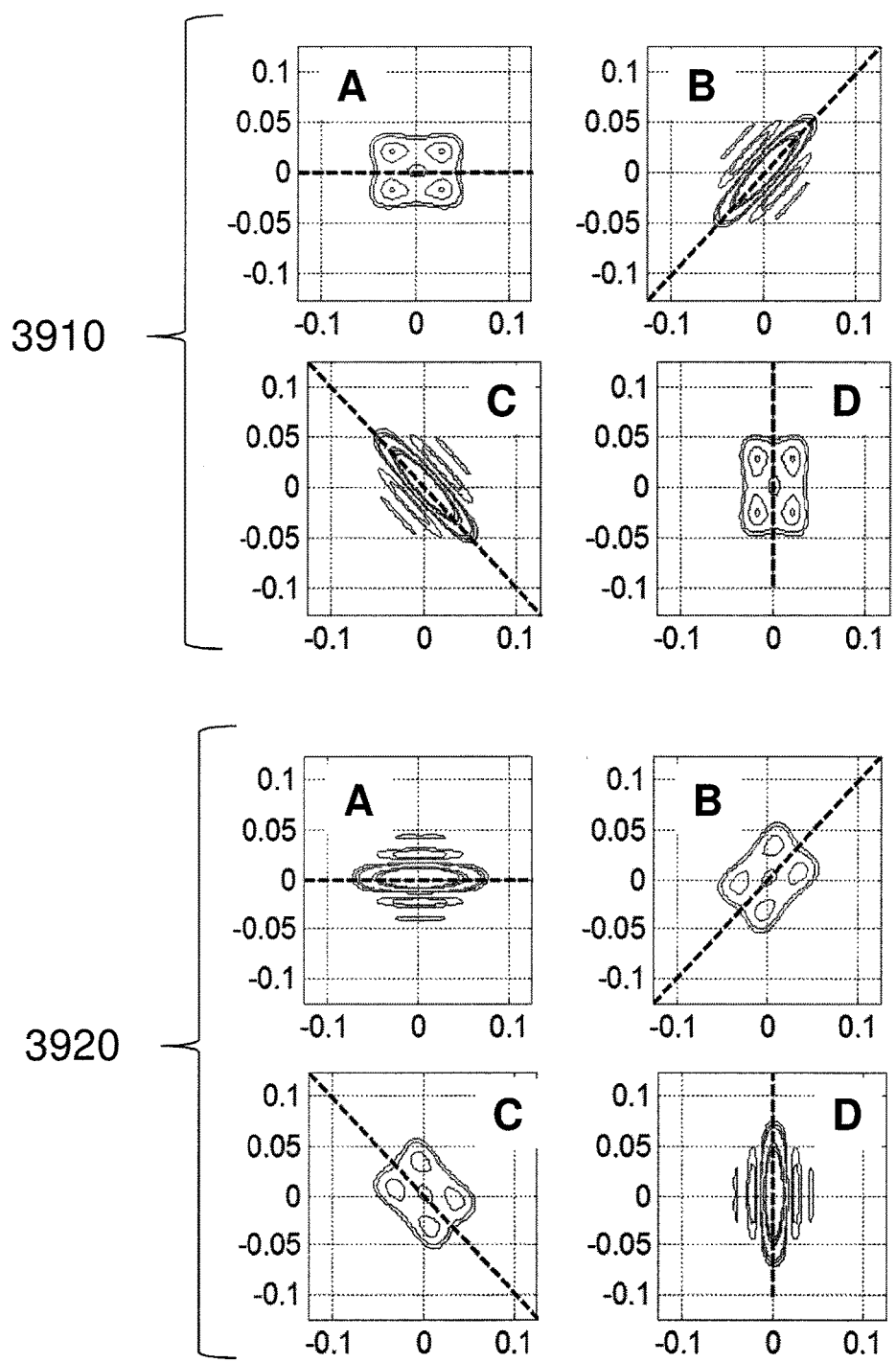
FIG. 39 shows the CSR filters related to the linear combination of misfocus and amplitude from FIG. 38 for multiple angles and both sine and cosine astigmatic building blocks, in an embodiment.

FIG. 39 shows the CSR filters 3910A through 3910D and 3920A through 3920D related to the linear combination of misfocus and amplitude from FIG. 38 for multiple angles and both sine and cosine astigmatic building blocks. CSR filters 3910A, 3910D, 3920B and 3920C have uniform rectangular forms centered on the misfocus axes, similar to that of FIG. 38.

Figure 40:
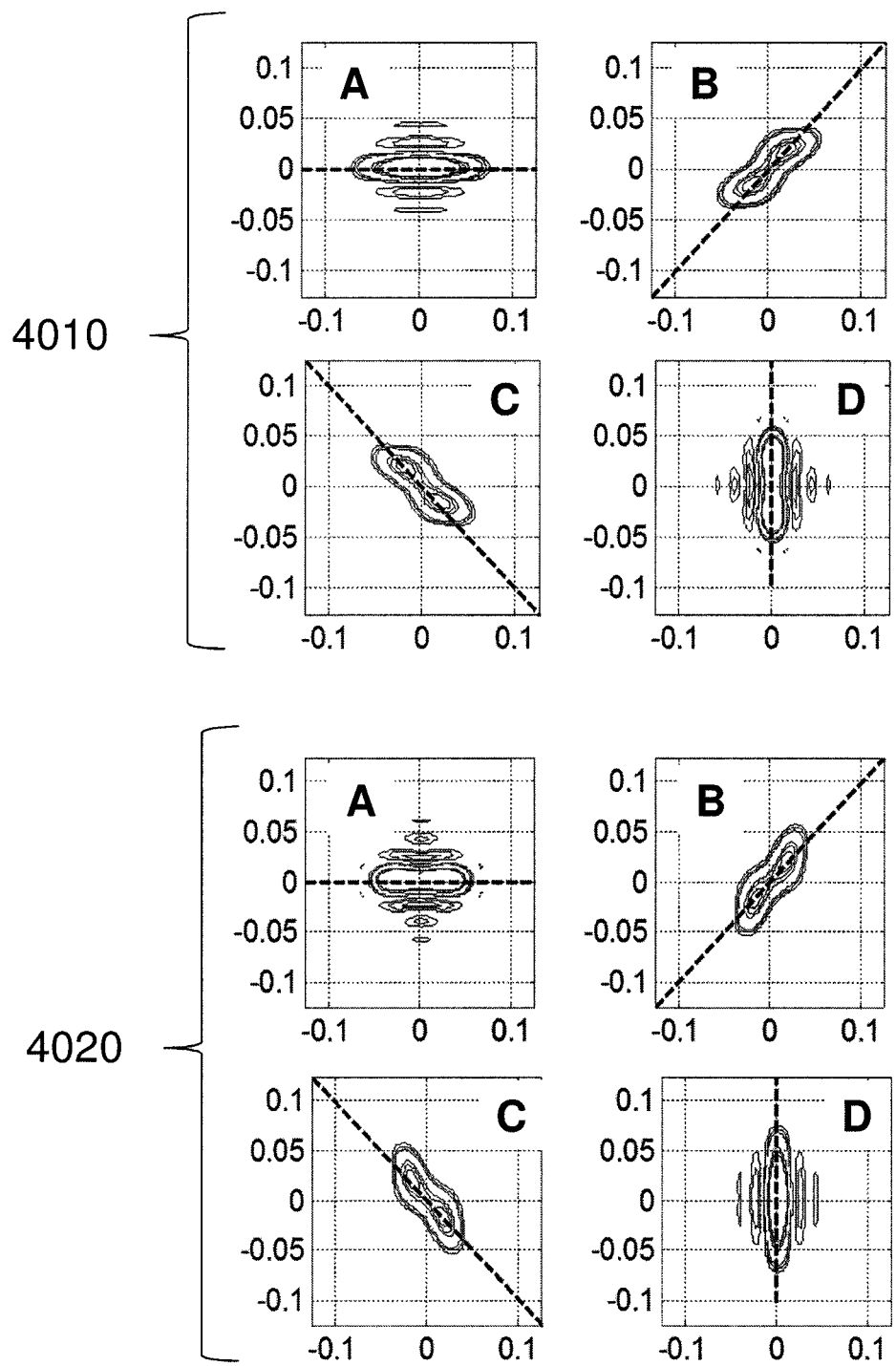
FIG. 40 shows CSR filters similar to FIG. 38, but with the cylindrical CSR building blocks of FIG. 34 and FIG. 37, in an embodiment.

CSR filters 4010A-4010D and 4020A-4020D similar to FIG. 38, but with the cylindrical CSR building blocks of FIG. 34 and FIG. 37 are shown in FIG. 40. Again power is more closely concentrated near the respective misfocus axes with the cylindrical building blocks than with the astigmatic building blocks.

FIG. 41 through FIG. 48 describe in detail four examples of using CSR filtering to both record and then recover the lost OTF due to aberrations. For these examples the system 2820, with an array detector behind mutually distinct optics 2822, of FIG. 28 is used. Each aperture of system 2820 has a unique phase that results in orthogonal sampling in the CSR domain. By capturing image data from each aperture and performing proper processing the resulting images may have far less lost OTF power than without orthogonal sampling.

Figure 41:
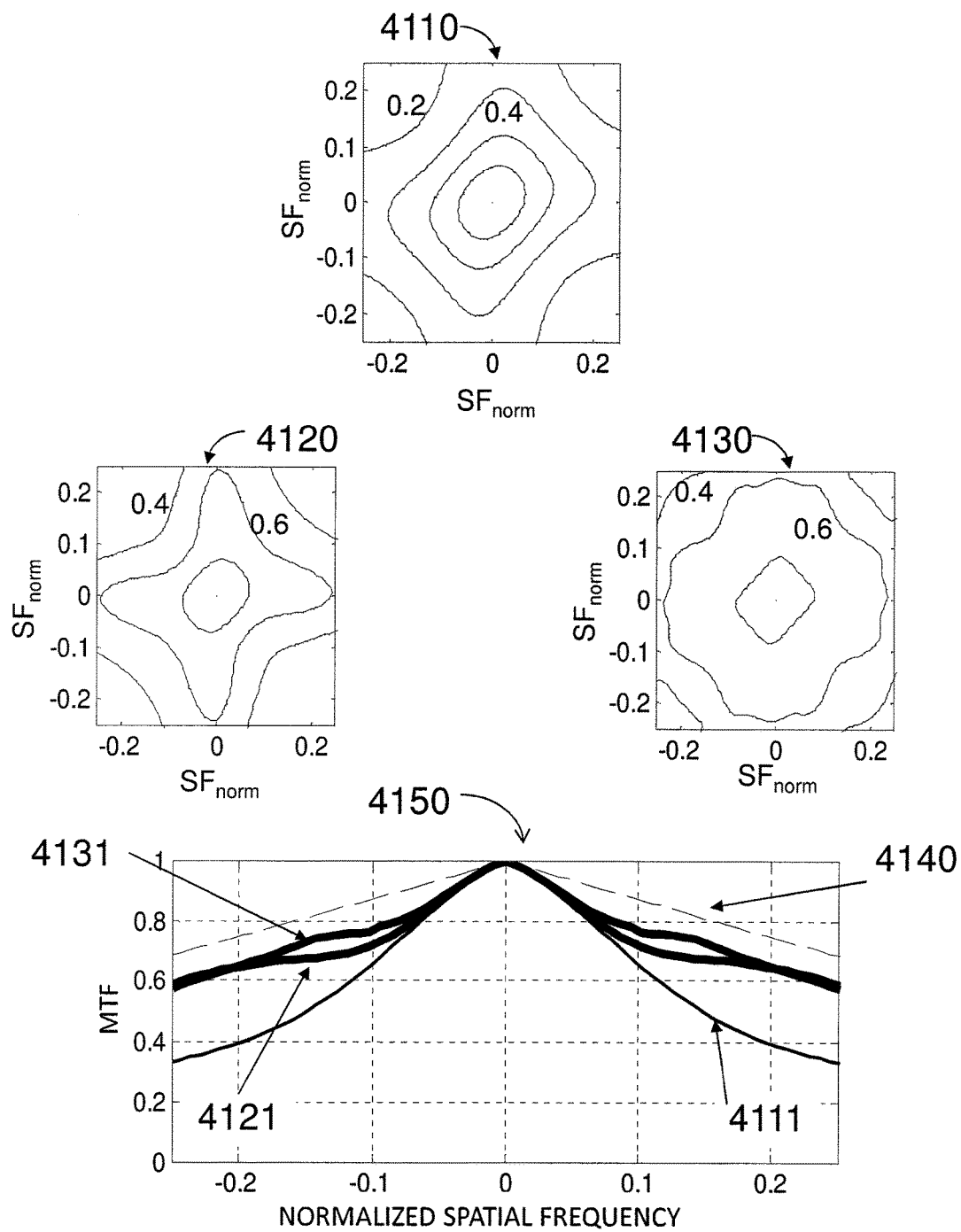
FIG. 41 shows an example of using CSR filtering to both record and then recover the lost OTF due to a cubic phase aberration, in an embodiment.

In FIG. 41 an intervening aberrating medium is assumed to impart a non-ideal phase of the form $P(x,y)=\alpha\cdot(x^3+y^3)$, $\alpha=1$ wavelength, which is the cubic phase aberration from FIG. 31. Plot 4110 shows the classical 2D OTF magnitude (i.e., the MTF) displayed in contour form. The horizontal and vertical axes of 4110 (as well as 4120 and 4130) are in units of normalized spatial frequency, with the maximum normalized value being 1.0. All MTFs are shown out to normalized spatial frequency of 0.25. Plot 4120 represents the 2D MTF for the astigmatic 1D CSR filters in FIG. 36 (which vary amount of astigmatism), prior to any processing. Plot 4130 represents the 2D MTF for the astigmatic 2D CSR filters in FIG. 39 (which vary both astigmatism and misfocus), prior to any processing. The 1D astigmatic CSR filter 2D MTF in plot 4120 is related to 5 orthogonal apertures while the 2D astigmatic CSR filter 2D MTF in plot 4130 is related to 15 orthogonal apertures. The MTFs 4111, 4121, and 4131 shown in 1D plot 4150 are horizontal slices from the plots 4110, 4120 and 4130, respectively.

The 2D astigmatic CSR filter 2D MTF shown in plot 4130 is higher than that of 1D astigmatic CSR filter 2D MTF shown in plot 4120 (with fewer orthogonal apertures) and both are significantly higher than the classical 2D MTF of plot 4110.

The 1D plot 4150 shows a classical diffraction-limited MTF 4140. Linear reconstruction of the classical 2D MTF (with a horizontal slice of the classical 2D MTF represented as blurred MTF 4111 in 1D plot 4150) may match the diffraction-limited MTF. Such a linear reconstruction may be, for example, a Wiener filter designed with the diffraction limited MTF 4140 as the target response and the blurred MTF 4111 as the response to restore. To restore the blurred MTF 4111 to the classical diffraction-limited MTF 4140 through linear filtering, a filter with an RMS gain of gRMS=2.25 is required. Such filtering will increase the additive noise standard deviation by this factor, gRMS=2.25.

The RMS noise gain for the 1D astigmatic CSR filter 2D MTF of plot 4120 is 0.85 and 0.57 for the 2D astigmatic CSR filter 2D MTF shown in plot 4130. Hence, additive noise power for the orthogonal sampled systems decreases after processing due to orthogonal sampling.

Figure 42:
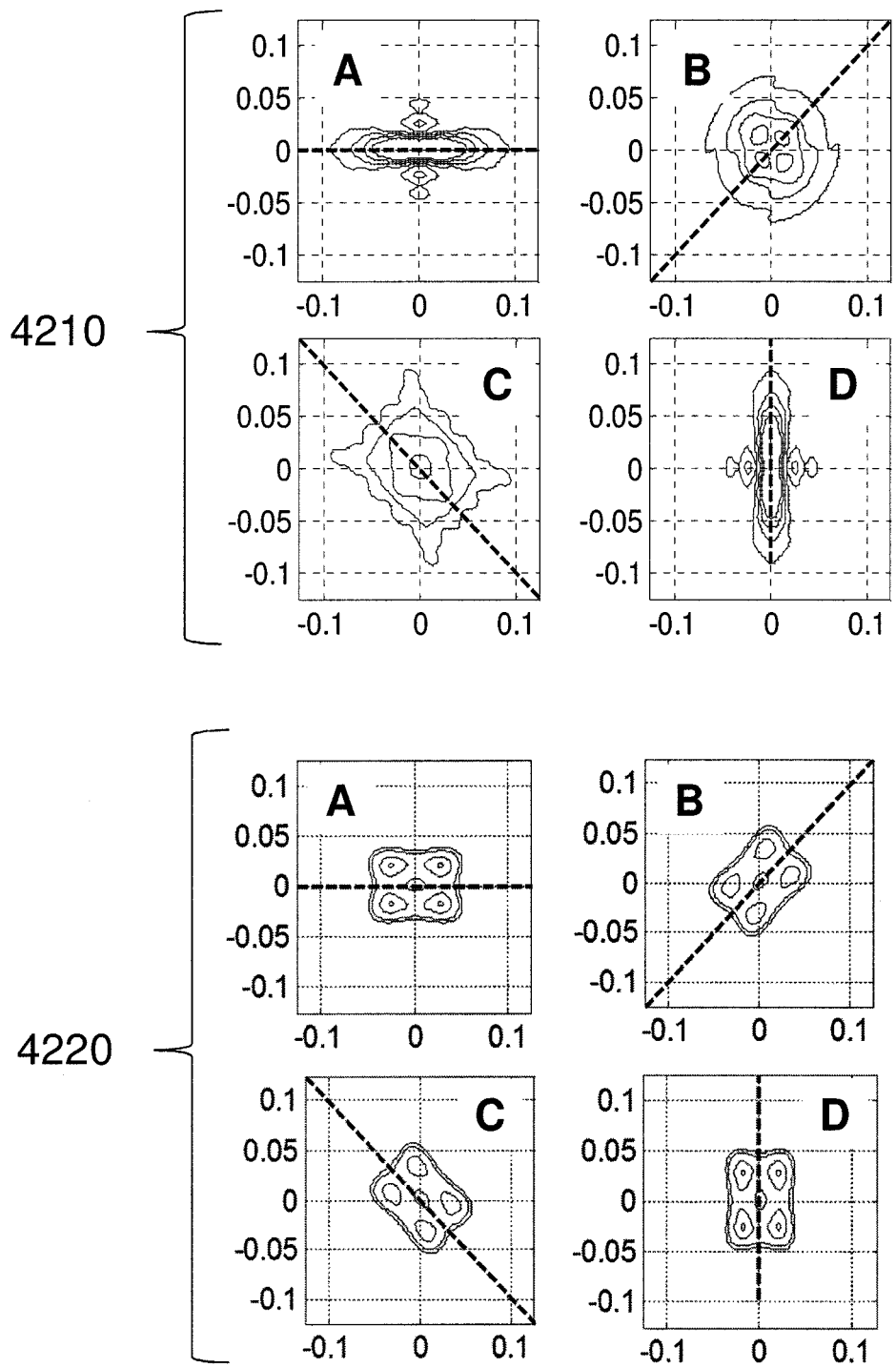
FIG. 42 shows the CSR and CSR filters for the cubic aberrating medium of FIG. 41, in an embodiment.

FIG. 42 shows CSR filters 4210A-D and CSR filters 4220A-D for the cubic aberrating medium of FIG. 41 at a 0.25 spatial frequency at the same four angles previously described. The CSR power is broadly spread across both diagonals in 4210B and 4210C. This power may be captured by the CSR filters 4220, which consists of 3910A, 3920B, 3920C, and 3910D from FIG. 39. While classical focusing may capture power along the misfocus line, the CSR filtering approach captures power across the misfocus line, power that would otherwise be lost. The CSR filters capture OTF power that is typically lost in classical imaging. CSR processing disclosed herein then acts to recover most or all of the OTF.

In CSR 4210, the area of non-zero MTF values in the generalized misfocus space of CSR 4210 exceeds the non-zero MTF area 2D CSR filters 4220. Hence, not all the aberration MTF power will be captured by the CSR filters 4220A-D. This leads to system MTFs that deviate from the ideal diffraction-limited MTF. But, a small amount of digital processing such as Wiener filtering of the sampled data may be used to form final images that match the diffraction-limited response or similar.

Figure 43:
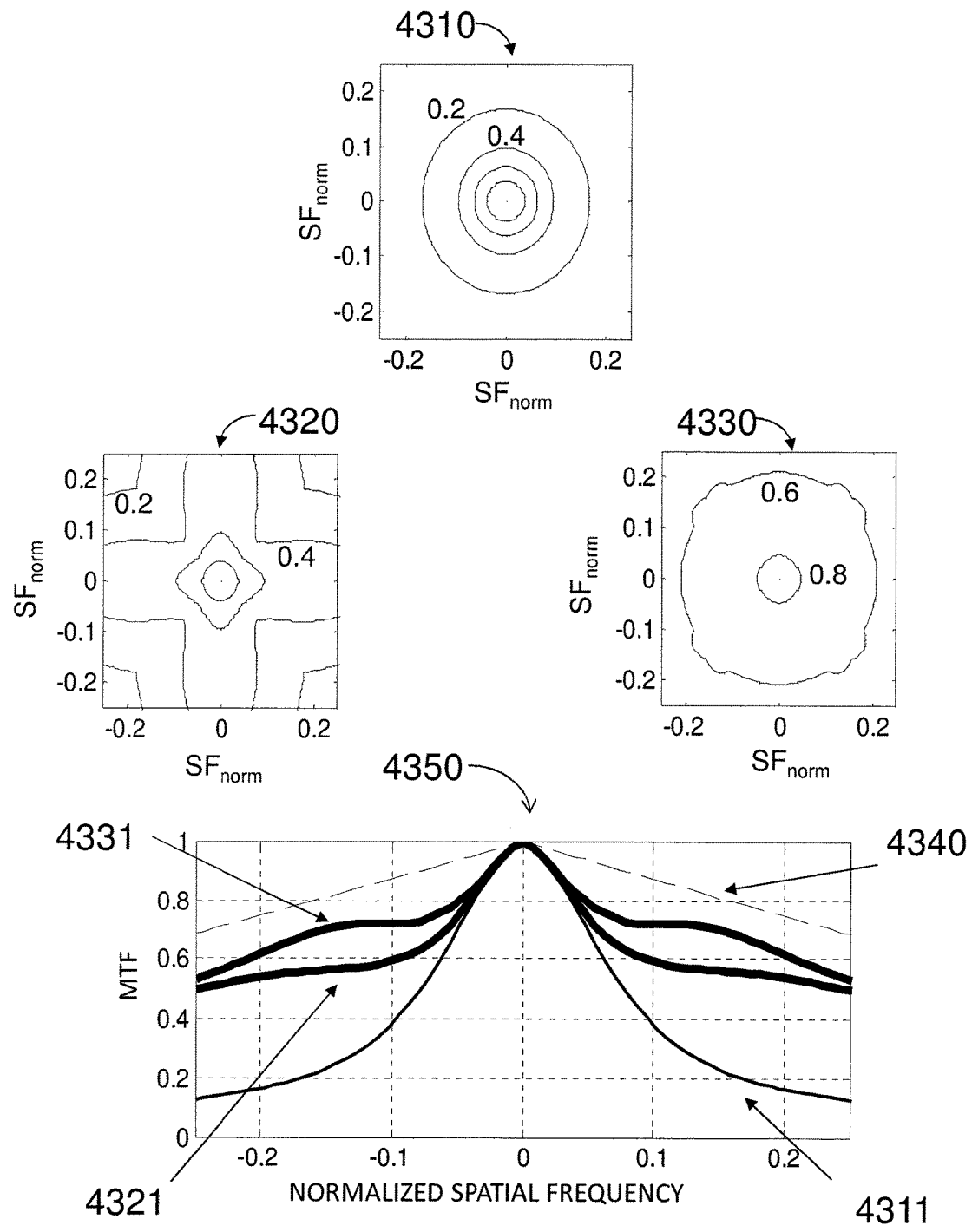
FIG. 43 shows an example recovering lost OTF in a guidance system employing mutually distinct signal-modifying electro-optical sensors where an intervening aberrating medium is one wave of spherical aberration.

FIG. 43 shows an example of recovering lost OTF in a guidance system employing mutually distinct signal-modifying electro-optical sensors where an intervening aberrating medium is one wave of spherical aberration with phase is $P(R,\theta)=R^4$. MTFs 4311, 4321, and 4331 in plot 4350 are horizontal slices (at zero vertical spatial frequency) of plots 4310, 4320, and 4330, respectively. The classical misfocus 2D MTF shown in plot 4310 and the classical misfocus 1D MTF 4311 shows a significant MTF drop from the diffraction-limited system. The two orthogonal CSR filter MTFs are markedly higher, with the 2D CSR filter 2D MTF shown in plot 4330 and the 1D MTF 4331 being noticeably higher than that of the orthogonal system 1D CSR filter 2D MTF shown in plot 4320 and 1D MTF 4321. The RMS noise gain for the classical system is 4.04 while for the 2D MTF shown in plot 4320 it is 0.94 and 0.48 for the 2D CSR filter 2D MTF shown in plot 4330.

Figure 44:
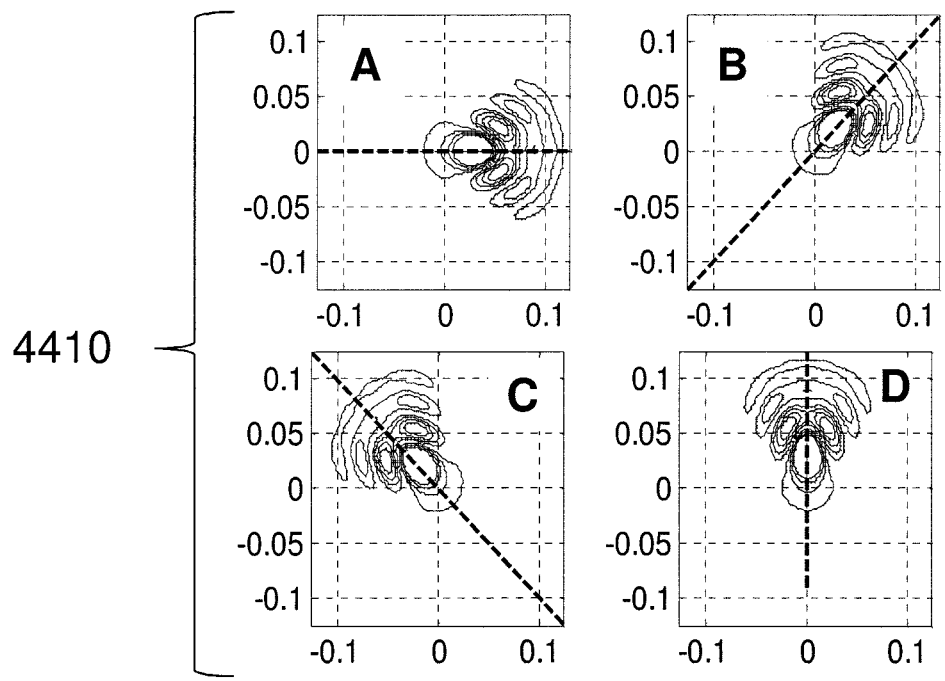
FIG. 44 shows the CSR representing the aberration of FIG. 43, in an embodiment.

FIG. 44 shows the CSR representing the aberration of FIG. 43. Again the 2D CSR filters of FIG. 39 better match the aberrated CSRs than do the 1D CSR filters from FIG. 36. This better match results in a higher MTF and a lower processing noise gain.

Figure 45:
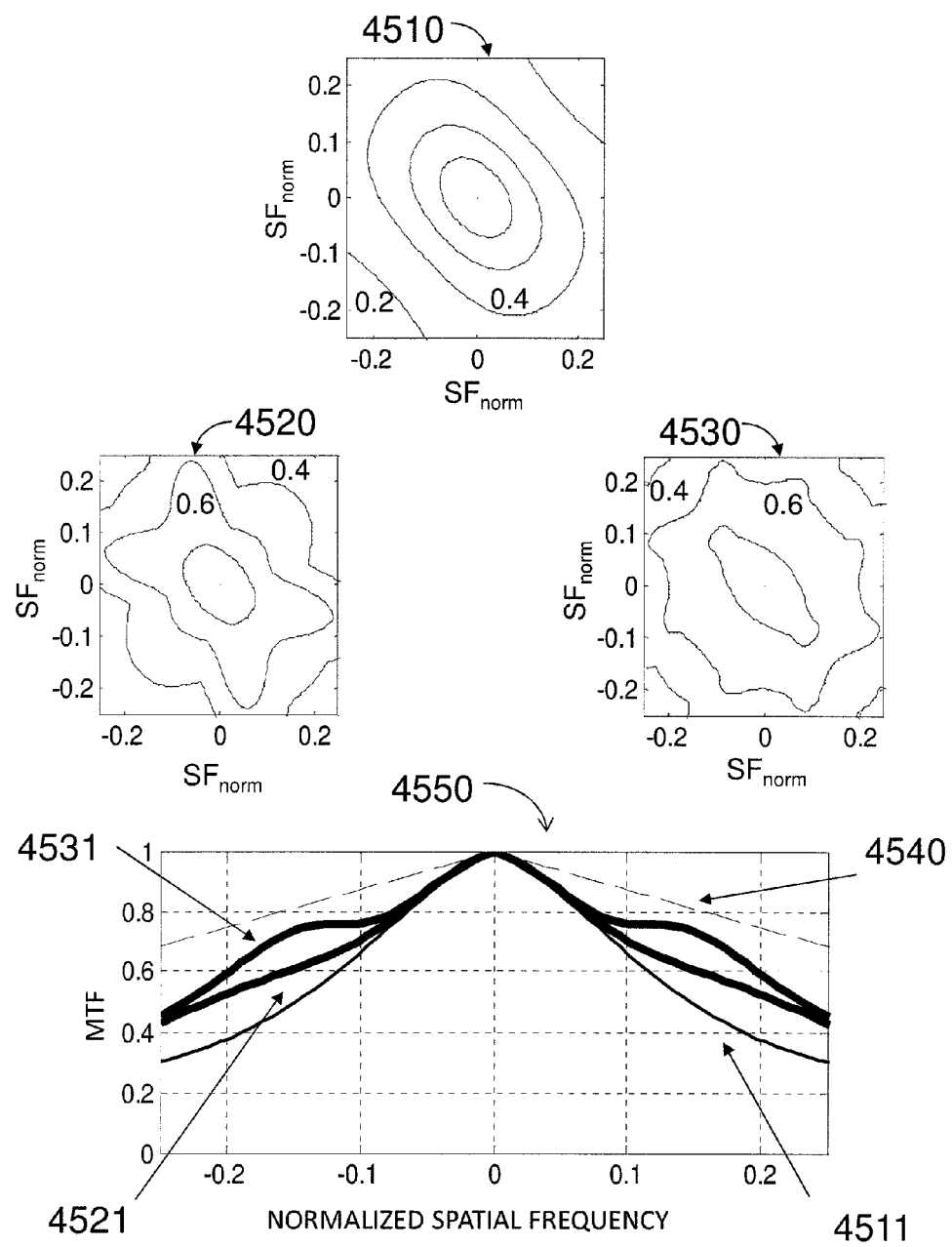
FIG. 45 shows an example of recovering lost OTF in a guidance system employing mutually distinct signal-modifying electro-optical sensors where the aberration is 1.25 waves of coma.

FIG. 45 describes an example of recovering lost OTF in a guidance system employing mutually distinct signal-modifying electro-optical sensors where the aberration is 1.25 waves of coma, or $P(R,\theta)=1.25\ R^3 * \sin(\theta+\pi/4)$. MTFs 4511, 4521, and 4531 in plot 4550 are horizontal slices (at zero vertical spatial frequency) of plots 4510, 4520, and 4530, respectively. Again the lowest MTF is from the classical imaging system while the highest is from the 2D CSR filtered system. The noise gain for the classical system shown in plot 4510 is 1.94, for the 1D CSR filter related to plot 4520 is 0.83 and for the 2D CSR filter of plot 4530 the noise gain is 0.58.

Figure 46:
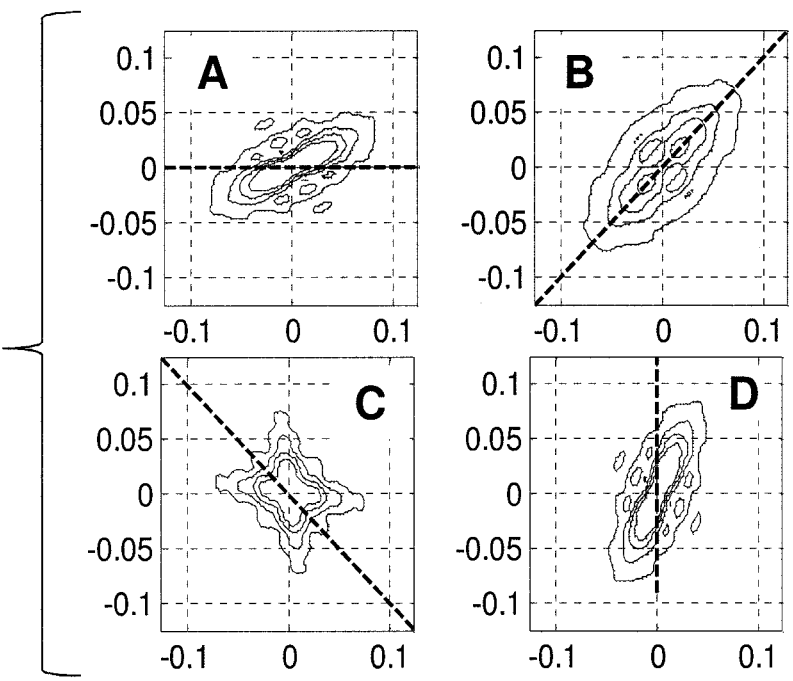
FIG. 46 shows the CSR for the comatic aberration of FIG. 45, in an embodiment.

FIG. 46 describes the CSR for the comatic aberration of FIG. 45. This CSR is very broad for the diagonal spatial frequency in 4610B. This results in the low diagonal MTFs of plot 4510.

Figure 47:
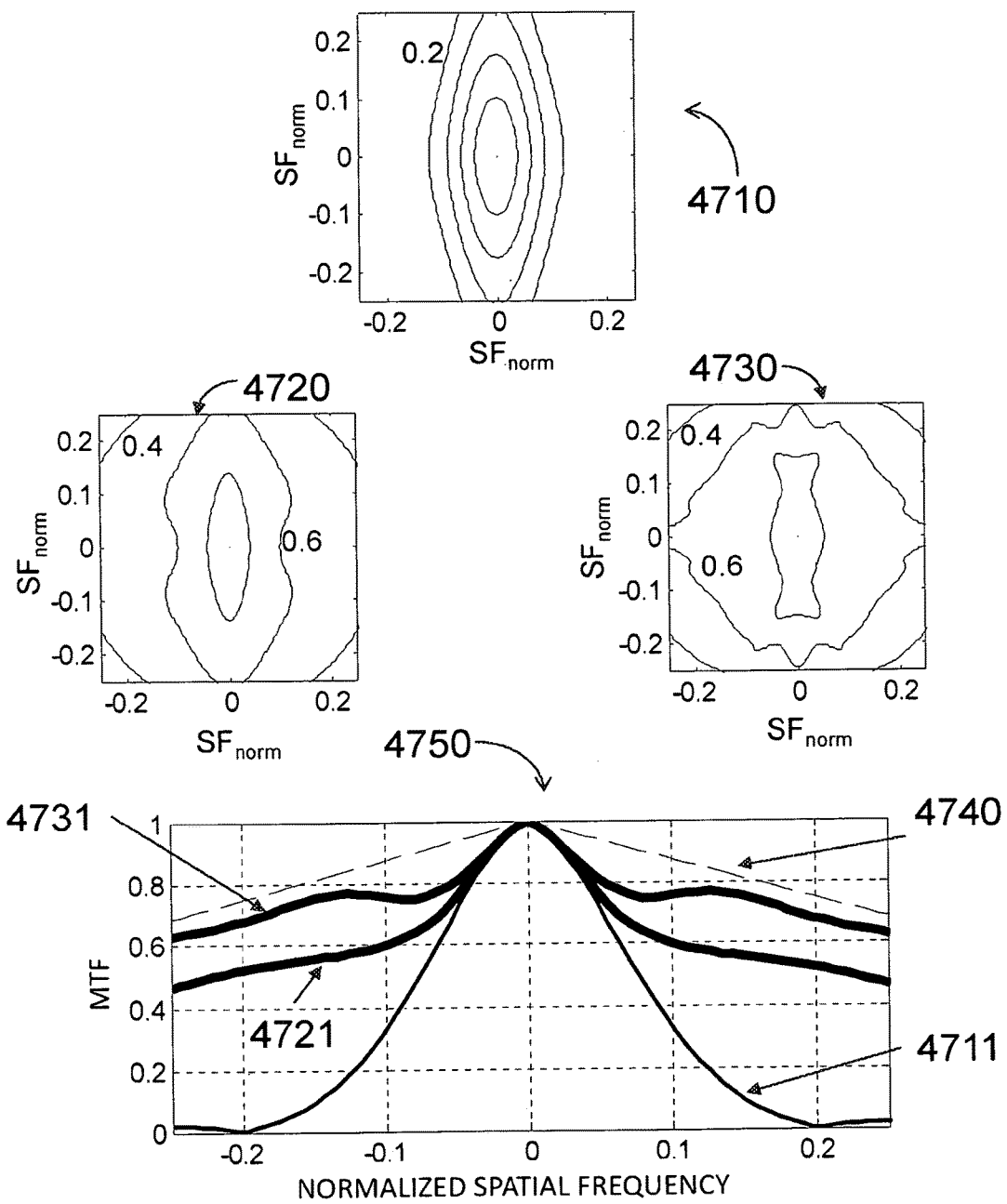
FIG. 47 illustrates an example of orthogonal CSR filtering showing aberrations that resulting in zeros in the classical MTF but not in the orthogonal sampled systems, in an embodiment.

The example of orthogonal CSR filtering in FIG. 47 shows aberrations that resulting in zeros in the classical MTF but not in the orthogonal sampled systems. In this example both spherical aberration and astigmatism are present. The aberration is described as $P(R,\theta)=(\frac{3}{8})R^4+(\frac{3}{4})R^2 \cos(2\theta)$. MTFs 4711, 4721, and 4731 in plot 4750 are horizontal slices (at zero vertical spatial frequency) of plots 4710, 4720, and 4730, respectively. The classical MTFs in 4710 and 4711 show low enough values in horizontal and diagonal spatial frequencies to cause zeros. In these broad regions essentially no information is transferred through the channel due to the effects of the aberration. The 2D MTFs shown in plots 4720 and 4730, and their respective corresponding 1D MTFs, 4721 and 4731, show very high values. In fact, the MTFs did not significantly change relative to the previously mentioned aberrations, especially when compared to the large MTFs changes in the classical system. The noise gain for the example of FIG. 47 is 10^5 for the classical system, 0.73 for the 1D CSR filtered system and 0.56 for the 2D CSR filtered system.

Figure 48:
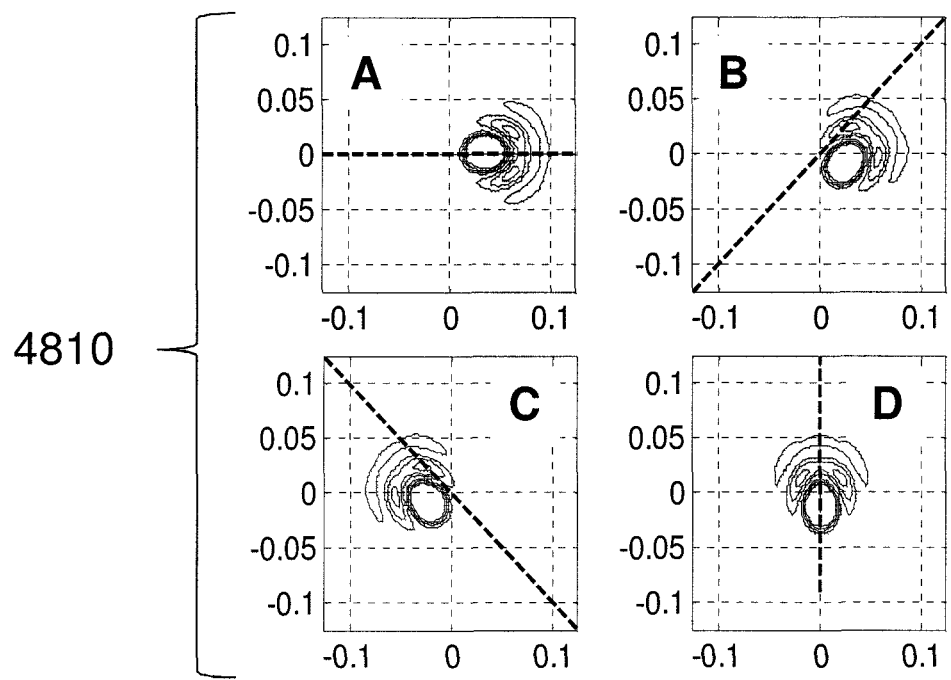
FIG. 48 shows the CSR for the aberration related to FIG. 47.

FIG. 48 shows the CSR for the aberration related to FIG. 47. In graphs 4810A and 4810B the CSR power at the origin (0,0) is essentially zero while the CSR power is relatively high at the origin in subplot 4810D. This is the CSR version of the 2D MTF of plot 4710 in FIG. 47 where the horizontal and diagonal MTFs are very low. However, both the 1D and 2D CSR filters, shown in plots 4720 and 4730 respectively, may adequately match the aberrated CSR resulting in little loss of MTF or information through the aberrated channel.

Figure 49:
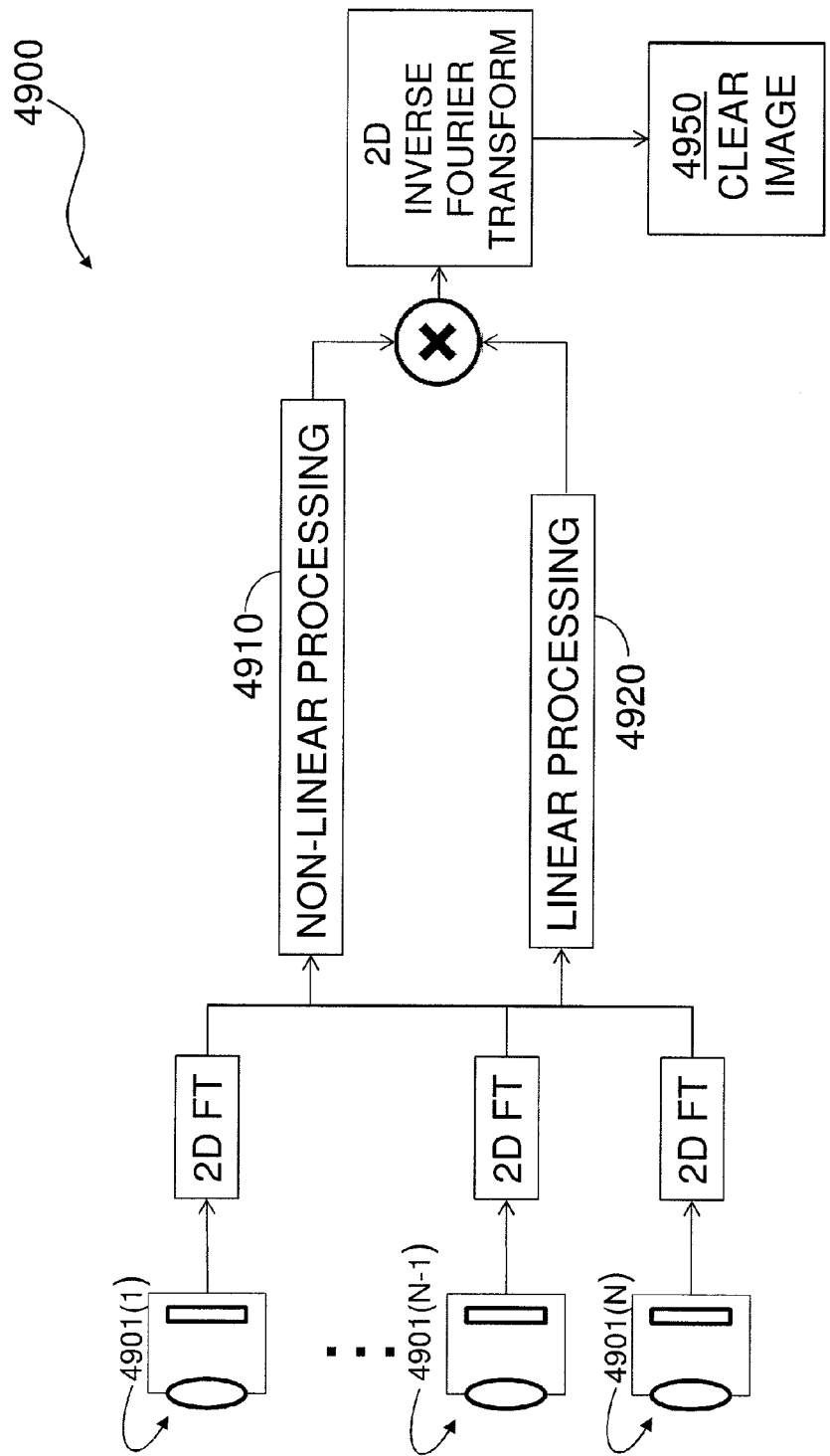
FIG. 49 shows multiple mutually distinct apertures, each with a unique CSR building block leading to an optical guidance system with mutually distinct signal-modifying sensors, in an embodiment.

FIG. 49 through FIG. 52 describe an example of the optical configuration and CSR processing to produce the results of FIG. 41, FIG. 43, FIG. 45 and FIG. 47. FIG. 49 describes multiple electro-optical sensors 4901, which are mutually distinct by virtue of including mutually distinct apertures, each corresponding to a unique CSR building block. For the above examples, there would be five electro-optical sensors for the 1D CSR filter and 15 for the 2D CSR filter.

FIG. 49 shows an optical guidance system 4900 for generating aberration-corrected images. System 4900 includes multiple mutually distinct apertures, each with a unique CSR building block leading to an optical guidance system with mutually distinct signal-modifying sensors. System 4900 in FIG. 49 represents both a linear and non-linear component of the CSR processing chain. The outputs of electro-optical sensors 4901 (4901(1), 4901(2), . . . , 4901(N)) behind multiple mutually distinct apertures within electro-optical sensors 4901 undergo a 2D Fourier Transform and are then acted on by non-linear processing step 4910 and linear processing step 4920. The outputs of the linear and non-linear processing steps are then combined and inverse Fourier Transformed resulting in a clear image useful for other parts of the system. Other implementations could be in the spatial domain as well. The processing may be done in blocks across the sampled images from electro-optical sensors 4901, sliding overlapping regions or for the entire image, depending on the goals of the system. In an embodiment, processor 2710 (FIG. 27) may include processing 4910 and 4920.

Figure 50:
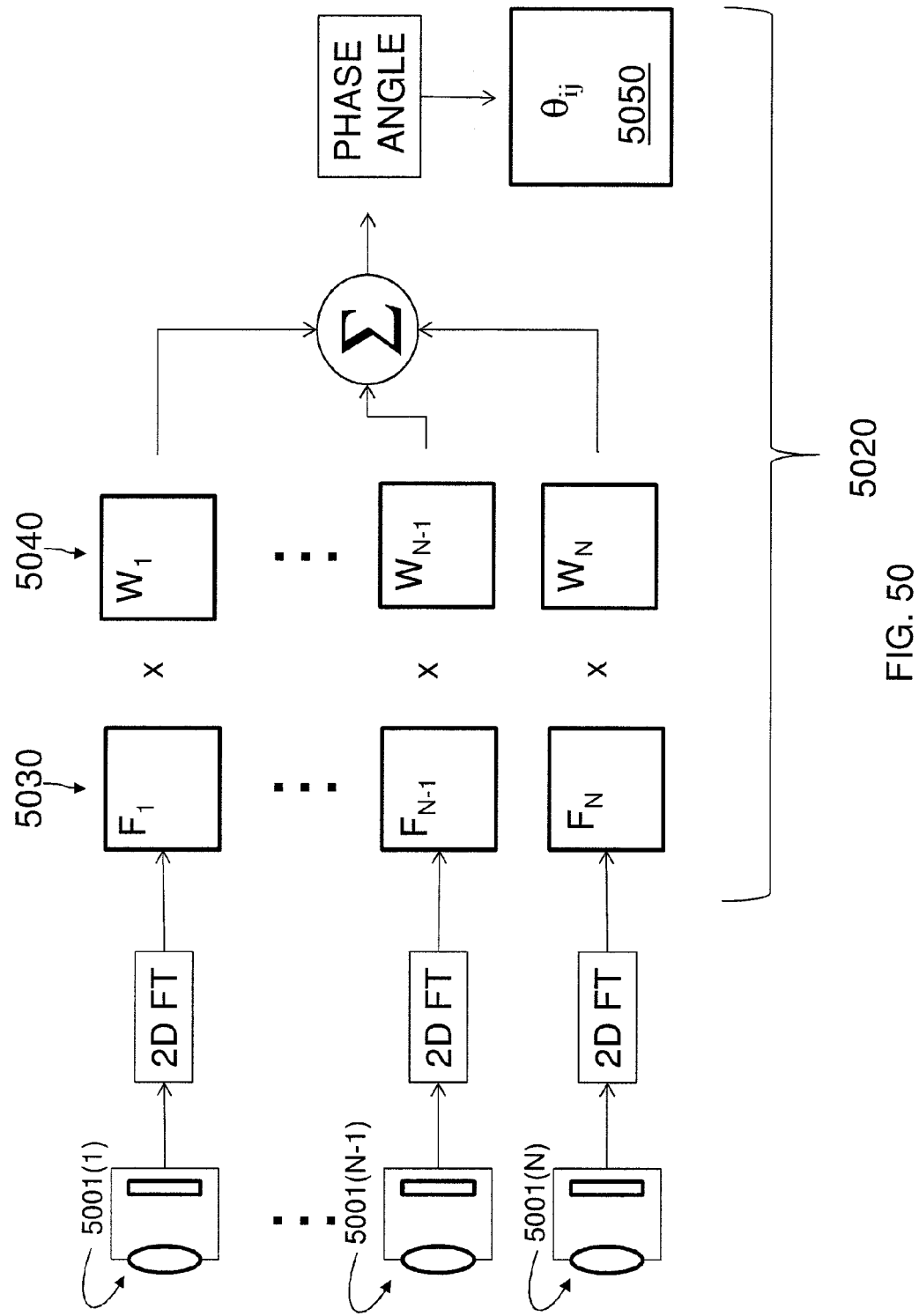
FIG. 50 shows the linear processing component of FIG. 49, in an embodiment.

FIG. 50 describes the linear processing component of FIG. 49. Section 5020 is analogous to linear processing 4920. The linear processing is related to forming the proper phase response. The phase components of the 2D Fourier Transforms of electro-optical sensors 5001, each of which include a mutually distinct aperture, are denoted by 5030. These phase components 5030 are then weighted with complex system-dependent weights 5040, summed and the resulting phase angle estimates 5050 formed. The complex system-dependent weights 5040 represent the conjugate of the phase of the CSR for each spatial frequency in 5030 related to each electro-optical sensor 5001(i), each including a mutually distinct aperture. The phase may be measured through a calibration signal, such a projecting parallel light, or through some a priori information about the object, like edges, lines, sparsity, etc. After combining the weighted spatial frequency information the resulting phase angle for each spatial frequency is estimated.

Figure 51:
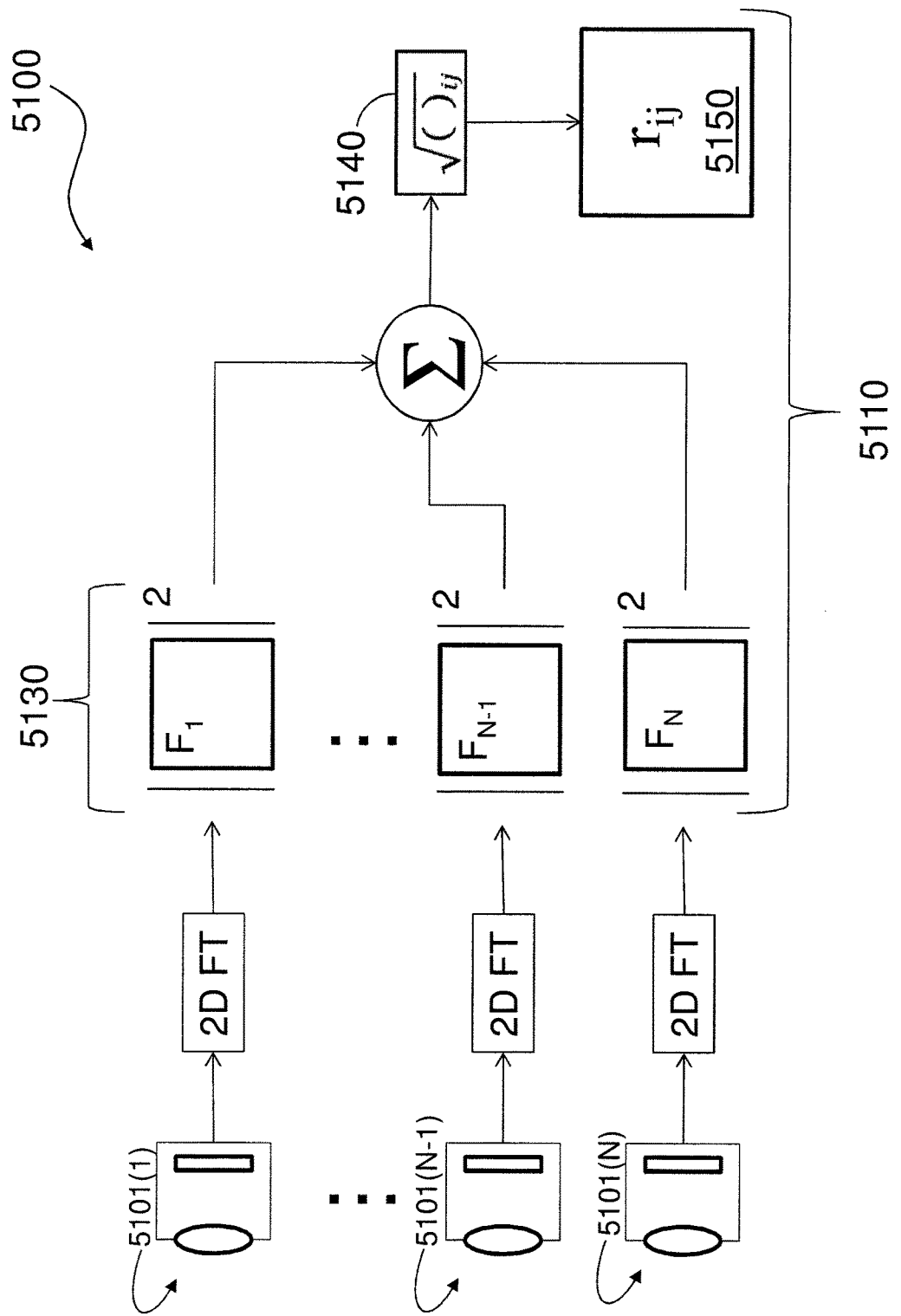
FIG. 51 shows a non-linear processing component of FIG. 49, in an embodiment.

The system 5100 of FIG. 51 is the non-linear processing component related to CSR processing systems. Section 5110 represents non-linear processing step 4910 in FIG. 49. The magnitude squared of the Fourier Transform of the spatial data from electro-optical sensors 5101 is formed in magnitude squared quantities 5130. These magnitude squared quantities are then summed point by point. The square root of each summed value is then formed in rms array 5140. The result 5150 is the corrected MTF value for each spatial frequency of magnitude squared quantities 5130 relative to the N orthogonal electro-optical sensors 5101, each of which includes an aperture that is mutually distinct with respect to the other (N−1) apertures included in sensors 5101. This non-linear processing is essentially forming the RMS values for each measured spatial frequency.

Figure 52:
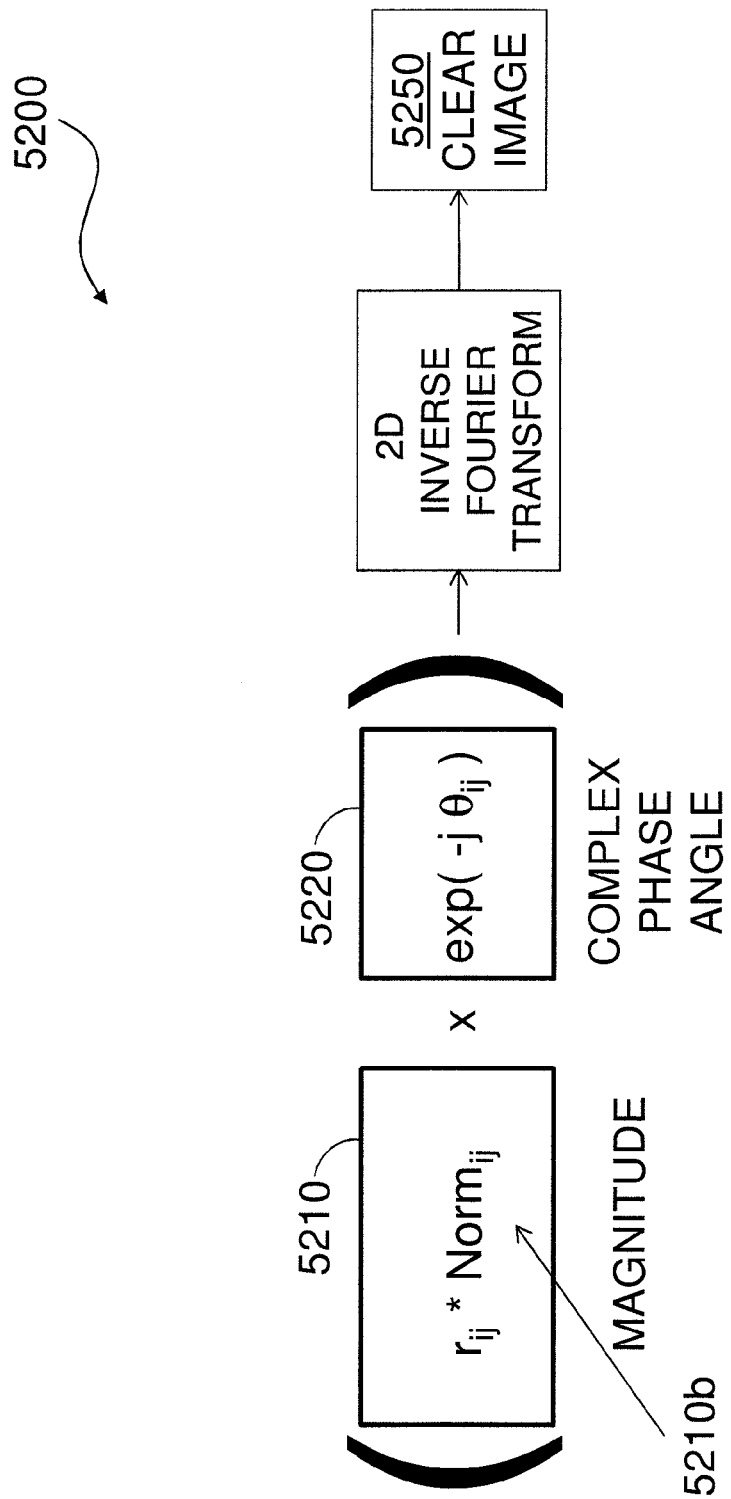
FIG. 52 shows forming an aberration-corrected image from the 2D inverse Fourier Transform of the product of the magnitude estimates, in an embodiment.

FIG. 52 shows a method 5200 for forming an aberration-corrected image from the 2D inverse Fourier Transform of the product of the magnitude estimates 5210 (section 5110 from FIG. 51) and the complex phase angle estimates 5220 (phase angle estimates 5050 from FIG. 50). The normalization term 5210b is chosen so that the MTF matches the diffraction-limited MTF, or other particular target, when no aberrations are present. The final clear image 5250 is formed.

Actual embodiments of optical/digital orthogonal sampling systems are represented in FIG. 53-57. One channel of the optical system is represented by system 5300 in FIG. 53. The aperture stop of the channel represented by system 5300 is on the front of the first lens element 5300a behind distinct phase filter 5310. The second lens element 5300b acts to make system 5300 telecentric: chief rays from each object point at the image plane 5300c are parallel to the optic axis and perpendicular to the image plane. The location of the image spot at the image plane is then independent of focus.

Mutually distinct phase and amplitude signal-modifying components 2702 from FIG. 27 may be directly configured in system 5300 either at the front and/or back of the channel. As is well known, since the aperture stop is at the front, distinct phase filter 5310 may be used to directly change the exit pupil. The distinct phase may also be formed directly as part of the first lens element 5300a. Distinct amplitude and phase may also be placed near the image plane 5300c before the detector.

The MTF over ±20 degree FOV is essentially diffraction limited as shown by MTFs 5320. In addition, the relative illumination, shown in plot 5330, is essentially constant over the entire field. The relative illumination has been purposely designed to be constant as a function of FOV in order to maximize SNR across the entire field.

Figure 53:
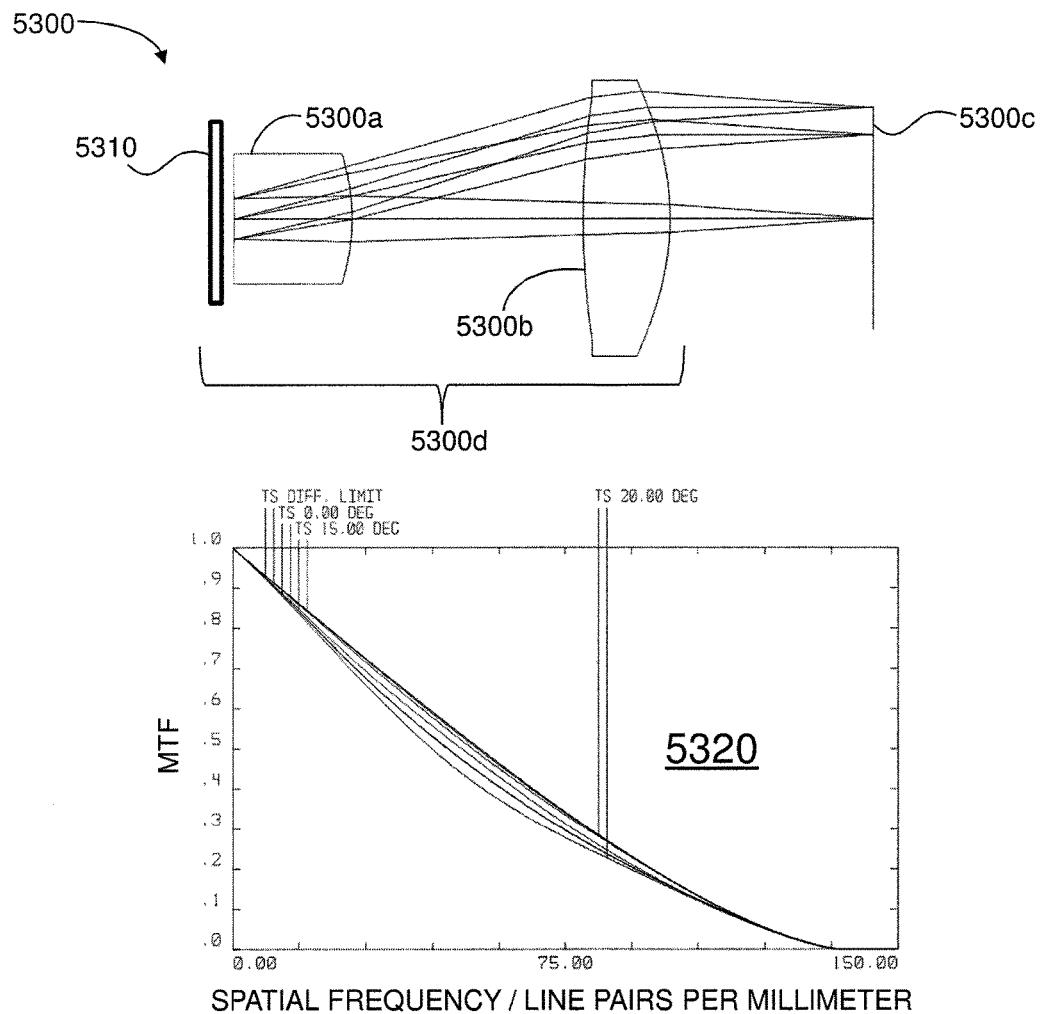
FIG. 53 shows a ray trace through one channel of an optical/digital guidance system, in an embodiment.
Figure 53:
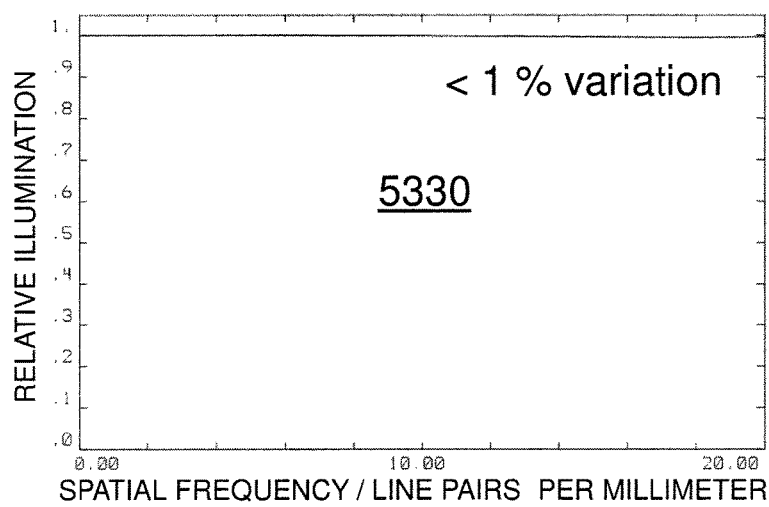

FIG. 54 describes the spherical 5410 and aspherical 5411 components of lens elements 5300a and 5300b of the channel represented by system 5300 of FIG. 53. This channel represented by system 5300 has been designed to operate at a wavelength of 950 nm. The on-axis focal length of this system is 5.5 mm and the F/#=8.

Figure 55:
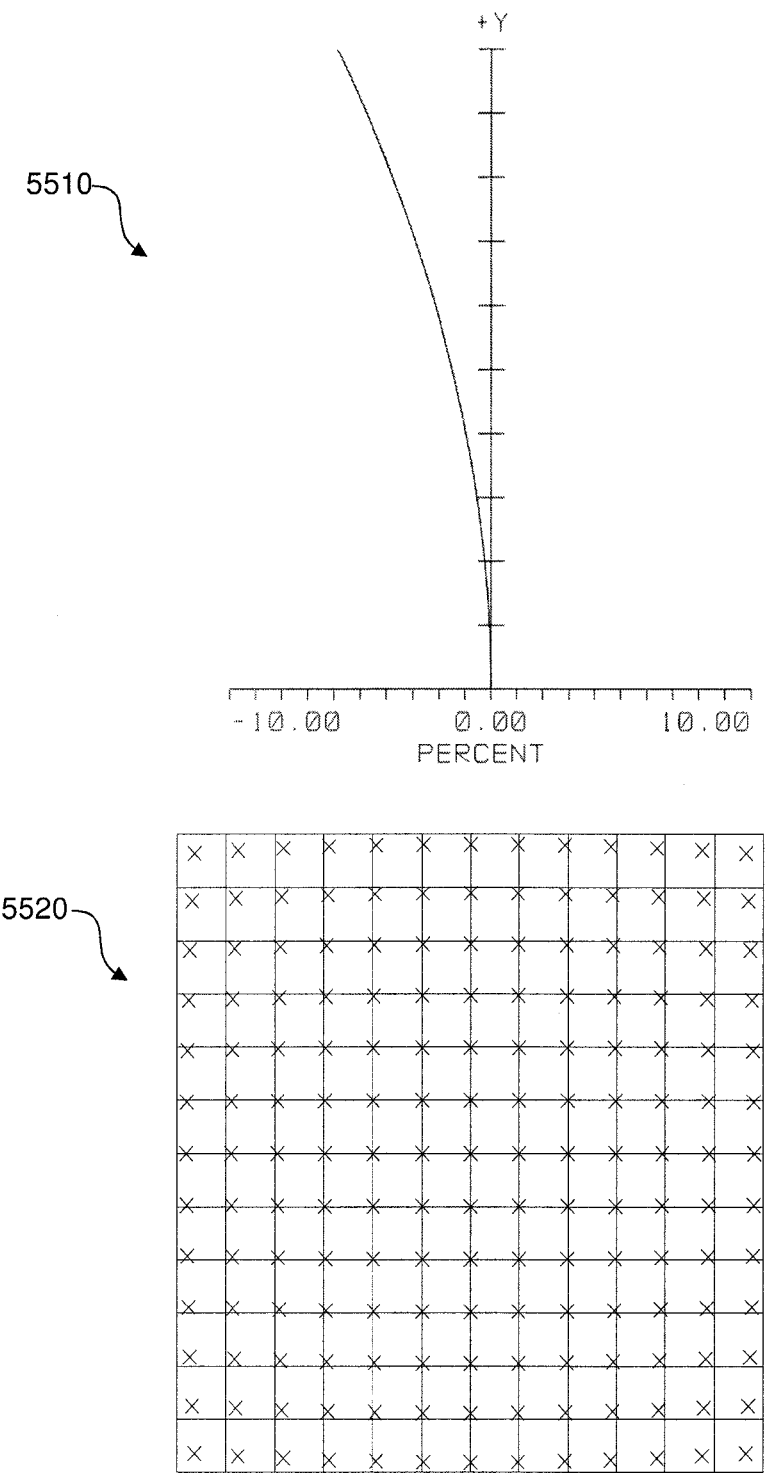
FIG. 55 shows distortion of lens system in FIG. 53.

FIG. 55 describes the distortion of system 5300 in FIG. 53. To keep the relative illumination constant, the distortion, for such a simple and low-cost system, must increase. In other words, instead of the relative illumination decreasing in a cosine-like manner across the field, the local F/# of system 5300 was purposely designed to be slightly decreasing at larger field angles to compensate for the loss of apparent aperture size with angle to the object. This change of F/# leads to a change in local focal length with field and therefore a change in magnification or distortion. The distortion is under 6% for this lens, as shown in plots 5510 and 5520

Figure 56:
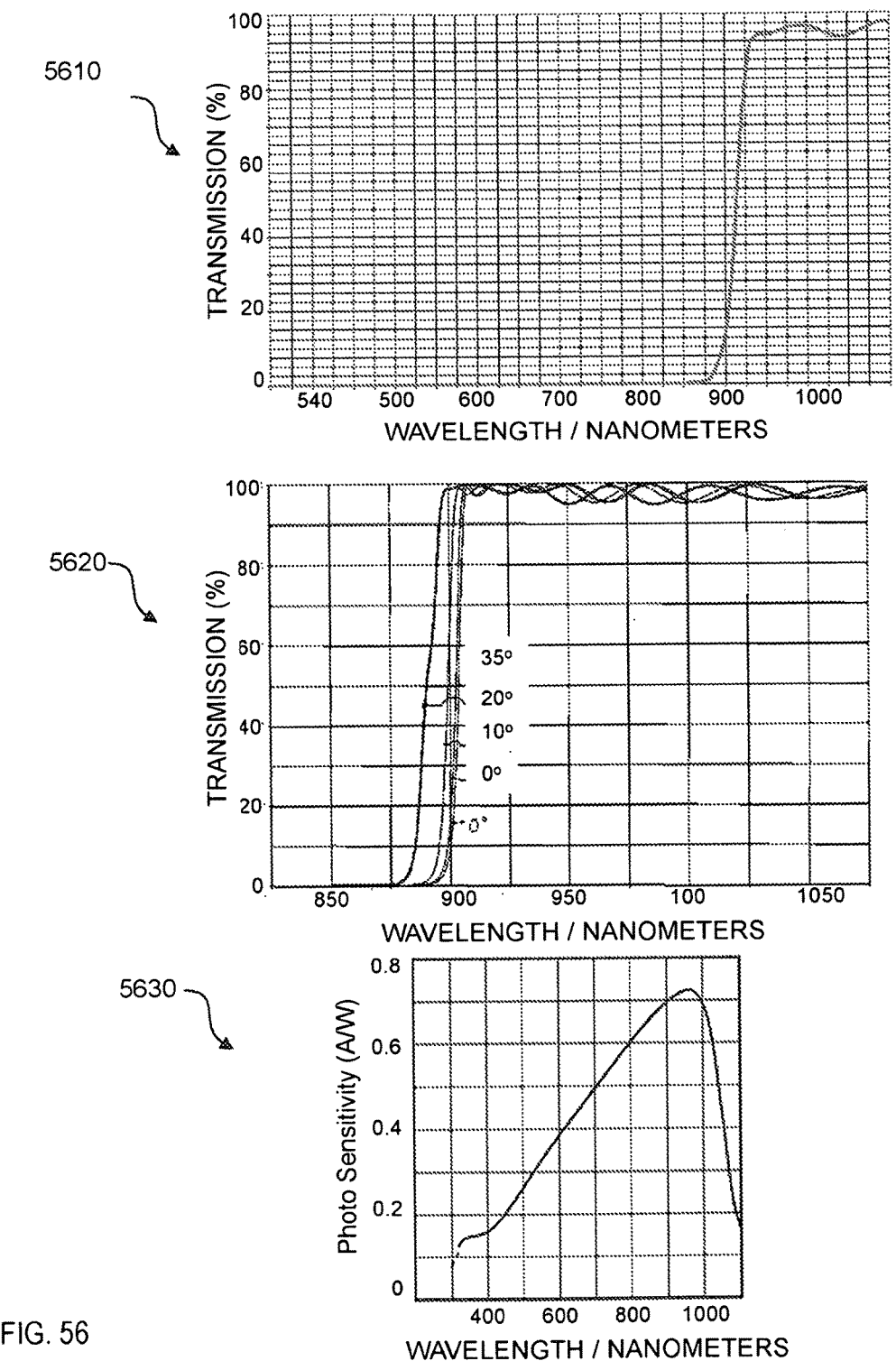
FIG. 56 shows the bandpass nature of the illumination used in the optical system in FIG. 53.

FIG. 56 describes the bandpass nature of the illumination used in the system 5300 in FIG. 53. The detector used is a Hamamatsu S5106 single-pixel detector and has a photo sensitivity that quickly decreases beyond λ970 nm, as shown in plot 5630. The long pass optical filter 5610 (LP920 by Midwest Optical Systems) has a strong cutoff to illumination wavelengths below 925 nm. In addition, the cutoff frequency of this optical filter as a function of indecent angle varies very little for angles between ±20 degrees, as shown in plot 5620. The optical long pass filter and low pass nature of the detector result in a bandpass effect centered at λ=950 nm.

Figure 57:
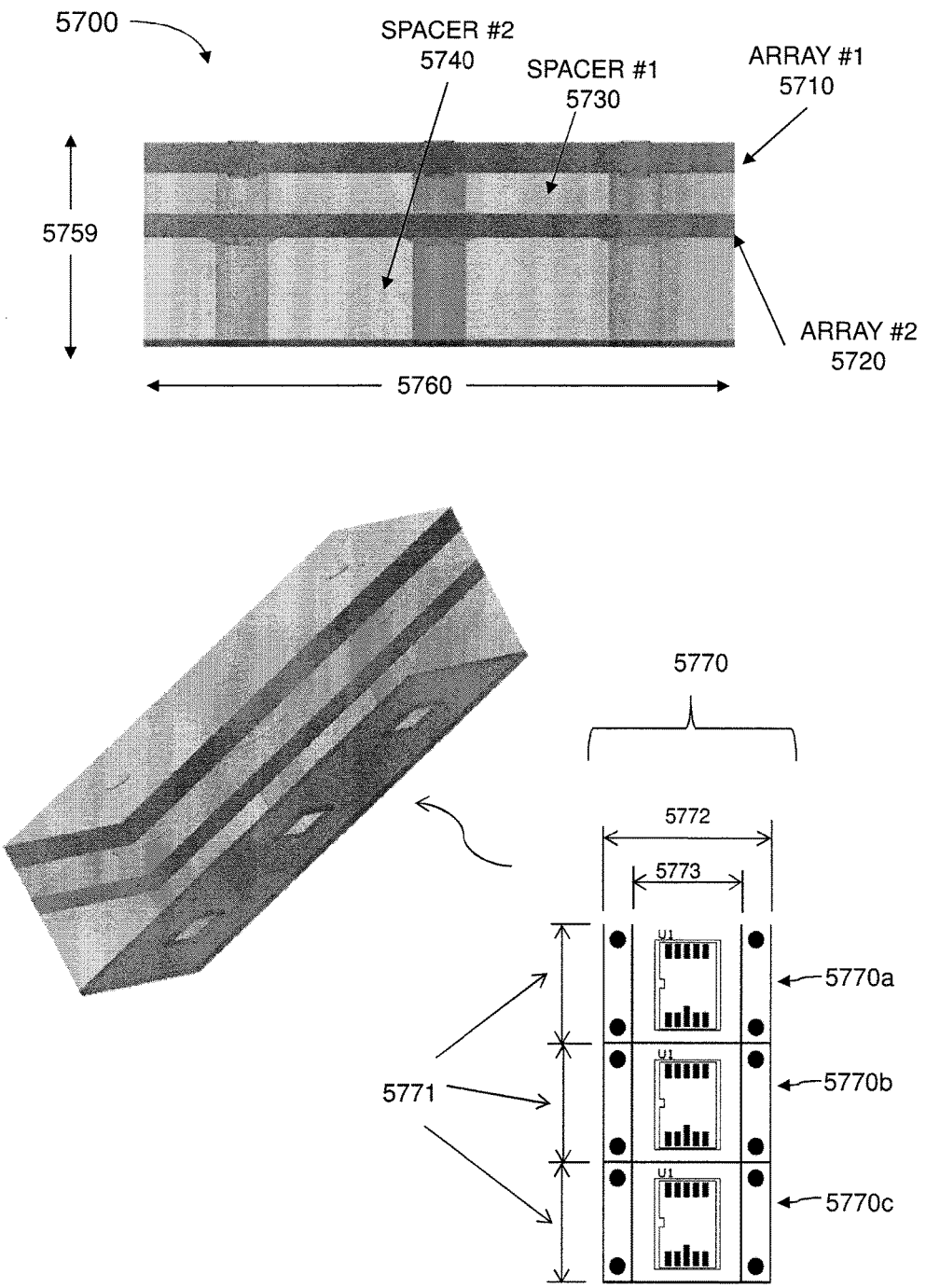
FIG. 57 shows 3×1 channels of a guidance system employing mutually distinct signal-modifying electro-optical sensors.

One optical configuration for multiple apertures that is mechanically robust and may be fabricated at low cost is monolithic or wafer scale. FIG. 57 shows 3×1 channels of a complete guidance system. System 5700 shows the side view of this system highlighting the first lens array 5710 and the second lens array 5720. In an embodiment, the dimensions 5759 and 5760 are 12 mm and 45 mm respectively. The spacers that separate the lens elements and the detectors are given by 5730 and 5740 respectively. All components of the monolithic configuration may have optically absorptive coatings (besides the centers of the optical elements) to reduce the effects of stray light from strong sources, such as the sun. For smaller manufacturing volumes the lens arrays may be machined, milled, ground or injection-molded lenses that are assembled into lens holders forming lens arrays. For higher manufacturing volumes the lens arrays including optics may be directly molded in one piece. The molding may be through injection molding or replication with specialized epoxies on glass or similar substrates.

The electrical components of the entire system are mounted near the image plane. For system 5700 the electrical array 5770 consists of individual detectors 5770a, 5770b and 5770c mounted on separate electronic circuit boards. In an embodiment, the dimensions 5771 and 5773 are 15 mm, and the dimension 5772 is 23 mm. Each detector board is mounted directly to the second spacer, or to an interposer mounted to the second spacer, allowing ease of use and variability. All detectors of 5770 could also be mounted on a single circuit board depending on the manufacturing quantity.

There are a wide variety of potentially different system configurations depending on the quantities and/or cost and complexity targets for different sub-systems. Systems are composed of at least one of two main sub-systems consisting of i) optics/electronics related to the object to be localized, and ii) optics/electronics related to the system that receives information and forms localization estimates. These are termed object-side sub-systems and receiver-side sub-systems, respectively.

In some situations there could be a large number of distributed object-side sub-systems and relatively few receiver-side sub-systems. In this case it may be beneficial to reduce the cost and complexity of the object-side sub-systems. In other situations there could be a large number of receiver-side sub-systems or there could be the need to reduce the cost of each receiver-side sub-system. For example, very sensitive photon-counting detectors could be used in the receiver-side sub-systems to enable long range with eye-safe transmit power. Reducing the overall cost and complexity of the receiver-side sub-system could then be a system-wide tradeoff where additional cost and complexity is added to the object-side sub-systems. Yet another situation is where the overall cost and complexity is balanced between the object and receiver-side sub-systems.

Figure 58:
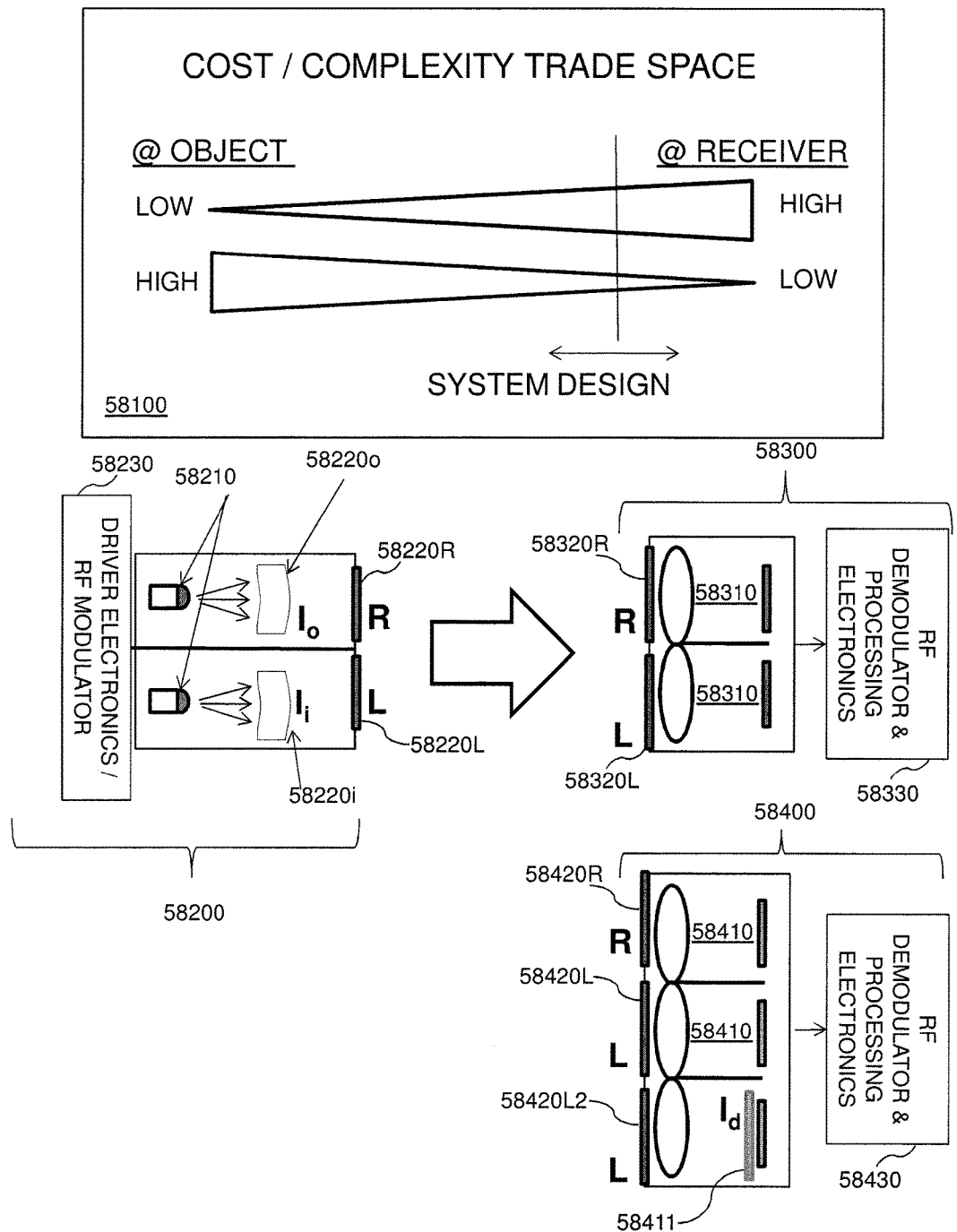
FIG. 58 shows systems and methods to jointly optimize both object-side and receiver-side sub-system cost and complexity, in an embodiment.
Figure 59:
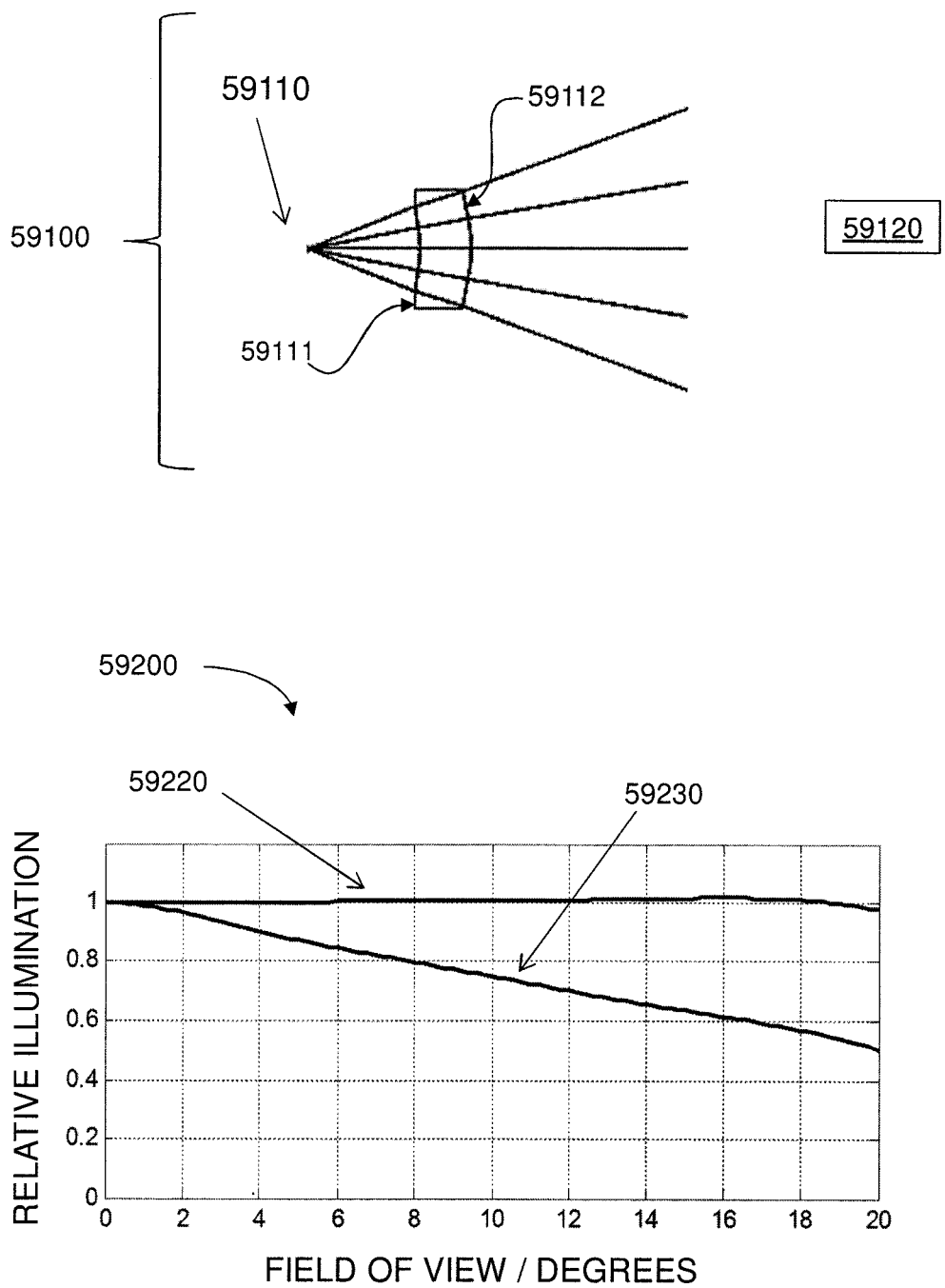
FIG. 59 shows unique object-side projection optics of FIG. 58, in an embodiment.

FIGS. 58 to 60 describe systems and methods to jointly optimize both object-side and receiver-side sub-system cost and complexity. Graphic 58100 describes the general Cost/Complexity trade space. In order to reduce the cost and/or complexity of the object-side sub-systems, the cost and complexity of the receiver-side sub-systems need to increase and vice versa. There may also be a middle ground where cost and complexity of both object-side and receiver-side sub-systems are balanced.

Object-side sub-system 58200 and receiver-side sub-system 58300 describe one example of reducing the costs and complexity of the receiver-side sub-system while increasing the cost and complexity of the object-side sub-system. Numerous object-side systems that differ in projected information may be used with a relatively small number of receiver-side systems that have minimum complexity.

Object-side sub-system 58200 contains illumination sources 58210 and mutually distinct object-side projection optics 58220*o* and 58220*i*. Illumination sources 58210 may, for example, be LEDs. Electronics 58230 acts to both drive the illumination sources 58210 so that the relative difference between illumination output of illumination sources 58210 is below some desired level as well as to provide temporally modulated signals. The mutually distinct object-side projection optics 58220*o* and 58220*i* act to project light towards distant receiver-side sub-systems in an essentially constant power vs. angle or with a specially varying power vs. angle. Different object-side sub-systems could differ in different power vs. angle. Right and left circular polarizers 58220R and 58220L enable the separation of the two outputs at the receiver sub-system 58300 independent of the relative physical orientation of sub-systems 58200 and 58300.

Receiver-side sub-system 58300 consists of right and left circular polarizers 58320R and 58320L that separates the two orthogonally polarized signals projected from the object-side sub-system. Optical channels 58310 consist of optics and detectors may be identical, as is shown in 58300. RF demodulation and processing electronics 58330 act to demodulate signals from a number of distant object-side systems similar to object-side sub-system 58200. Notice that the receiver-side sub-system 58300 has the minimum of physical complexity while the object-side sub-system 58200 has a higher degree of complexity. The orthogonal polarizers act to separate the two channels, defined by 58220R and 58220L.

A related variation for the receiver-side sub-system is shown in receiver-side sub-system 58400. This receiver-side sub-system is similar to that of 58300 with the addition of one more channels that produce additional information in order to increase estimate precision. Different channels 58410 of receiver-side sub-system 58400 have either right or left circular polarizers (such a 58420R, 58420L and 58420L2). The optics and detector related to 58420R and 58420L are assumed to be the same as the corresponding channels in receiver-side sub-system 58300. The optics related to left circular polarizer 58420L2 differs by the addition of optical component 58411. Optical component 58411 is an intensity and/or phase component that varies the detected intensity vs. angle from the optical axis. Optical component 58411 acts in concert with object-side projection optic 58220*i* to give a different measurement that may increase estimate precision. For example, optical component 58411 could increase the slope of detected optical power vs. angle above that provided by mutually distinct object-side projection optics 58220*i*. Unique object-side projection optics 58220*o* projects optical power that is detected and considered a control.

FIG. 59 describes in detail the mutually distinct object-side projection optics 58220*o* and 58220*i* of FIG. 58. System 59100 is a drawing of both mutually distinct optics. An LED is mounted at position 59110, which acts as the aperture stop of system 59100. Surface 59111 is the first surface and surface 59112 is the second surface of this type of project optic. Distant receiver 59120 represents a distant sub-system that receives projected power from system 59100.

Graph 59200 describes the relative illumination for two different versions of system 59100. Relative illumination 59220 describes an essentially constant relative illumination over a 20-degree field of view while relative illumination 59230 describes a relative illumination that essentially linearly varies with field of view. Relative illumination 59220 may represent object-side projection optic 58220*o* from FIG. 58 and relative illumination 59230 may represent object-side projection optic 58220*i* from FIG. 58. The relative illumination is the relative amount of projected power that could be seen by distant receiver 59120 depending on the angle of distant receiver 59120 to system 59100. It was assumed that the LED at position 59110 has the same output power vs. angle of illumination sources 58210 of FIG. 58. If the LED output vs. angle is not constant, it may be compensated through the aspheric design process so that the combination of LED power vs. angle and aspheric optics power vs. angle matches a design specification.

In the version of system 59100 corresponding to relative illumination 59230, system 59100 achieves an engineered relative illumination profile by purposely designing an aspheric optic so that the effective focal length changes as a function of field of view. In this case the focal length linearly decreases as a function of field of view. Many other relative illumination profiles may be practical. A benefit of system 59100 with relative illumination 59230 is that only a single inexpensive optical component is used to modify power vs. angle of the object-side sub-system.

FIG. 60 describes in detail the optical configurations related to relative illumination 59220 and relative illumination 59230 of FIG. 59 in a well-known Zemax-type of format. Tables 60100 and 60101 describe the single lens optical system that forms relative illumination 59220 and Tables 60200 and 60201 describe the optical system that forms relative illumination 59230. Tables 60101 and 60201 describe the circularly symmetric aspheric terms such as 4th order, 6th order, etc. The optical systems of FIG. 60 are intended to be used with 900 nm illumination.

Combinations of Features

Features described above as well as those claimed below may be combined in various ways without departing from the scope hereof For example, it will be appreciated that aspects of one guidance system or method described herein may incorporate or swap features of another guidance system or method described herein. The following examples illustrate possible, non-limiting combinations of embodiments described above. It should be clear that many other changes and modifications may be made to the methods and device herein without departing from the spirit and scope of this invention:

(A1) Guidance system for determining a location parameter of an object, comprising may include (a) at least one oscillating element located at the object for emitting modulated optical radiation; (b) at least two mutually-distinct signal-modifying electro-optical sensors, each of the electro-optical sensors having a detector, and a demodulator for generating a demodulated electrical signal in response to detection of at least a portion of the modulated optical radiation; and a processor for determining the location parameter from the demodulated electrical signals.

(A2) The guidance system denoted as (A1), the at least one oscillating element comprising three transmitters emitting mutually distinctly modulated optical radiation, and the location parameter being three-dimensional location and three-dimensional orientation of the object relative to the electro-optical sensors.

(A3) In either of the guidance systems denoted as (A1) or (A2), the demodulator being associated with a respective one of the at least three electro-optical sensors, each of the demodulated electrical signals being associated with an associated modulated optical radiation.

(A4) Any of the guidance systems denoted as (A1) through (A3), the at least one transmitter being configured such that the modulated optical radiation is distinct from other optical radiation incident on the electro-optical sensors.

(A5) Any of the guidance systems denoted as (A1) through (A4), the optical detector comprising a single-pixel photodetector for detecting the modulated optical radiation.

(A6) Any of the guidance systems denoted as (A1) through (A5), each demodulator further comprising a filter for rejecting higher-frequency components of the demodulated electrical signal.

(A7) Any of the guidance systems denoted as (A1) through (A6), the modulated optical radiation comprising a plurality of modulation frequencies for determining the object parameter with a respective plurality of accuracies.

(A8) The guidance systems denoted as (A1) through (A7), wherein the modulated optical radiation comprises a plurality of modulation frequencies in order to estimate range through temporal processing and estimate angle through mutually distinct signal modifying sensors.

(A9) The guidance system denoted as (A1) through (A8) wherein the modulated optical radiation comprises a plurality of modulation frequencies in order to reject signals due to reflections.

(A10) The guidance system denoted as (A1) through (A9) wherein each of the at least one oscillating element is a retro-reflector, the system further comprising a transmitter for transmitting the modulated optical radiation to the retro-reflector, for reflecting to the electro-optical sensors.

(A11) The guidance system denoted as (A10), the transmitter being configured such that the modulated optical radiation is distinct from other electromagnetic radiation incident on the electro-optic sensors.

(A12) The guidance system denoted as (A1) through (A11),wherein the modulated optical radiation has modulation frequency in the radio-frequency range.

(A13) The guidance system denoted as (A1) through (A12), wherein the modulated optical radiation has modulation frequency greater than 300 GHz.

(A14) The guidance system denoted as (A1) through (A13), wherein the electro-optical sensors are mutually-distinct by imposing a mutually-distinct spatially-dependent modification on the incident optical radiation.

(A15) The guidance system denoted as (A14), wherein a phase plate with a spatially varying phase transmission function in imposes the mutually-distinct spatially-dependent modification on the incident optical radiation.

(A16) Guidance system with aberration-corrected imaging, comprising: a plurality of electro-optical sensors sharing a field of view and mutually distinctly providing a respective plurality of altered images therefrom; and an image generator module for linearly and non-linearly processing spatial frequency properties of the plurality of altered images to synthesize an aberration-corrected image for the imaging system.

(A17) Guidance system denoted as (A16), wherein intervening medium between an object in the shared field of view and the plurality of electro-optical sensors produces aberrations corrected by the imaging system.

(A18) Guidance system denoted as (A17), the plurality of electro-optical sensors comprising a respective plurality of mutually distinct signal-modifying optical elements for spatially modifying phase of incident optical radiation.

(A19) Guidance system denoted as (A18), each electro-optical sensor comprising an image sensor and an imaging objective for forming an image thereon, the imaging objective comprising the signal-modifying element.

(A20) Guidance system denoted as (A18), each electro-optical sensor comprising an image sensor and an imaging objective for forming an image thereon, the signal-modifying element being separate from the imaging objective.

(A21) Guidance system denoted as (A16) through (A20), the image generator module comprising: a synthesizing module for synthesizing a plurality of complex spatial frequency domain representations, each of the complex spatial frequency domain representations being a complex spatial frequency domain representation of a respective one of the plurality of altered images, to determine a composite modulation transfer function response and a composite phase response; and a transformation module for combining and transforming the composite modulation transfer function and the composite phase response to generate the aberration-corrected image.

(A22) Guidance system denoted as (A21), the synthesizing module determining the composite modulation transfer function response from root-mean-square magnitude of the plurality of complex spatial frequency domain representations.

(A23) Guidance system denoted as (A22), the synthesizing module determining the composite phase response from weighted averaging of phases of the plurality of complex spatial frequency domain representations.

(A24) Guidance system denoted as (A23), the plurality of electro-optical sensors comprising a respective plurality of mutually distinct signal-modifying optical element for spatially modifying phase of incident optical radiation, and wherein weights in the weighted averaging are determined from phases of the plurality of signal-modifying optical elements.

(A25) Guidance system denoted as (A22) through (A24), the transformation module further applying a normalization factor such that the composite modulation transfer function response best matches a reference modulation transfer function response.

(A26) Guidance system denoted as (A22) through (A25), the image generator module comprising: a processor; a memory communicatively coupled with the processor, the memory comprising a non-volatile portion that includes (a) machine-readable synthesizing instructions that, when executed by the processor, perform the function of synthesizing, and (b) machine-readable transformation instructions that, when executed by the processor, perform the functions of combining and transforming (A27) Guidance system denoted as (A26), the machine-readable synthesizing instructions further including instructions for determining the composite modulation transfer function response from root-mean-square magnitude of the plurality of complex spatial frequency domain representations.

(A28) Guidance system denoted as (A26) through (A27), the machine-readable synthesizing instructions further including instructions for determining the composite phase response from weighted averaging of phases of the plurality of complex spatial frequency domain representations.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. Guidance system for determining a location parameter of a first object with respect to a second object, comprising:
    a first element a second element, and a third element each located at the second object configured to, respectively, modulated optical radiation M1, M2, and M3, each of the first, second, and third elements being one of a transmitter and a retro-reflector;
    a receiver at the first object including
        a first electro-optical sensor including (i) a first signal-modifying optical element having a first transmission function, (ii) a first detector configured to detect modulated optical radiation M1, M2, and M3 transmitted through the first signal-modifying optical element, and (iii) a first demodulator configured to generate, from the modulated optical radiation M1, M2, and M3 detected by the first detector, a respective demodulated electrical signal E1, E2, and E3;
        a second electro-optical sensor including (i) a second signal-modifying optical element having a second transmission function differing from the first spatially-dependent transmission function in at least one of spatially-varying phase transmission and spatially-varying amplitude transmission, (ii) a second detector configured to detect the modulated optical radiation M1, M2, and M3 transmitted through the second signal-modifying optical element, and (iii) a second demodulator configured to generate, from the modulated optical radiation M1, M2, and M3 detected by the second detector, a respective demodulated electrical signal E4, E5, and E6, and
    a processor for determining, from demodulated electrical signals E1-E6, a three-dimensional location and a three-dimensional orientation of the second object relative to the receiver.

2. Guidance system of claim 1, modulated optical radiation M1, M2, and M3 having mutually distinct modulation frequencies.

3. Guidance system of claim 1, the at least one transmitter being configured such that the modulated optical radiation is distinct from other electromagnetic radiation incident on the electro-optical sensors.

4. Guidance system of claim 1, at least one of the first detector and the second detector being a single-pixel photodetector for detecting the modulated optical radiation.

5. Guidance system of claim 1, each demodulator further comprising a filter for rejecting higher-frequency components of the demodulated electrical signal.

6. Guidance system of claim 1, each demodulator acting to remove the effect of unwanted modulated or unmodulated signals.

7. Guidance system of claim 1, modulated optical radiation M1, M2, and M3 comprising a plurality of modulation frequencies for determining the object parameter with a respective plurality of accuracies.

8. Guidance system of claim 1, modulated optical radiation M1, M2, and M3comprising a plurality of modulation frequencies in order to estimate range through temporal processing and estimate angle through the first and second electro-optical sensors.

9. Guidance system of claim 1, modulated optical radiation M1, M2, and M3 comprising a plurality of modulation frequencies in order to reject signals due to reflections.

10. Guidance system of claim 1, wherein each of the at least one oscillating element is a retro-reflector, the system further comprising a transmitter for transmitting the modulated optical radiation to the retro-reflector, for reflecting to the electro-optical sensors.

11. Guidance system of claim 10, the transmitter being configured such that the modulated optical radiation is distinct from other electromagnetic radiation incident on the electro-optic sensors.

12. Guidance system of claim 1, the modulated optical radiation having modulation frequency in the radio-frequency range.

13. Guidance system of claim 1, the modulated optical radiation having modulation frequency greater than 300 GHz.

14. Guidance system of claim 1, the first transmission function having a first spatially-varying phase transmission that differs from a second spatially-varying phase transmission of the second transmission function.

15. Guidance system for determining a location parameter of an object, comprising:
    at least one oscillating element located at the object for emitting modulated optical radiation;
    at least two mutually distinct signal-modifying electro-optical sensors, each having a phase plate, a detector, and a demodulator for generating a demodulated electrical signal in response to detection of at least a portion of the modulated optical radiation, each phase plate having a respective spatially-varying phase transmission function that imposes a mutually-distinct spatially-dependent modification on the incident optical radiation; and a processor for determining the location parameter from the demodulated electrical signals.

* * * * *

UNITED STATES PATENT AND TRADEMARK OFFICE
CERTIFICATE OF CORRECTION

PATENT NO. : 9,739,864 B2
APPLICATION NO. : 14/165946
DATED : August 22, 2017
INVENTOR(S) : Edward R. Dowski et al.

It is certified that error appears in the above-identified patent and that said Letters Patent is hereby corrected as shown below:

In the Claims

Column 35, Line 48, "configured to," should read -- configured to emit, --.

Signed and Sealed this
Eighth Day of September, 2020

Andrei Iancu
*Director of the United States Patent and Trademark Office*